(12) United States Patent
Paukovits et al.

(10) Patent No.: US 9,364,109 B2
(45) Date of Patent: Jun. 14, 2016

(54) HYDRATION SYSTEM

(71) Applicant: ATP, Inc., Hummelstown, PA (US)

(72) Inventors: Edward J. Paukovits, Harrisburg, PA (US); Joseph Bowling, Narberth, PA (US); J. Michael Henderson, Berwyn, PA (US); Daniel Todd Adlon, Harrisburg, PA (US)

(73) Assignee: ATP, Inc., Hummelstown, PA (US)

( * ) Notice: Subject to any disclaimer, the term of this patent is extended or adjusted under 35 U.S.C. 154(b) by 668 days.

(21) Appl. No.: 13/690,658

(22) Filed: Nov. 30, 2012

(65) Prior Publication Data

US 2013/0092747 A1 Apr. 18, 2013

Related U.S. Application Data

(63) Continuation-in-part of application No. 13/180,119, filed on Jul. 11, 2011, now Pat. No. 8,905,330.

(51) Int. Cl.
*B05B 1/30* (2006.01)
*A47G 19/22* (2006.01)
*G01F 11/06* (2006.01)

(52) U.S. Cl.
CPC ............ *A47G 19/2266* (2013.01); *G01F 11/06* (2013.01)

(58) Field of Classification Search
CPC ........ E03B 9/20; A61H 35/02; B05B 1/3006; A01G 25/09

USPC ............ 239/349, 16, 24, 29, 29.3, 30, 31, 32, 239/33; 222/175, 333, 334, 336, 340; 73/861
See application file for complete search history.

(56) References Cited

U.S. PATENT DOCUMENTS

| 3,919,455 | A | 11/1975 | Sigdell et al. | |
| 6,212,959 | B1 * | 4/2001 | Perkins | G01F 1/115 73/861.74 |
| 8,378,830 | B2 * | 2/2013 | Moran | G01F 1/075 222/243 |
| 8,460,234 | B1 * | 6/2013 | Duron-Smith | A47G 19/2266 604/77 |

* cited by examiner

*Primary Examiner* — Justin Jonaitis
(74) *Attorney, Agent, or Firm* — Duane Morris LLP

(57) ABSTRACT

A device, system and method for dispensing fluid from a device usable for personal hydration in one embodiment. The system relates generally to a hand-held fluid dispensing module, a control module coupled to the hand-held fluid dispensing module, a fluid container located in close proximity to the hand-held fluid dispensing module and the control module, and a cooling module coupled to the control module. The hand-held device being configured to control and determine the amount of fluid dispensed from the device. The method relates to using the system and dispensing fluid from the hand-held fluid dispensing module by either applying pressure to an exterior portion of the hand-held dispensing module or providing a vacuum to the hand-held fluid dispensing module. In various embodiments, the hydration system is configured to control the amount of fluid dispense to a user and preventing leakage from the device after a drinking event.

15 Claims, 49 Drawing Sheets

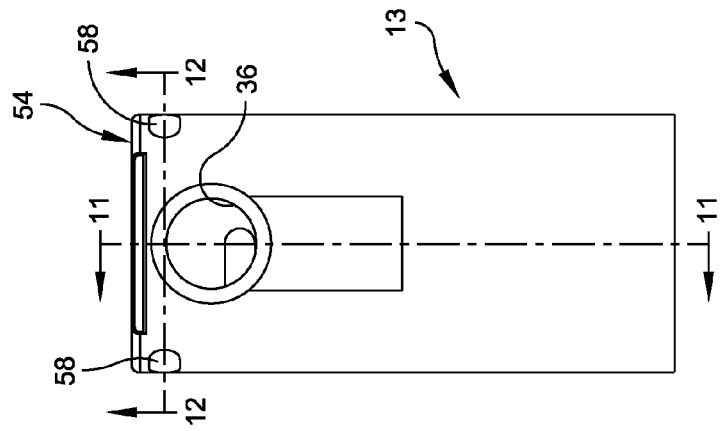
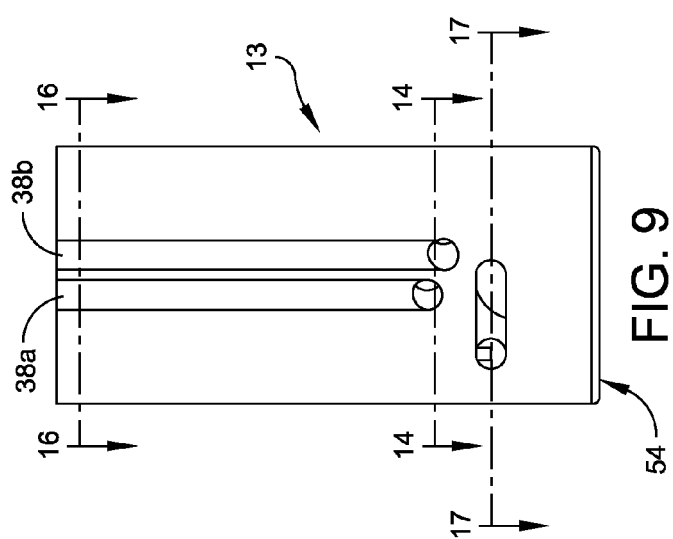
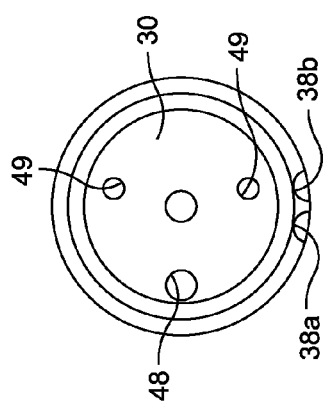
FIG. 8
FIG. 9
FIG. 10

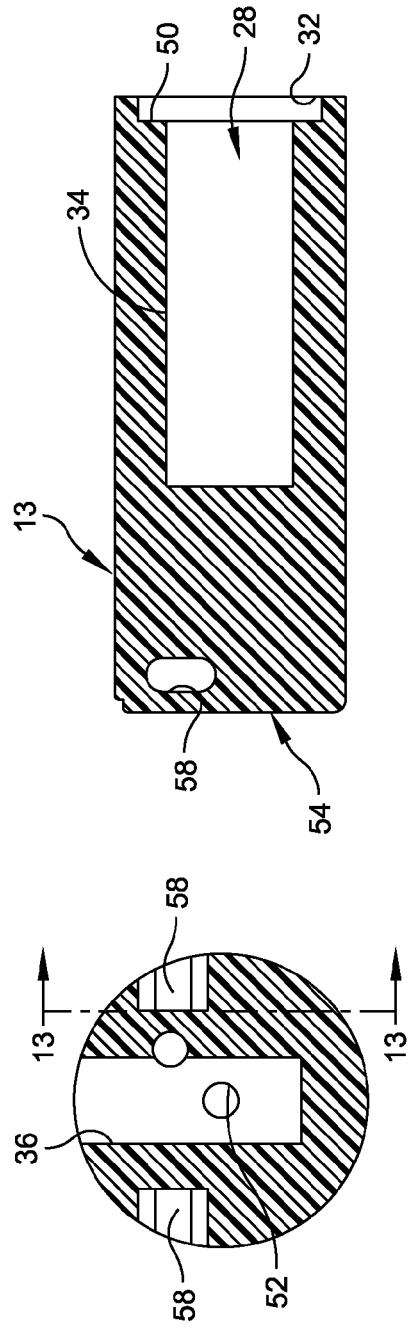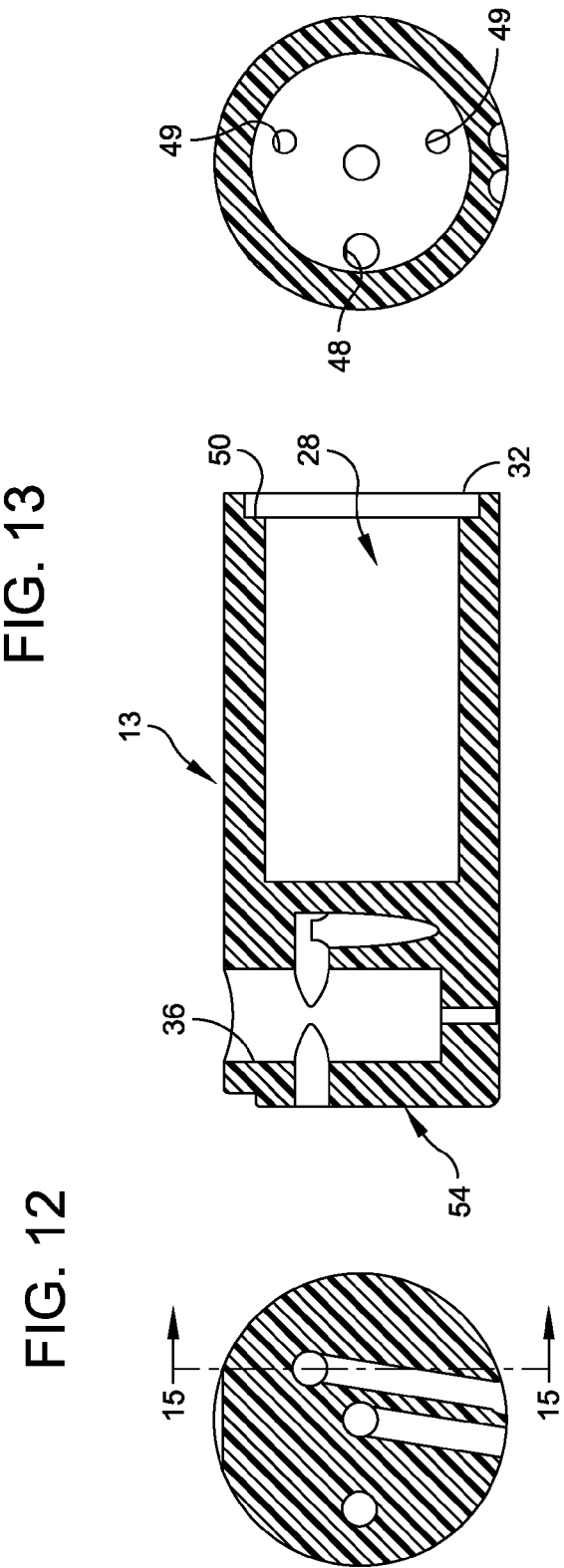

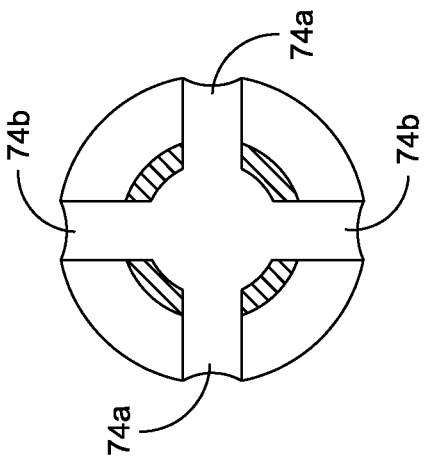
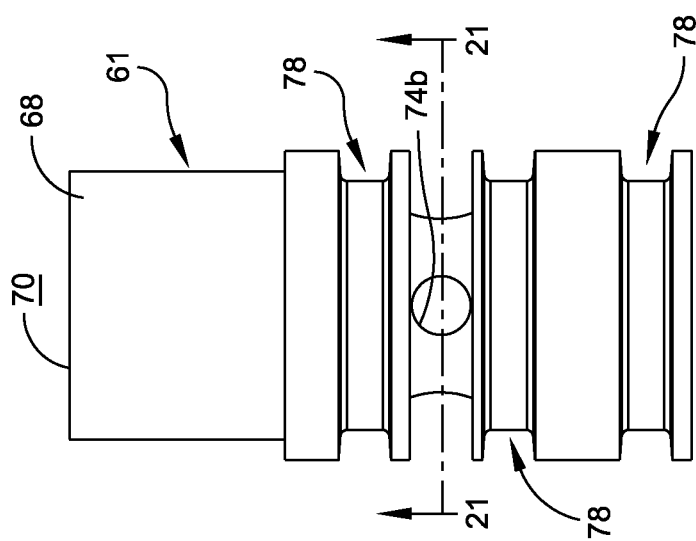
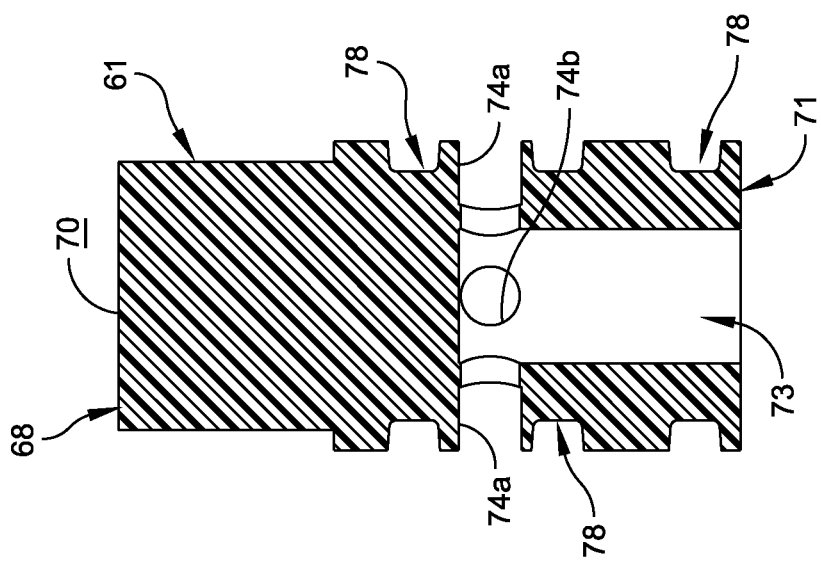

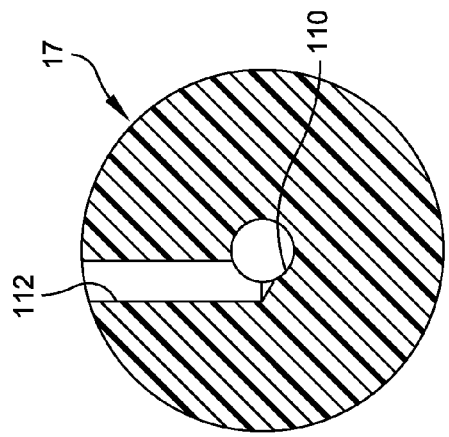
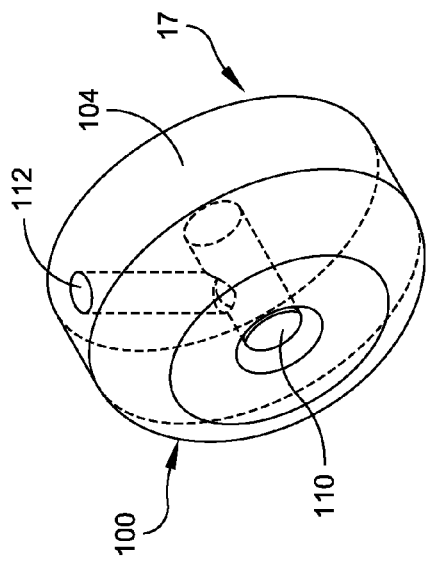
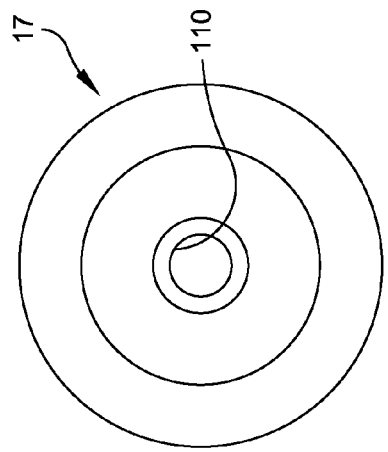
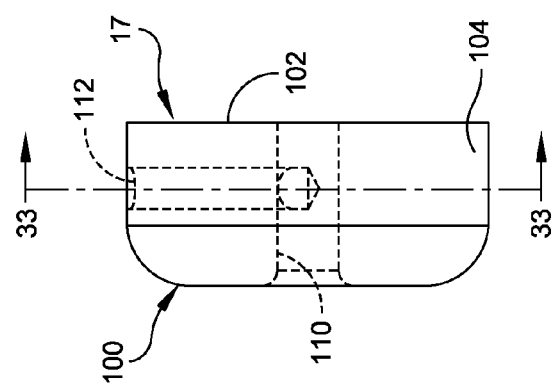

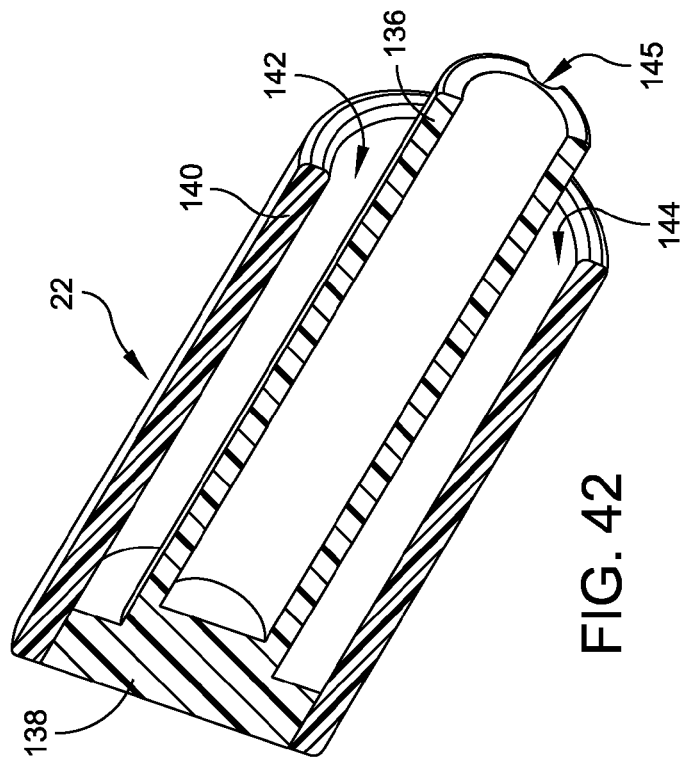
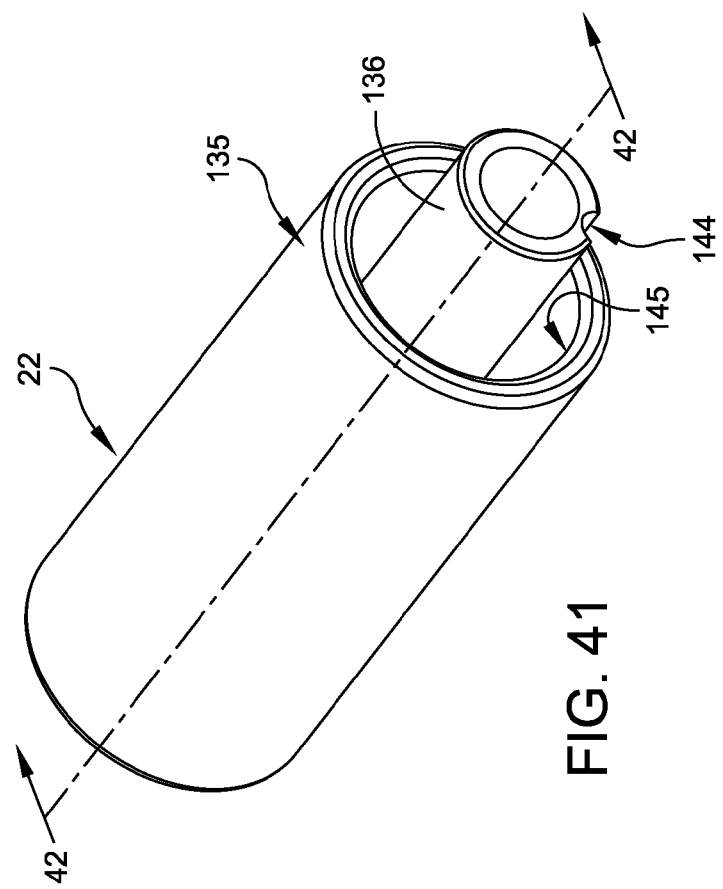
FIG. 42
FIG. 41

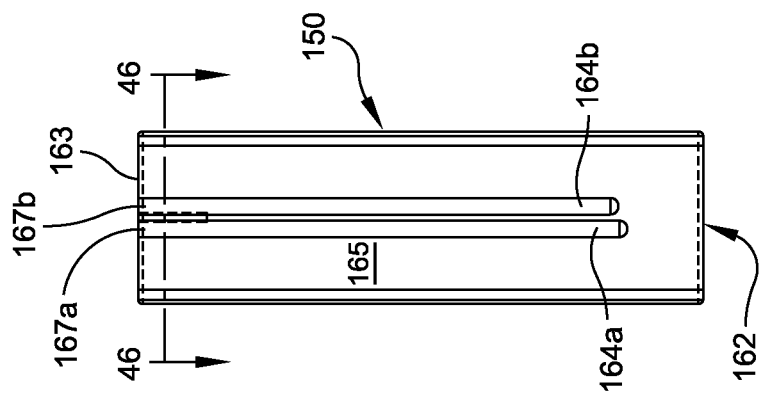
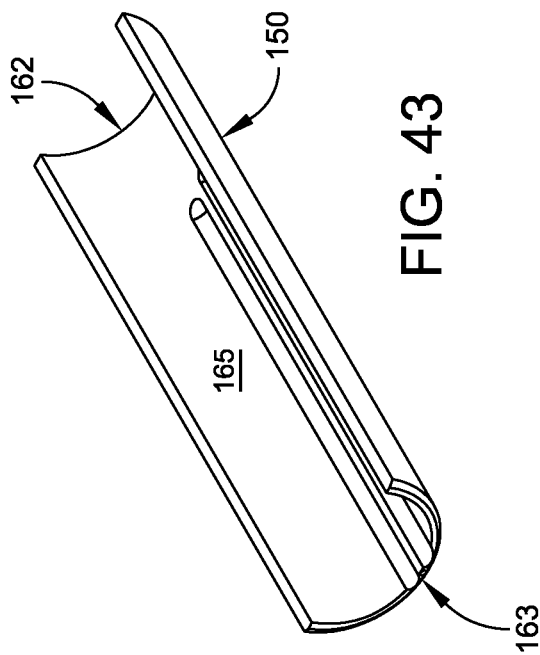

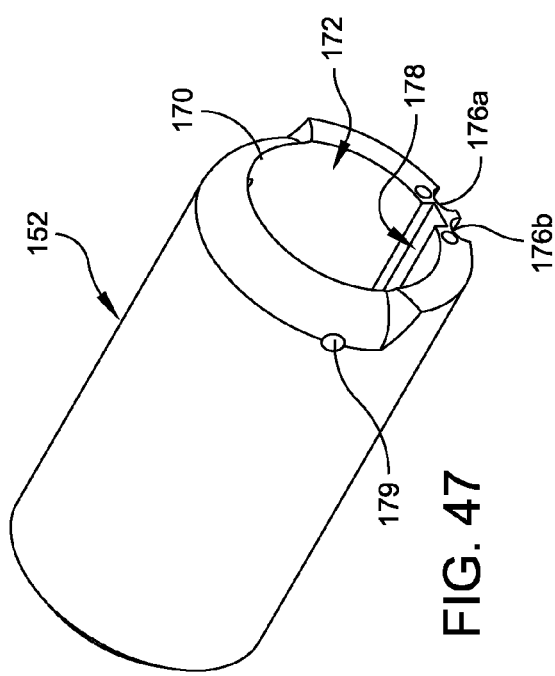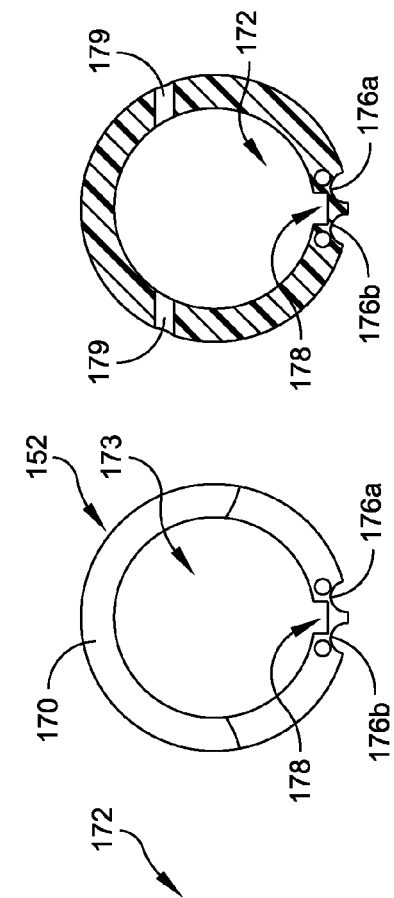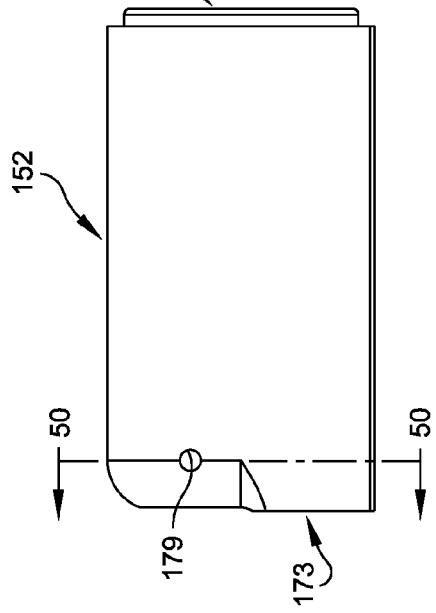

HYDRATION SYSTEM

CROSS REFERENCE TO RELATED APPLICATIONS

This application is a continuation-in-part of pending U.S. application Ser. No. 13/180,119 filed Jul. 11, 2011, the entire contents of which is incorporated herein by reference.

FIELD OF THE INVENTION

This invention relates to measured delivery of liquid to a person, and particularly to metering fluid intake for proper human hydration.

BACKGROUND OF THE INVENTION

Hydration refers to the measure of water content in the body tissues. Water makes up a large proportion of the human body; approximately 60% in adult men and 55% in adult women. Almost all physiological processes are impacted by our hydration status, including regulation of body temperature and transport of oxygen and nutrients to the cells. Dehydration resulting from the failure to adequately replace fluids can lead to inadequate dissipation of heat, which may result in an elevation of core body temperature and excessive cardiovascular strain. Thirst is not necessarily an accurate indicator of hydration status, as water has been found to quench the sensation of thirst before adequate body fluid replacement is achieved. Ambient temperature and humidity, as well as weight and activity level, contribute to an individual's hydration status at any given time.

Research suggests that fluid consumption in general and water consumption in particular can have an effect on the risk of urinary stone disease; cancers of the breast, colon, and urinary tract; childhood and adolescent obesity; mitral valve prolapse; salivary gland function; and overall health in the elderly. However, in hospitals it is frequently vital to maintain the rate of hydration of a patient. In some cases, the rate of hydration is partially known by the rate of delivery of intravenously supplied fluids. In the past, the patient's total oral consumption of fluid has been monitored and maintained by guesswork. Patient care is often deficient, however, because there is no accurate measure of the patient's rate or quantity of hydration. This results in patient upsets and increases time and effort required by the medical staff.

There exist many instances where a liquid in a container is to be dispensed repeatedly in the same, pre-measured quantity. One such situation is the dispensing of a liquid to a user in a medical or assisted living environment, e.g., home care, nursing home, hospital, etc. In the foregoing settings, there have typically been two different methods for dispensing exactly-repeated quantities of a liquid to a user. The first method includes carefully pouring the liquid into a measurement container to obtain the desired amount, then having the person drink. The chief disadvantages of this method are that an additional tool, the measurement container, must be provided and the fluid has to be manually poured into the containers increasing the chances of spillage and incorrect measurements.

A second method includes controlling the outlet of a liquid container by a tap and measuring the dispensed amount of liquid by reading the liquid level on a scale on the liquid container. Because the liquid container has to be held exactly vertical in order to correctly read the level of the liquid, and since at least one hand is needed in order to control the tap, this method is mainly restricted to liquid containers installed at a fixed location and is not convenient for small transportable bottles in an assisted care setting. Moreover, there is no record of refills with this method, and therefore it is often difficult to accurately determine the total consumption of liquid dispensed. Additionally, at least a part of the container needs to be transparent in order to observe the level of liquid. One other prevalent problem associated with such methods is the eventual warming and stagnation of the fluid. This causes the liquid to be less than desirable for ingestion by a person.

Various liquid containers for supplying drinking water are commercially available. Sigdell et al., in U.S. Pat. No. 3,919,455 (1975) teach an apparatus which measures the volume and flow rate of liquids. This system uses a siphon-suction principle in which a container is filled by suction, then when a predetermined level is reached, a siphon causes the container to drain. Electrical sensors detect the evacuation of the water in the container and transmit a signal that the container is ready for another fill-and-drain cycle. While this system provides information about liquid volume dispensed, it does not display the volume dispensed as a function of time. Further, suction is used only to fill the chamber. If the siphon action is not allowed, the chamber will not drain and the chamber will remain full. Even if repeated siphon and suction cycles were employed, this system would not be practical in human hydration applications. The entire contents of the container are drained in each siphon cycle. Thus, the user would be required to swallow the entire volume of the container. Because of the container's fixed size, it would not be possible for the user to withdraw a single sip of liquid at one time, and at a later time withdraw a mouth-full from the same container. Because of these limitations, this system is not applicable to maintenance of hydration.

In U.S. Pat. No. 6,212,959, issued to Perkins, and incorporated herein by reference, a system is provided for insuring proper human hydration that includes an oral-suction-activated flow meter that measures and displays the volume of fluid withdrawn from a reservoir through tubing. An optional check valve prevents return flow of fluid from the user's mouth to the reservoir. Mode and control buttons control operation of a microprocessor and a display. Both alphanumeric and graphical displays show the volume withdrawn as a function of time or other events. Drink reminder alarms are provided through a display or loudspeaker to alert the user when it is time for a drink to ensure proper hydration.

None of the prior-art fluid supply systems accurately reports the rate or quantity of fluid consumption. Further, none of the prior-art fluid supply systems indicates, in advance of the user's thirst, that it is time to consume more fluid. By the time a user is thirsty, she or he is already partially dehydrated.

SUMMARY OF THE INVENTION

The present invention relates broadly to a hydration system. There are several embodiments listed herein that will be further described in relation to the drawings provided.

One embodiment of the present invention provides a hydration system having a hand-held fluid delivery and dispensing assembly or module (hereafter fluid dispensing module) and a base unit which may include a control module coupled to the hand-held dispensing module, a main fluid storage container, and a cooling module in some embodiments. The hand-held fluid dispensing module may be configured to control the amount of liquid exiting a fluid reservoir locating within the hand-held fluid dispensing module. A fluid reservoir in the hand-held fluid dispensing module is in fluid communication with the preferably larger capacity main fluid storage container associated with the base unit.

Another embodiment of the present invention provides a fluid dispensing module including a fluid reservoir arranged in fluid communication with a flow control valve and a piston such that actuation of the valve causes a change in the volume of fluid in the fluid reservoir.

Another embodiment of the present invention provides a handle assembly, a piston assembly, a metal rod, a magnetic field detector, and a valve housing. For instance, the handle assembly has a semi-circular body portion defining a first side, an enclosed cylindrical body portion defining a second side, and a spring abutting with the inner end of the second side. The piston assembly may be slidably connected to the semi-circular body portion and capable of abutting with the circular body portion of the handle assembly in a neutral state, the piston sized and configured to slide toward the first side of the handle assembly as the spring of the handle assembly is unbiased in a released state, and the piston is sized and configured to slide toward the second side of the handle assembly as the spring of the handle assembly is biased in an unreleased state. In this embodiment, there is a metal rod fixedly attached to the piston assembly and a magnetic field detector fixedly attached to the second side of the handle assembly and magnetically coupled to the metal rod. The air bleed disk may be connected to an interior portion of the valve housing, the air bleed disk may be a cylindrical disk further having a first side facing the second side of the valve housing and the air bleed disk having a second side facing the first side of the valve housing, wherein the first side of the air bleed disk has a plurality of radially extending grooves and the second side of the air bleed disk is flat. The hub being connected to the second side of the valve housing, the hub having a front surface, a rear surface, and at least one side wall with a through bore extending from the front surface to the rear surface and a vacuum bore extending from the at least one side wall to the through bore.

An alternative embodiment of the present invention provides a hollow cylindrical body and a valve assembly. The hollow cylindrical body may have a closed end and an open end with a small aperture extending through the closed end and a valve bore extending through one side of the side wall. The valve assembly may be configured to operate within the valve bore, the valve assembly further including a spring and a valve body, wherein when pressure is applied to the valve body, the spring becomes biased and the aperture of the valve body transitions into fluid communication with the closed end of the hollow cylindrical body and with the inner portion of the hollow cylindrical body. Further, the spring may abut with the bottom portion of the valve bore and the valve body may abut with the spring on a first side and be in fluid communication with an exterior portion of the valve assembly on a second side, the valve bore having an aperture capable of being in fluid communication with the small aperture extending through the closed end of the hollow cylindrical body and with the inner portion of the hollow cylindrical body.

Another embodiment of the present invention provides an air bleed disk assembly. The air bleed assembly having a hollow housing valve with an interior base wall, a circular block, a circular body, a plurality of guide slots, a communication member, and at least one pilot post. The hollow housing valve having a first end being closed and a second end being open, the first end having a small aperture extending through it. The hollow housing valve further includes an interior base wall. The air bleed assembly may further include a circular block that extends through the second end of the hollow housing having a diameter less than the inner diameter of the hollow housing valve, but is substantially equal thereto, and the circular block being in contact with the inner diameter of the hollow housing valve. The air bleed assembly may also include a circular body having a front surface and a rear surface, the front surface attached to the second surface of the interior base wall, wherein the circular body includes a plurality of guide slots, a communication member, and at least one pilot post that projects into the interior base wall.

Another embodiment of the present invention includes a vacuum actuation system having a housing, a hub, a sensor assembly, a valve actuation assembly, and a valve actuator. The housing may have an opening in fluid communication with a valve body and a fluid reservoir, wherein pressure applied to the valve body creates a change in volume of the fluid reservoir. The hub may be connected to the housing, the hub having an aperture extending through the width of the hub and a vacuum bore extending through the side wall of the hub and being in fluid communication with the aperture extending through the width of the hub. The sensor assembly being sized and configured to partially fit into the vacuum bore. The valve actuation assembly being connected to the housing and coupled with the sensor assembly. The valve actuator may be rotatably mounted to the valve actuation assembly sized and configured to rotate and apply downward pressure to the valve body located in the opening of the housing.

Another embodiment of the present invention provides a system for measuring an amount of dispensed liquid. The system further includes a fluid reservoir, a metal rod, a body, and a magnetic field detector. The fluid reservoir may have a fixed front surface and a slidable rear wall, the fluid reservoir having an opening extending through the front surface so that the inner portion of the fluid reservoir communicates with the outer portion of the fluid portion. The metal rod being fixedly attached within the slidable rear surface. The body at least partially surrounding the slidable rear wall and the fluid reservoir. The magnetic fluid detector may be fixedly attached to the body and magnetically coupled to the metal rod.

Another embodiment of the present invention provides a method for measuring an amount of dispensed liquid from a fluid reservoir. In accordance with the other embodiments of the present invention, this method includes sliding the rear wall toward the front surface of the fluid reservoir and thereby moving the metal rod in a direction opposing the magnetic field detector. Then the step of determining a position of the rear wall of the fluid reservoir through the detection of the strength of the magnetic coupling between the magnetic field detector and the metal rod. The method further includes halting the movement of the rear wall toward the front surface of the fluid reservoir based on a predetermined minimum magnetic coupling strength received at the magnetic field detector, wherein the predetermined minimum magnetic strength equates to a position of the rear wall indicating that the fluid reservoir has released a necessary amount of liquid to a user.

Another embodiment of the present invention provides a method for dispensing liquid. In accordance with the other embodiments of the present invention, this method is initiated by providing pressure to a second end of a trigger plate attached a housing portion of the hand-held dispensing module. The method then provides inserting the post connected to the second end of the trigger plate into an opening of the housing. Then the method provides for the opening of an orifice in the fixed front surface through the insertion of the post into the opening of the housing. The method then provides the sliding of the slidable rear wall of the liquid reservoir toward the front surface of the liquid reservoir.

Another embodiment of the present invention provides a method for dispensing liquid. In accordance with the other embodiments of the present invention, having attached to the hub a sensor assembly, wherein the sensor assembly is further coupled to a rotatable vacuum actuation assembly. The method further includes producing a vacuum initiated by a user through a mouth piece and then receiving the produced vacuum by the user at the sensor assembly, which sends a signal to the rotatable vacuum actuation assembly to rotate the rotatable vacuum actuation assembly at a predetermined angle, wherein the rotating creates an opening of an orifice in the front wall of the fluid reservoir. The method may further include extending the rear wall toward the front surface of the fluid reservoir, and thereafter halting the movement of the rear wall at a predetermined position based on a strength of the magnetic coupling detected at the magnetic field detector indicating the magnetic field emitted from the metal rod, wherein the predetermined position equates to a position of the rear wall indicating that the fluid reservoir has released a desired amount of liquid to the user.

Another embodiment of the present invention provides a method for releasing air molecules from a liquid reservoir. In accordance with the other embodiments of the present invention, the method provides for the entrapping of air molecules in an interior portion of the fluid reservoir. The method then provides for placing the fluid reservoir at an angle such that the front surface of the fluid reservoir is elevated higher than the rear wall of the fluid reservoir. The method then provides for the releasing of the entrapped air in the fluid reservoir through the plurality of radially extending grooves located within the front surface of the air bleed disk.

BRIEF DESCRIPTION OF THE DRAWINGS

These and other features and advantages of the present invention will be more fully disclosed in, or rendered obvious by, the following detailed description of the preferred embodiment of the invention, which is to be considered together with the accompanying drawings wherein like numbers refer to like parts and further wherein:

FIG. 8 is a plan view of an embodiment of a valve housing of the present invention;

FIG. 9 is a plan view of an embodiment of a valve housing of the present invention;

FIG. 10 is a plan view of an embodiment of a valve housing of the present invention;

FIG. 12 is a plan view of an embodiment of a valve housing of the present invention;

FIG. 13 is a plan view of an embodiment of a valve housing of the present invention;

FIG. 14 is a plan view of an embodiment of a valve housing of the present invention;

FIG. 15 is a cross-sectional view of an embodiment of a valve housing of the present invention;

FIG. 16 is a plan view of an embodiment of a valve housing of the present invention;

FIG. 19 is a plan view of an embodiment of a valve body of the present invention;

FIG. 20 is a plan view of an embodiment of a valve body of the present invention;

FIG. 21 is a cross-sectional view portraying through bores extending through an embodiment of a valve body of the present invention;

FIG. 30 is a perspective view of an embodiment of a cap having a vacuum bore of the present invention;

FIG. 31 is a plan view of an embodiment of a cap having a vacuum bore of the present invention;

FIG. 32 is a plan view of an embodiment of a cap of the present invention;

FIG. 33 is a cross-sectional view of an embodiment of a cap having a vacuum bore of the present invention;

FIG. 41 is a perspective view of an embodiment of a piston of the present invention.

FIG. 42 is a cross-sectional view of an embodiment of a piston of the present invention.

FIG. 43 is a perspective view of an embodiment of a base of a handle assembly of the present invention;

FIG. 44 is a top view of an embodiment of a handle assembly of the present invention;

FIG. 45 is a side view of an embodiment of a handle assembly of the present invention;

FIG. 46 is a cross-sectional view of an embodiment of a handle assembly of the present invention;

FIG. 47 is a perspective view of an embodiment of a sensor housing of the present invention;

FIG. 48 is a side view of an embodiment of a sensor housing of the present invention;

FIG. 49 is a plan view of an embodiment of a sensor housing of the present invention;

FIG. 50 is a cross-sectional view of an embodiment of a sensor housing of the present invention;

DETAILED DESCRIPTION OF THE PREFERRED EMBODIMENTS

Figure 1:
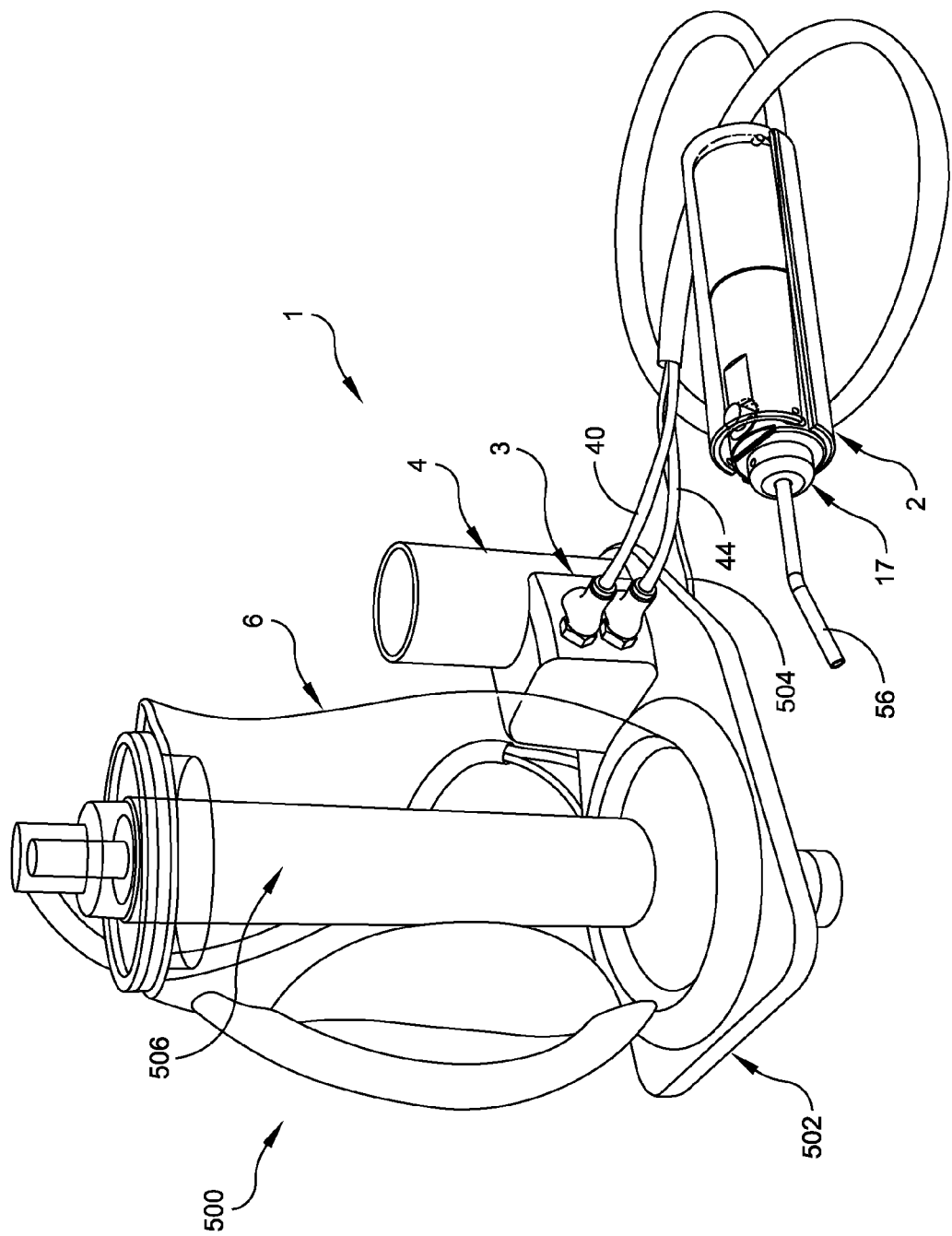
FIG. 1 is a perspective view of an embodiment of a hydration system including a hand-held fluid dispensing module and a base unit comprising a control module, a fluid container, and a cooling module of the present invention.

This description of preferred embodiments is intended to be read in connection with the accompanying drawings, which are to be considered part of the entire written description of this invention. The drawing figures are not necessarily to scale and certain features of the invention may be shown exaggerated in scale or in somewhat schematic form in the interest of clarity and conciseness. In the description, relative terms such as "horizontal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. When only a single machine is illustrated, the term "machine" shall also be taken to include any collection of machines that individually or jointly execute a set (or multiple sets) of instructions to perform any one or more of the methodologies discussed herein. In the claims, means-plus-function clauses, if used, are intended to cover the structures described, suggested, or rendered obvious by the written description or drawings for performing the recited function, including not only structural equivalents but also equivalent structures.

Figure 2:
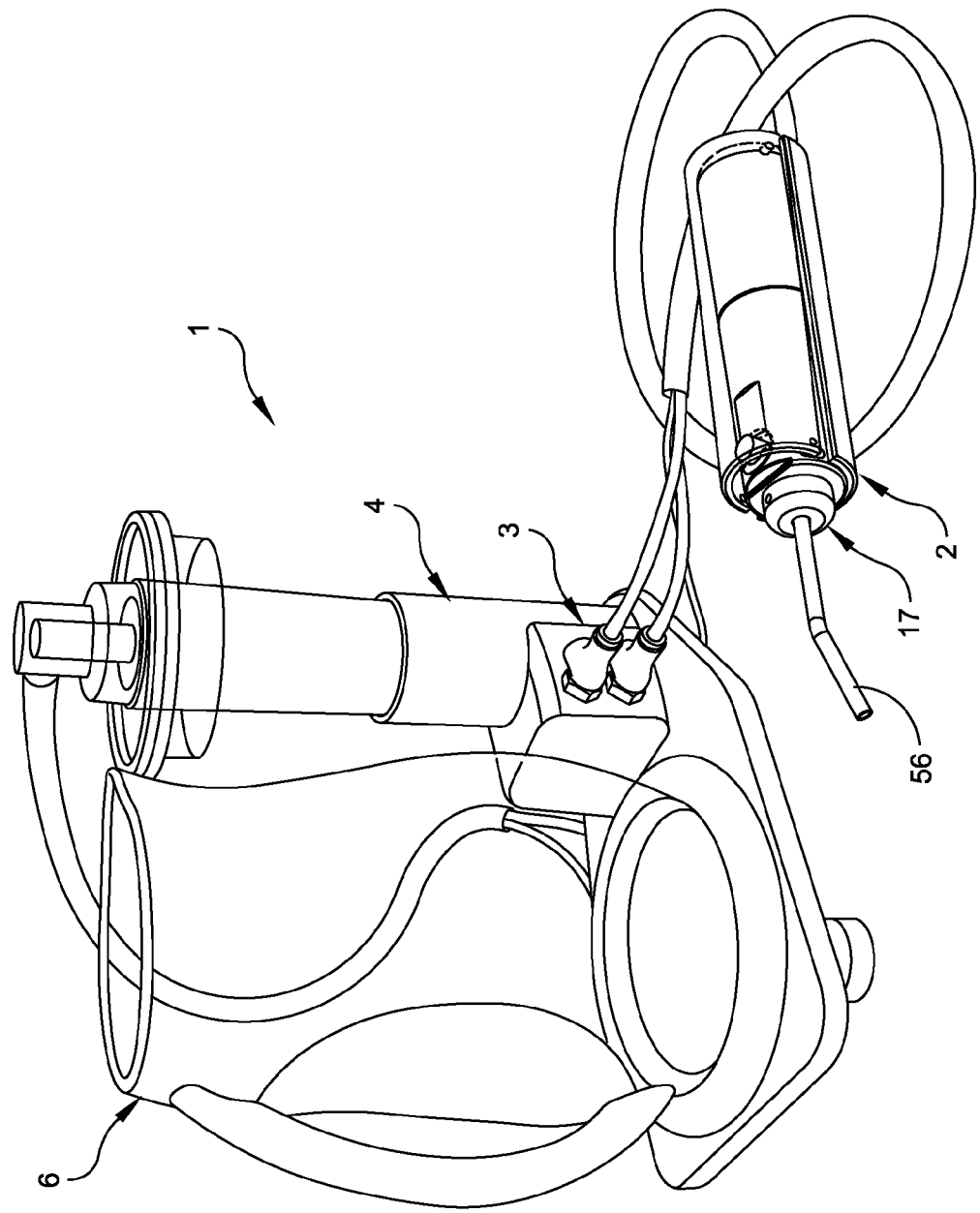
FIG. 2 is a perspective view of an embodiment of a hydration system including a hand-held fluid dispensing module, a control module, a fluid container, and a cooling module of the present invention.
Figure 3:
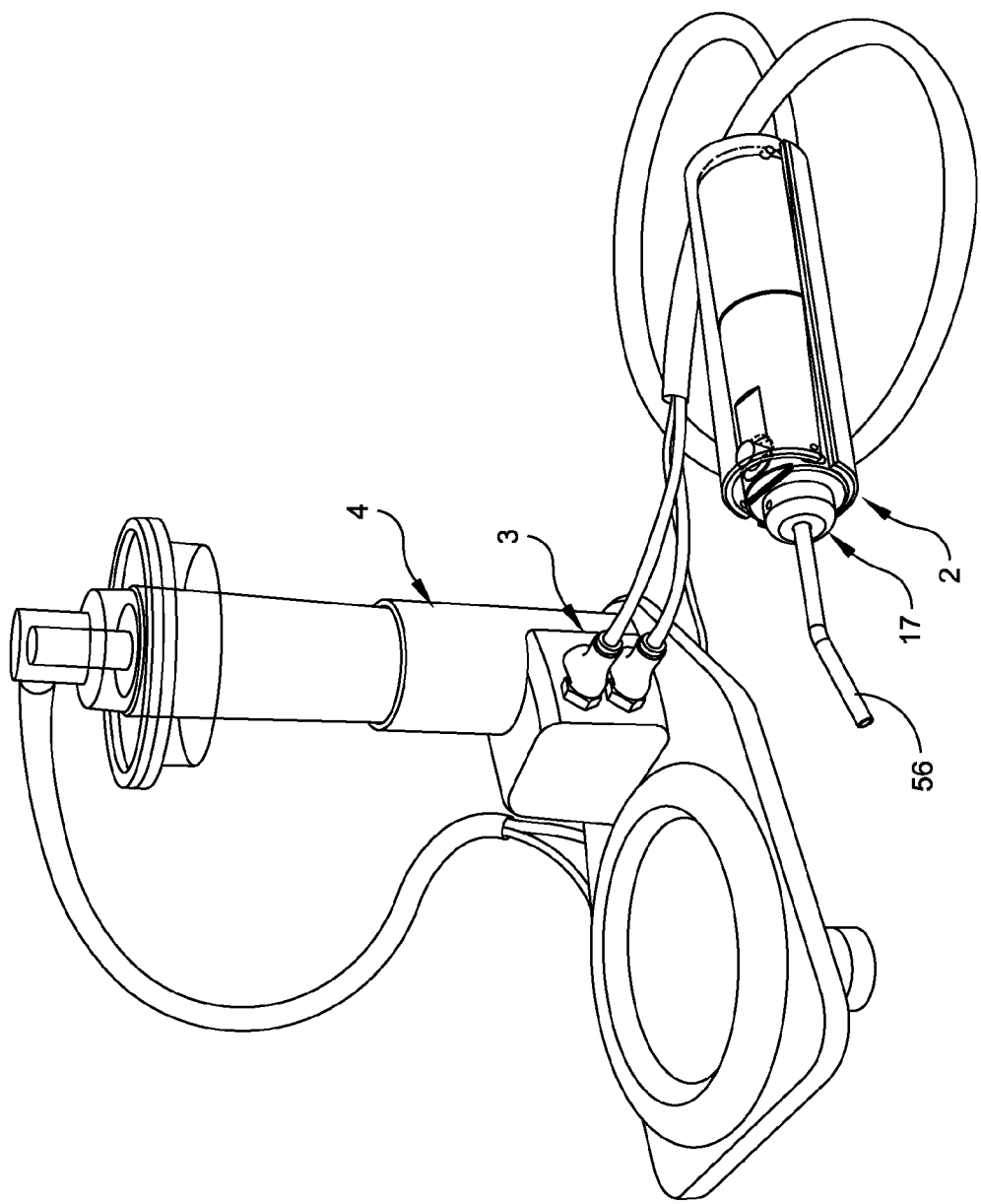
FIG. 3 is a perspective view of an embodiment of a hydration system including a hand-held fluid dispensing module, a control module, and a cooling module of the present invention.
Figure 4:
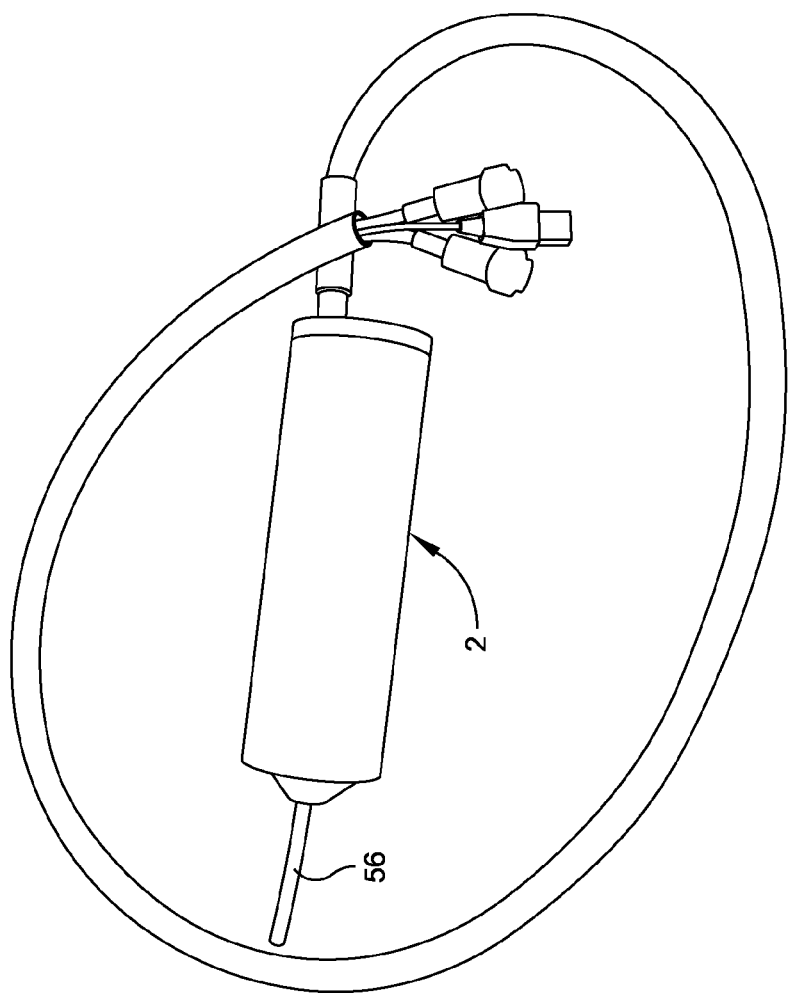
FIG. 4 is a perspective view of an embodiment of a hand-held fluid dispensing module of the present invention.
Figure 5:
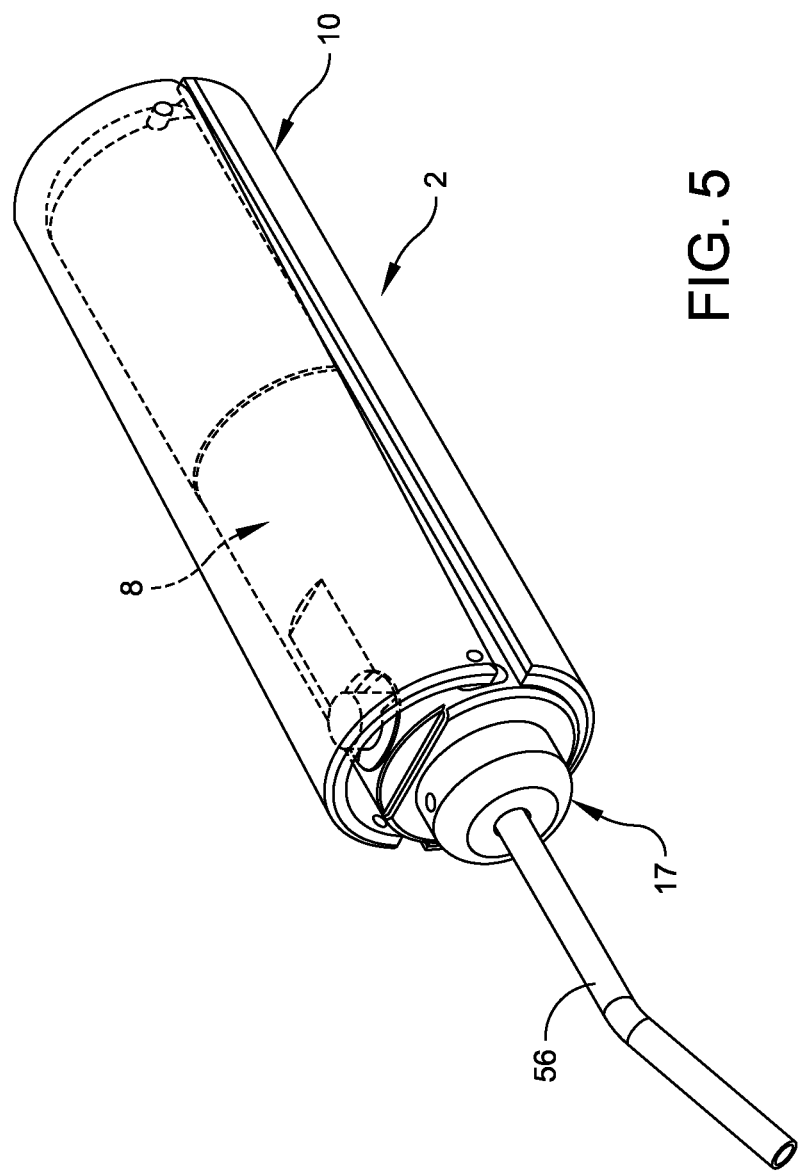
FIG. 5 is a perspective view of an embodiment of a hand-held fluid dispensing module of the present invention.

Referring to FIGS. 1-3, one embodiment of a hydration system 1 formed in accordance with the broadest aspects of the present invention comprises a remote hand-held fluid dispensing module 2, a control module 3, a cooling module 4, and a main fluid storage container such as without limitation pitcher assembly 6. Together these assemblies form a hydration system that provides for metered self-hydration to non-ambulatory users. The system is an ergonomic integrated solution for care givers to assist and monitor hydration needs for general use in hospitals as well as surgical and wound care recovery. Hydration system 1 may find use in nursing homes, hospice and home bound situations. Hydration system 1 may also provide relief and comfort for non-fluid consumption users by providing a controlled delivery of a limited amount of fluid for wetting lips and mouth, but not drinking. Hydration system 1 incorporates features for user safety, data compiling and communication, as well as caregiver programming controls for fluid delivery and monitoring of fluid consumption.

Control module 3, a cooling module 4, and pitcher assembly 6 collectively define a base unit 500 as shown in one embodiment which combines control system electronics (e.g. microprocessor/computer, PCBs, visual displays and indicators, wired/wireless data communication systems, etc.), an AC and/or DC power supply, and fluid dispensing and return components (e.g. pump(s) 506, valves, flow controls, filters, etc.) in a convenient portable and integrated platform for dispensing fluid such as water to a user in a controlled manner. A stand 502 may be provided to conveniently locate the control module 3, a cooling module 4, and pitcher assembly 6 in relatively close proximity to each other. Once set in place near the user such as on a bedside stand, the base unit 500 is intended to remain stationary while the fluid dispensing module 2 is intended to be held and maneuvered by the user to obtain fluid.

The main fluid storage container may have numerous suitable configurations and variations in shape other than pitcher assembly 6 as shown so long as the container is configured for holding a volume of liquid. Removable pitcher assembly 6 may conveniently be removed temporarily from base unit 500 for refilling and then returned. Pitcher assembly 6 may of course have any suitable shape and is expressly not limited to the configuration shown in FIGS. 1 and 2.

Figure 80:
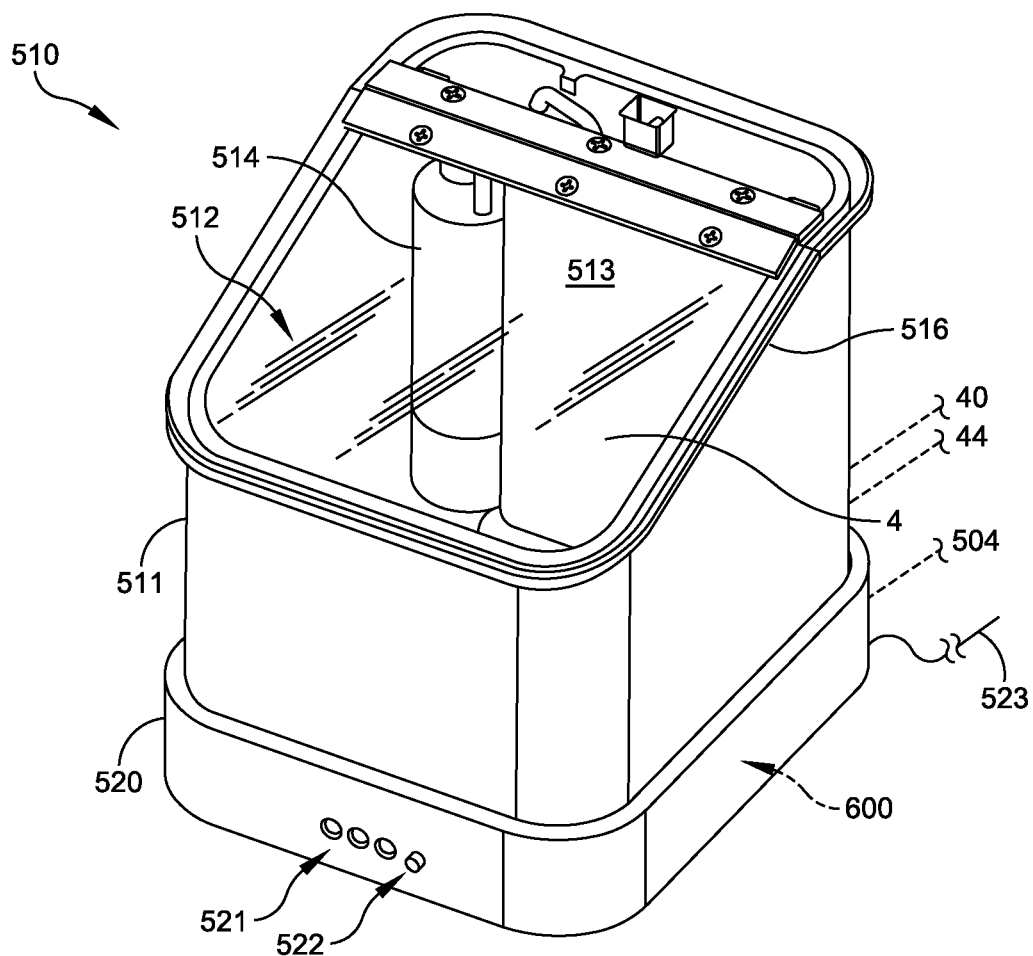
FIG. 80 is a perspective view of an alternative embodiment of a base unit useable with a fluid dispensing module.

In other possible embodiments, as shown in FIG. 80, the main fluid storage container may be an integral part of a modular base unit 510 having more compact configuration and arrangement than base unit 500. Modular base unit 510 integrates a main fluid storage container assembly 511 including a primary main reservoir 512 preferably having larger volumetric storage capacity than remote secondary reservoir 28 in fluid dispensing module 2, 200, or 300, a control module 520 functionally similar to control module 3, an optional cooling module 4, and fluid dispensing and returns components (e.g. pump(s) 506, valves, flow controls, filters, etc.) into a compact modular unit. Control module 3, which houses the control system electronics may be separable from and configured as a base for supporting the fluid storage container assembly 511. This arrangement permits main reservoir 512 to be removed and re-filled and/or disinfected between uses remotely, while the control module remains in place. Alternatively, the main reservoir 512 may remain in place on control module 3 and a separate portable liquid container may be used by staff personnel to refill the reservoir. Main fluid storage container assembly 511 may include an openable/closeable lid 516 for refilling main reservoir 512. Fluid supply and return lines 44, 40 may be fluidly connected to the main fluid storage container assembly 511 via any conventional and suitable fluid couplings 518 (see FIG. 68) configured to engage complementary configured mating ports (not shown) such as on the rear of assembly 511.

With continuing reference to FIG. 80, control module 520 is electrically coupled to control/power cable 504 which supplies power to a hand-held fluid dispensing module such as fluid delivery assemblies 2, 200, and 300 described herein, and further creates a two-way communication signal path between the hand-held fluid dispensing module and base unit 500 or 510 for controlling operation of the fluid dispensing module from the base unit. Control module 3 or 520 may include a power supply cable 523 (shown in FIG. 80), which may be AC and/or DC for powering the electronics and fluid delivery components such as pump(s), valves, etc. In some possible embodiments, control module 3, 520 may be battery operated (conventional or re-chargeable). Control module 3 or 520 may further include one or more status indication lights such as LEDs 521 and a reset switch 522 (see, e.g. FIG. 80).

Main fluid storage container assembly 511 in the modular base unit 510 configuration shown in FIG. 80 may include one or more main pump(s) 514 and flow diverter box 513 which is in fluid communication with pump 514 and main reservoir 512. Flow diverter box 513 contains various flow baffles, tubing, and/or valves necessary to establish at least (1) a fluid dispending flow path for refilling reservoir 28 or hand-held fluid delivery assemblies 2, 200, or 300 through main pump 514, and (2) a fluid return flow path for returning and/or recirculating flow from the fluid delivery assemblies back to the main reservoir 512 at base units 500 or 520.

Main pump 514 takes suction from main reservoir 512 seen in FIG. 80. Any suitable commercially-available pump may be used. In one preferred embodiment, without limitation, main pump 514 may be a Rule iL200 submersible pump available from ITT Flow Control of Gloucester, Mass. Other types and models of pumps may be used. Operation of pump 514 is controlled by control module 520 and powered either through the module or directly from any suitable external power supply.

Control module 3 and 520, and associated electronics, will be further described herein.

Referring now to FIGS. 6 and 7-18, hand-held fluid dispensing module 2 is formed from at least two sub-assemblies, a reservoir assembly 8 and a handle assembly 10. More particularly, reservoir assembly 8 includes a valve housing 13, a flow control valve such as valve assembly 15, a hub 17, an air bleed disk 19, a diaphragm 21, and a piston 22. Valve housing 13 is preferably cylindrically shaped including a fluid reservoir 28 defined by a blind void that is defined by an interior base wall 30, an open end 32, and an annular wall 34. A blind valve bore 36 is defined transversely in annular wall 34 adjacent to interior base wall 30, and a pair of parallel longitudinally arranged channels 38a,38b are defined in the outer surface of annular wall 34. Channel 38a is sized to receive a fluid output or return line 40, and communicates with a transversely defined bore 42 that opens into fluid reservoir 28 via a return orifice 47. Channel 38b is sized to receive a fluid supply line 44, and communicates with a transversely defined supply conduit 46 that communicates with an upper portion of valve bore 36. Return port 47 is defined through a central portion of interior wall 30, and is in fluid communication with fluid output or return line 40, while common path orifice 48 is defined in interior base wall 30 and provides a fluid pathway from the user to non-pressurized fluid reservoir 28 under the control of valve assembly 15 located in blind valve bore 36. A pair of spaced apart blind pilot bores 49 are defined in interior base wall 30. A shoulder 50 is defined in the inner surface of annular wall 34 adjacent to open end 32, and a narrow bore 52 is defined in closed end 54. Narrow bore 52 is sized so as to receive an end of a drinking a mouth piece such as straw 56, and communicates with a portion of valve bore 36. A pair of diametrically opposed pin slots 58 is defined in the outer surface of annular wall 34 adjacent to annular wall 34 and closed end 54.

In one exemplary embodiment of the invention, many of the components of hand-held fluid dispensing module 2 may be made of plastics material, and suitable plastics include without limitation polycarbonate, polyamides, polyoxymethylene (POM) and polysulphone. Generally, the plastic should be chosen so as to confer suitable strength, and preferably resists water ingress. Good tensile strength is also preferred and the plastic is generally an engineering polymer rather than a commodity plastic. It is preferably moldable and typically glass filled to add rigidity and ensure thick sections of components do not sink during the molding process and to maintain integrity of the components. A fill level of 30 to 40 percent is particularly suitable. Preferably, any plastic material coming into contact with a liquid such as water to be consumed by a user is a food or beverage grade plastic.

Figure 6:
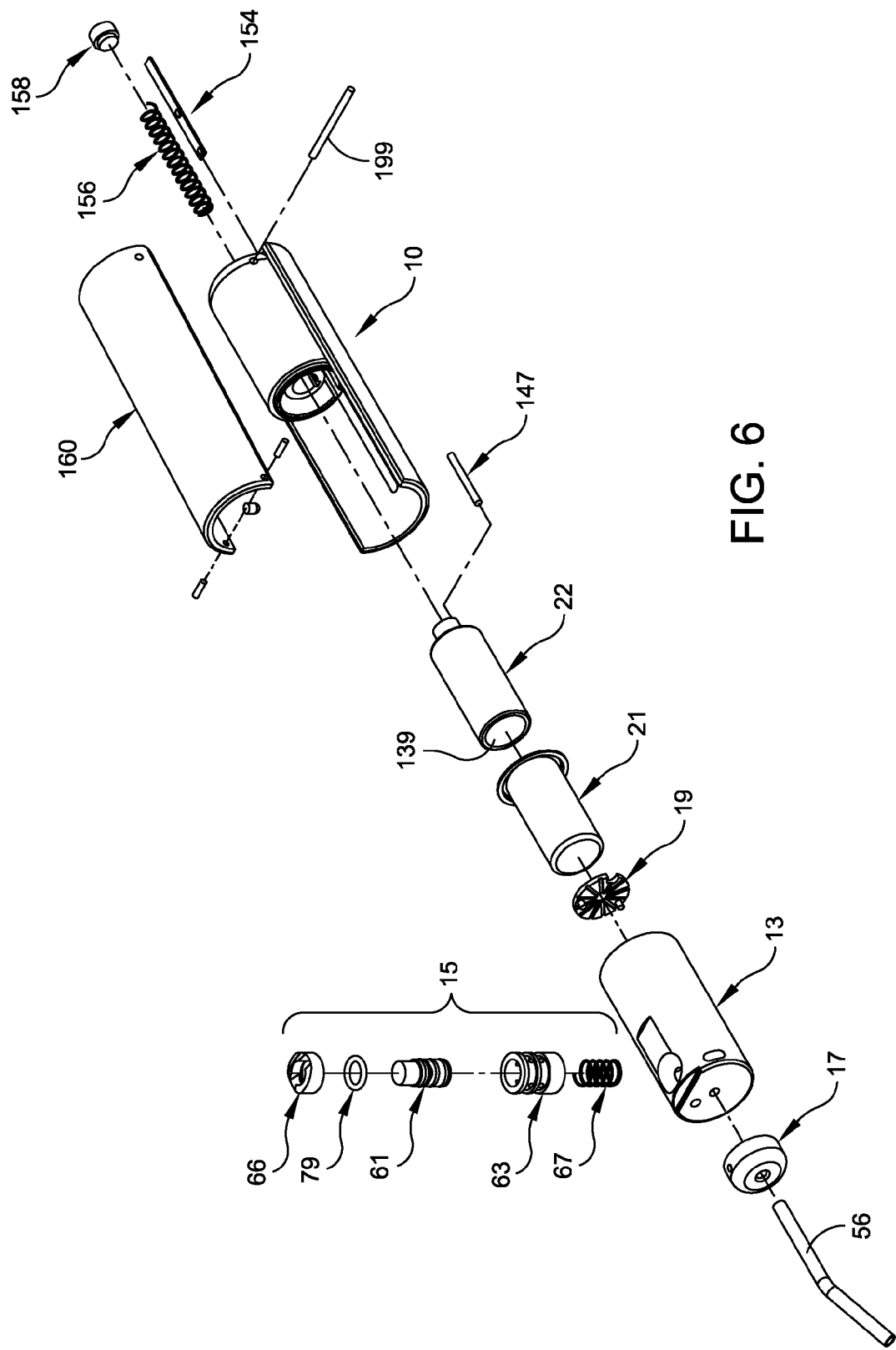
FIG. 6 is an exploded view of an embodiment of a hand-held fluid dispensing module.
Figure 7:
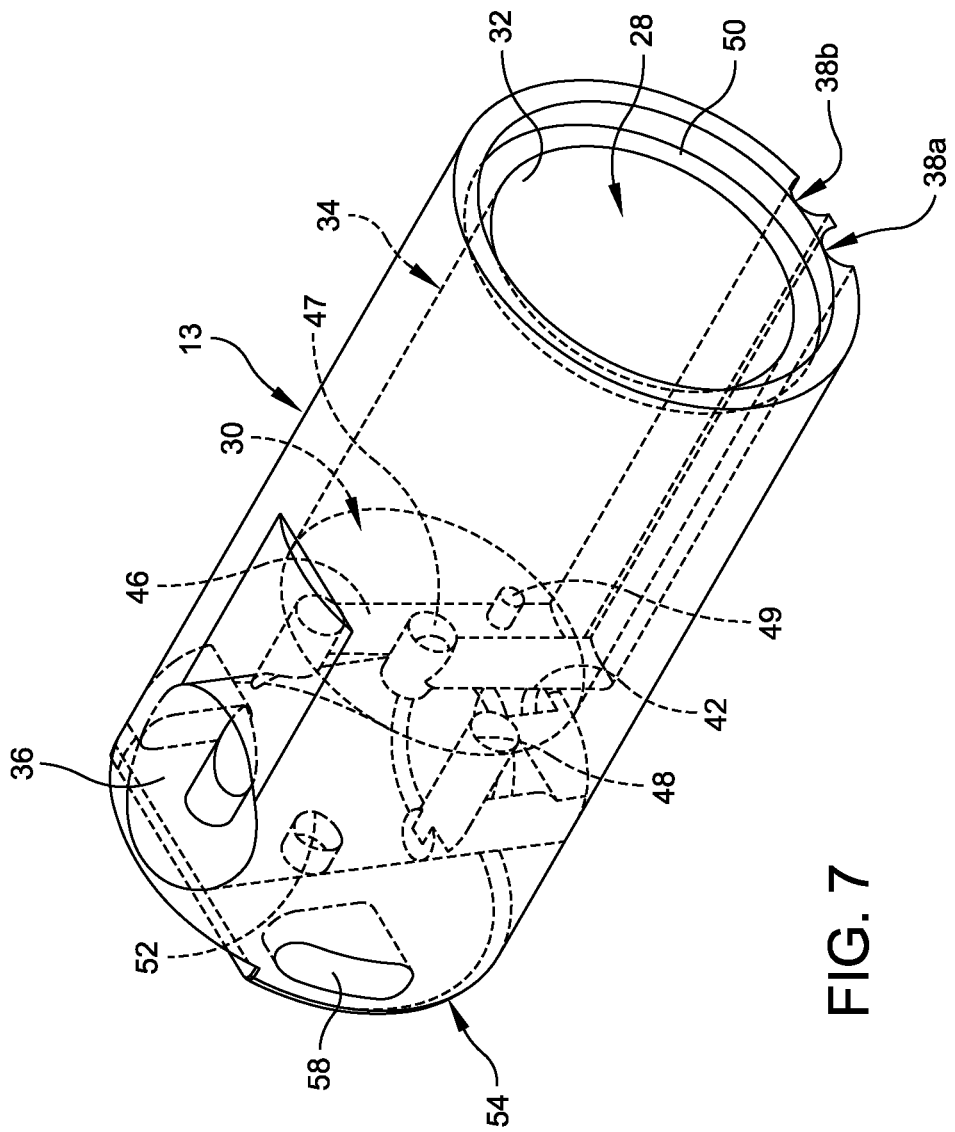
FIG. 7 is perspective view of an embodiment of a valve housing of the present invention.
Figure 11:
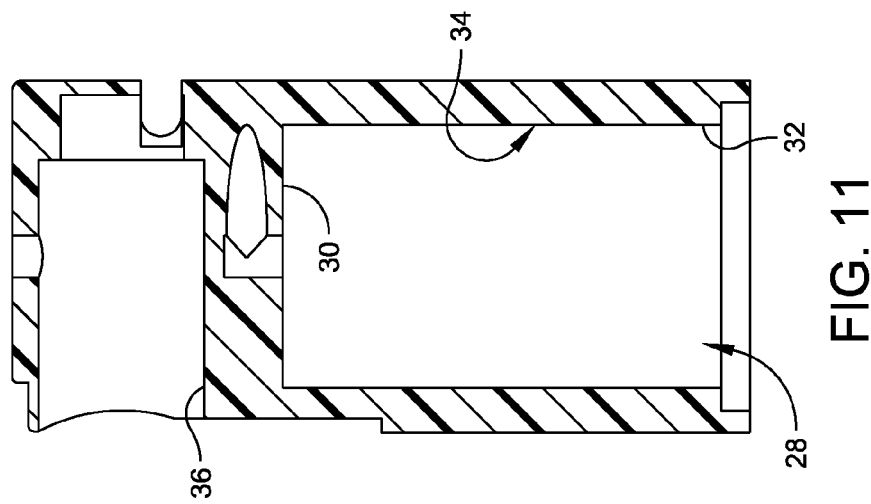
FIG. 11 is a cross-sectional view of an embodiment of a valve housing of the present invention.
Figure 18:
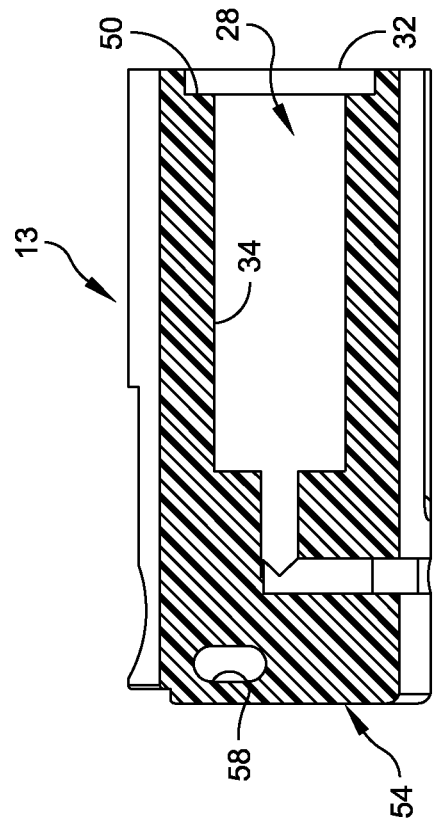
FIG. 18 is a cross-sectional view of an embodiment of a valve housing of the present invention.
Figure 17:
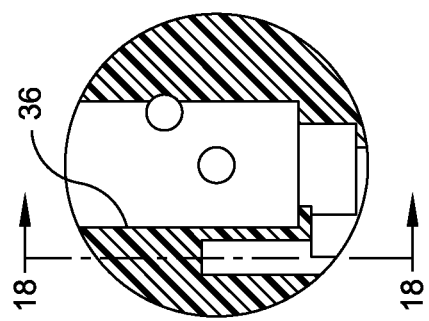
FIG. 17 is a plan view of an embodiment of a valve housing of the present invention.
Figure 22:
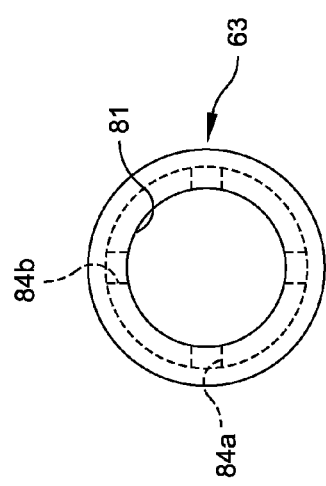
FIG. 22 is a plan view of an embodiment of a valve sleeve of the present invention.
Figure 23:
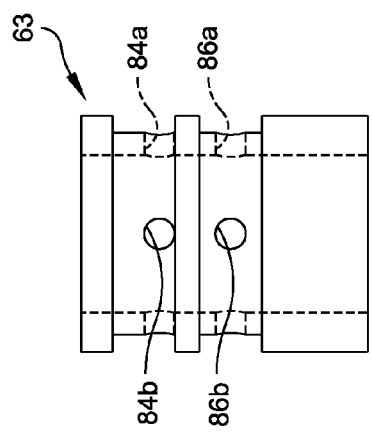
FIG. 23 is a plan view of an embodiment of a valve sleeve of the present invention.
Figure 27:
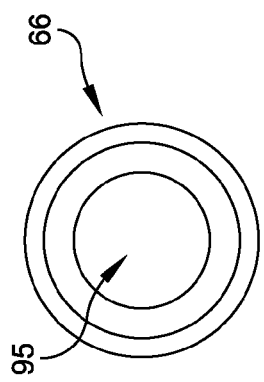
FIG. 27 is a perspective view of an embodiment of a cap of the present invention.
Figure 28:
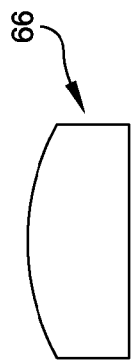
FIG. 28 is a plan view of an embodiment of a cap of the present invention.
Figure 29:
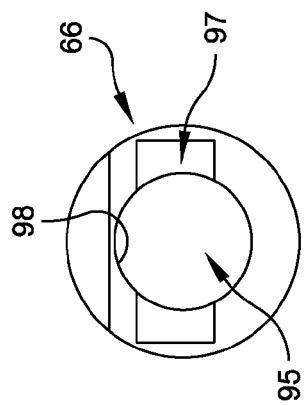
FIG. 29 is a plan view of an embodiment of a cap of the present invention.
Figure 24:
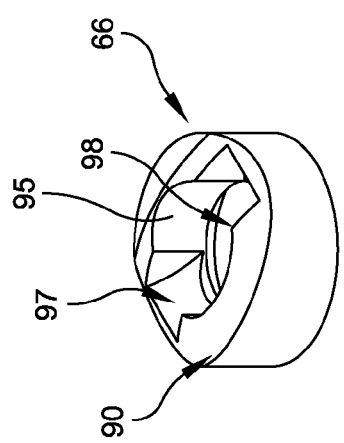
FIG. 24 is a perspective view of an embodiment of a cap of the present invention.
Figure 26:
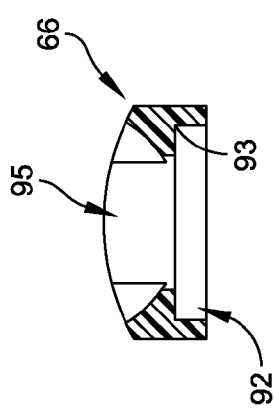
FIG. 26 is a cross-sectional view of an embodiment of a cap of the present invention.
Figure 25:
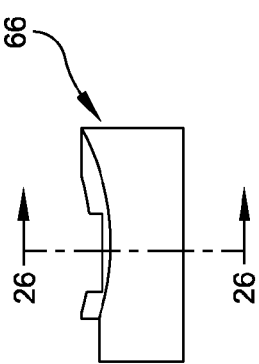
FIG. 25 is a perspective view of an embodiment of a cap of the present invention.
Figure 37:
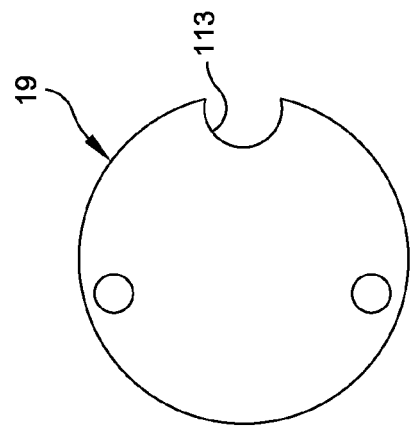
FIG. 37 is a plan view of an embodiment of a rear surface of an air bleed disk of the present invention.
Figure 34:
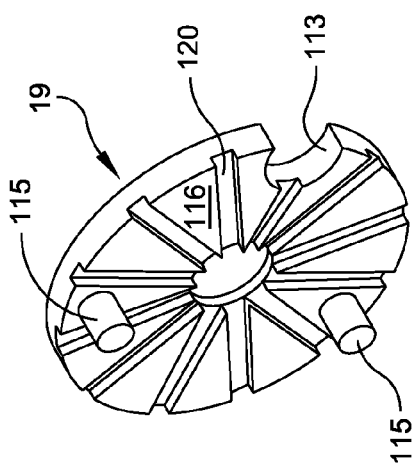
FIG. 34 is a perspective view of an embodiment of an air bleed disk of the present invention.
Figure 36:
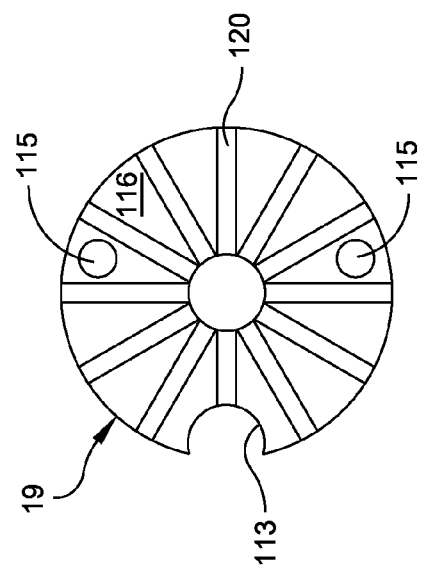
FIG. 36 is a plan view of an embodiment of a front surface of an air bleed disk of the present invention.
Figure 35:
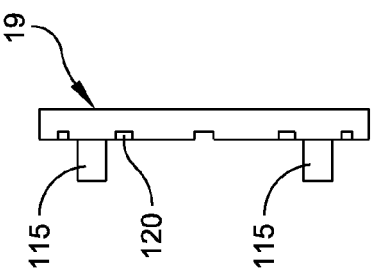
FIG. 35 is a side view of an embodiment of an air bleed disk of the present invention.
Figure 38:
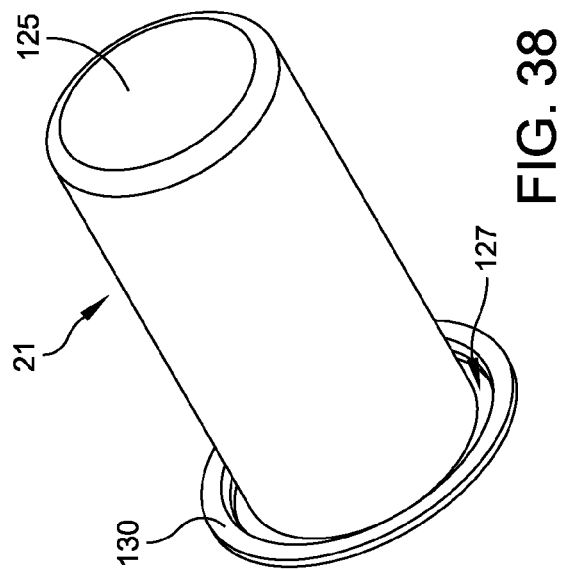
FIG. 38 is a perspective view of an embodiment of a diaphragm of the present invention.
Figure 40:
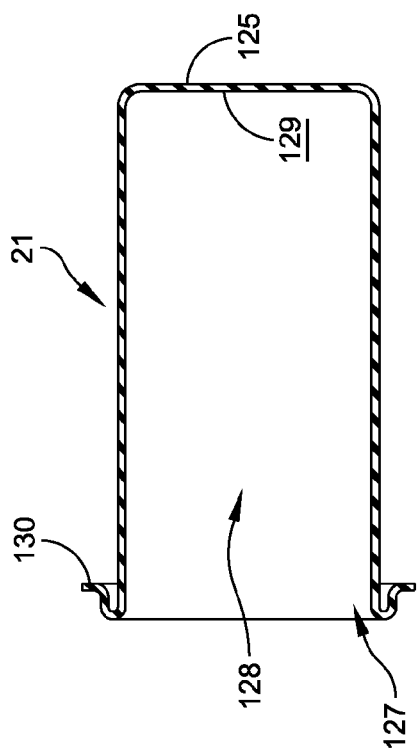
FIG. 40 is a cross-sectional view of an embodiment of a diaphragm of the present invention.
Figure 39:
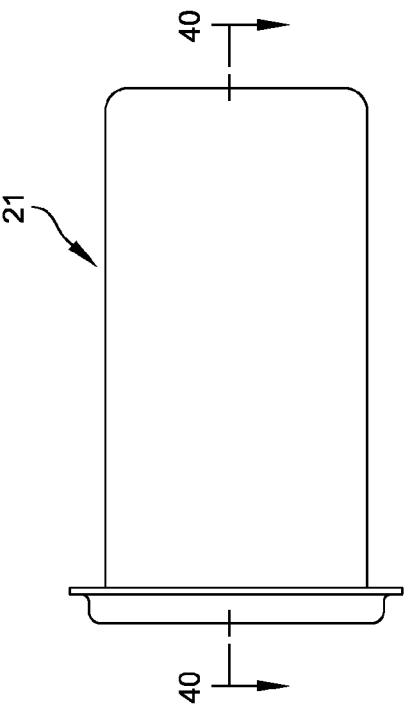
FIG. 39 is a side view of an embodiment of a diaphragm of the present invention.

Referring to FIGS. 6 and 19-29, valve assembly 15 includes a valve body 61, a valve sleeve 63, a cap 66, and a spring 67 (FIG. 6). In one embodiment, valve assembly 15 forms a spool or piston type valve as commonly referred to in the art. Valve body 61 comprises a cylindrical shape having a solid actuation end 68 with a substantially flat top surface 70, and an egress end 71 having a blind central bore 73 extending inwardly toward actuation end 68. The blind end of central bore 73 communicates with the outer surface of valve body 61 via two pair of through bores 74a, 74b that are arranged such that bores 74a are orthogonal to bores 74b (FIG. 21). At least three longitudinally spaced apart circumferential grooves 78 are defined along the outer surface of valve body 61. Grooves 78 are sized to each receive a conventional o-ring 79 (FIG. 6). Referring to FIGS. 22-23, valve sleeve 63 includes a central through bore 81 that is sized to slidingly receive valve body 61 when o-rings 79 are seated in grooves 78. Four pair of through bores 84a, 84b and 86a, 86b that are arranged such that bores 84a are arranged orthogonally to bores 84b and bores 86a are arranged orthogonally to bores 86b. Referring to FIGS. 24-29, cap 66 is cylindrically shaped with a rounded top end 90, and a countersunk open bottom end 92 that defines a shoulder 93 that is suitable for receiving an o-ring 79. A central bore 95 communicates between top end 90 and open bottom 92. A transverse groove 97 is formed diametrically in top end 90, with a central portion 98 being concavely curved so as to match the curvature of the wall that defines central bore 95.

Figure 65:
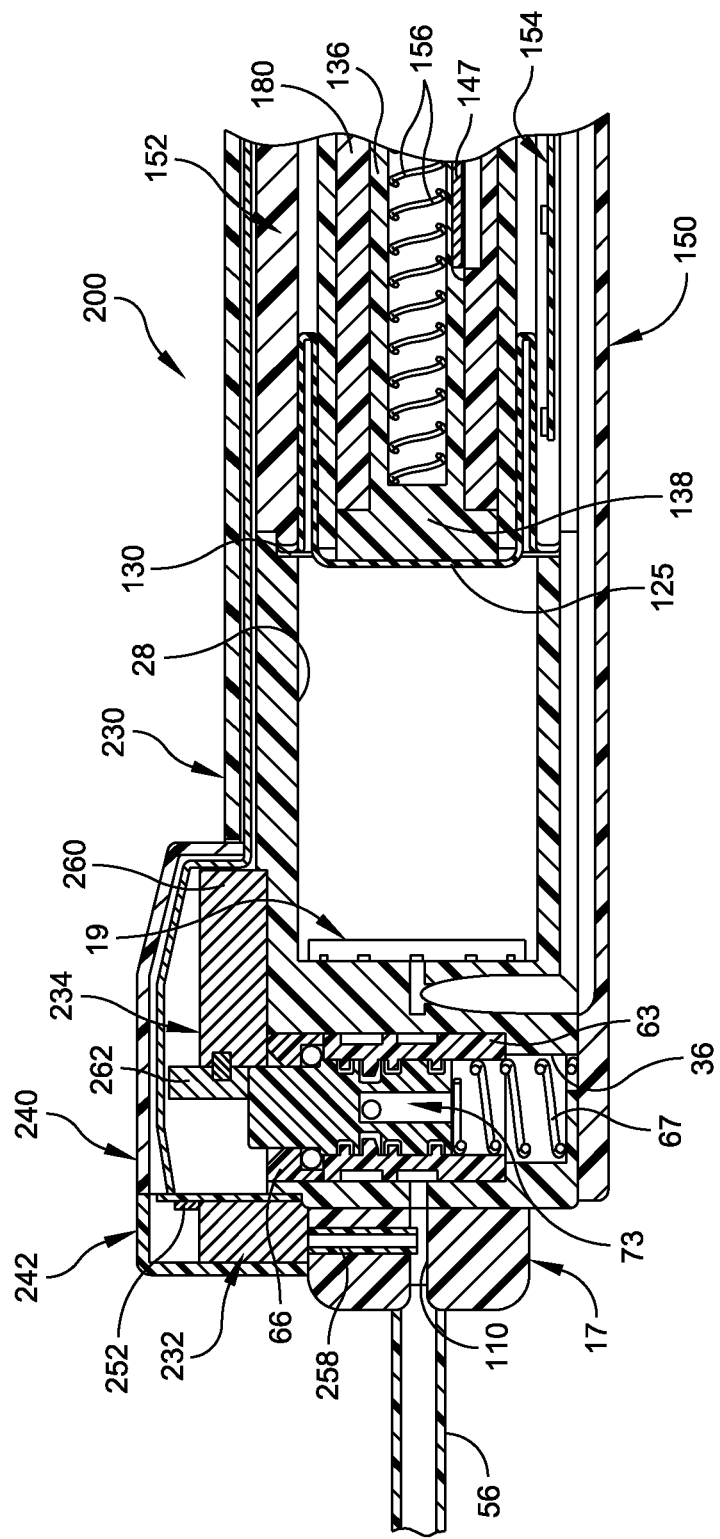
FIG. 65 is a cross-sectional view of an embodiment of a hand-held fluid dispensing module implementing the vacuum actuation assembly of the present invention.
Figure 66:
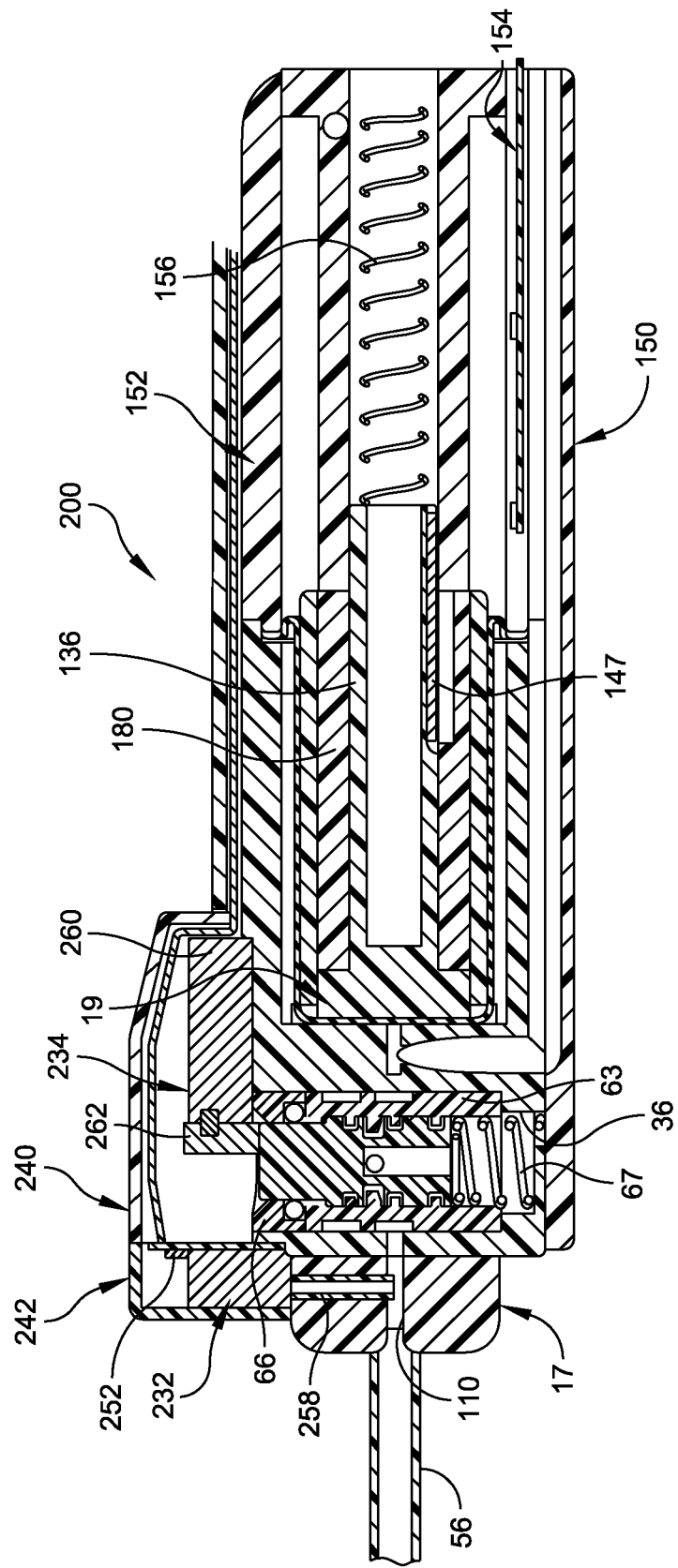
FIG. 66 is a cross-sectional view of an embodiment of a hand-held fluid dispensing module implementing the vacuum actuation assembly of the present invention.

Piston-shaped valve body 61 defines a flow regulating element that is slidably moveable within valve sleeve 63 and blind valve bore 36 between a first flow inlet position (shown, e.g. in FIG. 65) and a second flow outlet position (shown, e.g. in FIG. 66). First flow inlet position is equated to a "closed non-drinking position" with respect to drinking straw 56 while second flow outlet position is equated to an "open drinking position" allowing a user to withdraw or extract liquid from reservoir 28.

Referring to FIGS. 30-33, hub 17 comprises a cylindrical disk having a rounded top end 100, a flat bottom 102, and a circular outer surface 104. A central through bore 110 communicates between top end 100 and bottom 102, with a vacuum bore 112 communicating between outer surface 104 and central bore 110. Referring to FIGS. 34-37, air bleed disk 19 is sized and shaped so as to be mounted to interior base wall 30 within fluid reservoir 28. Significantly, air bleed disk 19 has an outer diameter that is less than the inner diameter of annular wall 34 that defines fluid reservoir 28. A circular cut out 113 is located on an edge of air bleed 19 to allow for fluid communication between common path orifice 48 and with fluid reservoir 28. A pair of pilot posts 115 project outwardly from a back surface 116 of air bleed disk 19 in complementary, corresponding position to spaced apart blind pilot bores 49 defined in interior base wall 30 of valve housing 13. A plurality of radially extending grooves 120 are defined in back surface 116 of air bleed disk 19.

Referring to FIGS. 6 and 38-40, diaphragm 21 is formed from an elastomeric material, and has a substantially hollow cylindrical shape with a closed end 125 defining an interior surface 129, and an open end 127 that communicates with an interior void 128. A flange 130 projects radially outwardly from the edge of open end 127. Diaphragm 21 is preferably formed from an elastomeric material so as to provide resilient deformation characteristics and general shape memory. Examples of some useful elastomeric resins include, without limitation, rubbers and thermoplastic elastomers. The term "thermoplastic elastomer" refers to materials which exhibit, in various temperature ranges, at least some elastomer properties. Such materials generally contain thermoplastic and elastomeric moieties. For purposes of this invention, the elastomer resin can be cross-linked or non cross-linked when used in the inventive compositions. Some illustrative examples of thermoplastic elastomers suitable for use in the invention include, without limitation, graft and block copolymers, such as random copolymers of ethylene and propylene grafted with polyethylene or polypropylene side chains, and block copolymers of *-olefins such as polyethylene or polypropylene with ethylene/propylene or ethylene/propylene/diene rubbers, polystyrene with polybutadiene, polystyrene with polyisoprene, polystyrene with ethylene-propylene rubber, poly(vinylcyclohexane) with ethylene-propylene rubber, poly(*-methylstyrene) with polysiloxanes, polycarbonates with polysiloxanes, poly(tetramethylene terephthalate) with poly(tetramethylene oxide) and thermoplastic polyurethane rubbers.

Referring to FIGS. 6 and 41-42, piston 22 includes a cylindrical shell 135, a central internal shaft 136, and cylindrical tamp plate 138. Cylindrical shell 135 has an annular wall 140 that surrounds and defines a central void 142 that communicates with an open end 144. A channel 145 is defined longitudinally in shaft 136, and is sized to receive an elongate magnetic rod 147 (FIG. 6). Cylindrical tamp plate 138 closes one end of cylindrical shell 135, and is located at an internal end of central shaft 136 so as to be arranged in spaced relation to rod 147 and open end 144. Tamp plate 138 defines a slidable rear wall for reservoir 28 which is operable to change the volumetric capacity of the reservoir based on the position of the tamp plate with respect to the closed end 54 of valve housing 13 which defines a fixed front wall. In some embodiments, top surface 139 of tamp plate 138 may be flat and smooth.

Referring to FIGS. 6 and 43-60, handle assembly 10 includes base 150, a sensor housing 152, a magnetic field sensor 154, a spring 156, an end plug 158, and a trigger plate 160. More particularly, base 150 comprises an elongate semi-cylindrical shell having a forward end 162 and a rearward end 163. A pair of parallel longitudinally arranged channels 164a, 164b are defined along a portion of inner surface 165 of base 150. Channel 164a is sized to receive fluid output line 40. One end 167a of channel 164a is located along inner surface 165 of base 150 adjacent to forward end 162, while the other end opens on to the edge of rearward end 163. Channel 164a at end 167a communicates with channel 38a defined in the outer surface of annular wall 34 of valve housing 13 of reservoir assembly 8. A channel 164b is sized to receive a fluid supply line 44. One end 167b of channel 164b is also located along inner surface 165 of base 150 adjacent to forward end 162, while the other end opens on to the edge of rearward end 163. Channel 164b at end 167b communicates with channel 38b defined in the outer surface of annular wall 34 of valve housing 13 of reservoir assembly 8.

Figure 51:
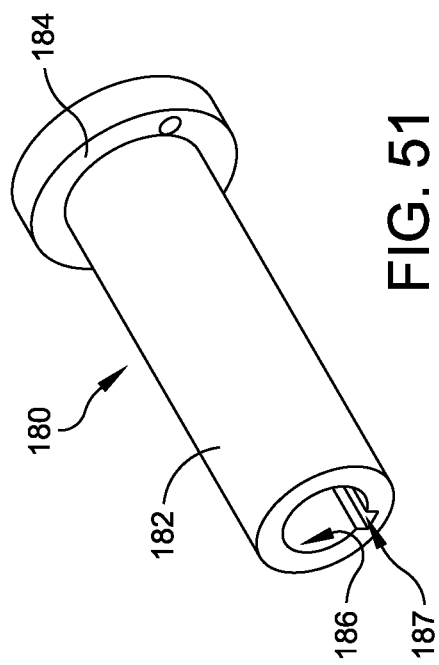
FIG. 51 is a perspective view of an embodiment of a guide sleeve of the present invention.
Figure 52:
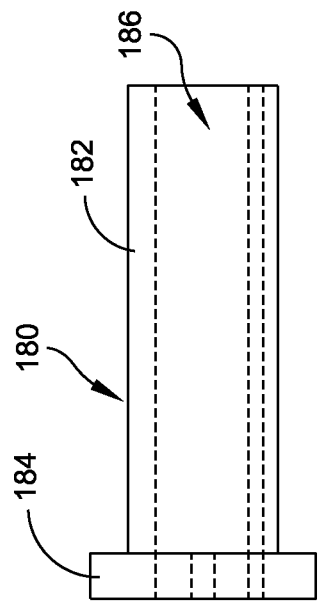
FIG. 52 is a side view of an embodiment of a guide sleeve of the present invention.
Figure 53:
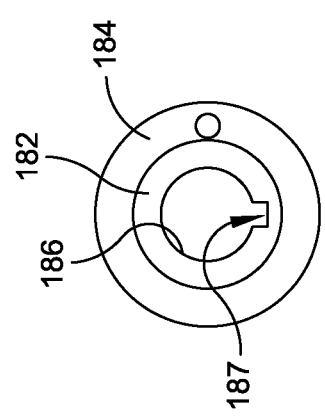
FIG. 53 is a plan view of an embodiment of a guide sleeve of the present invention.
Figure 54:
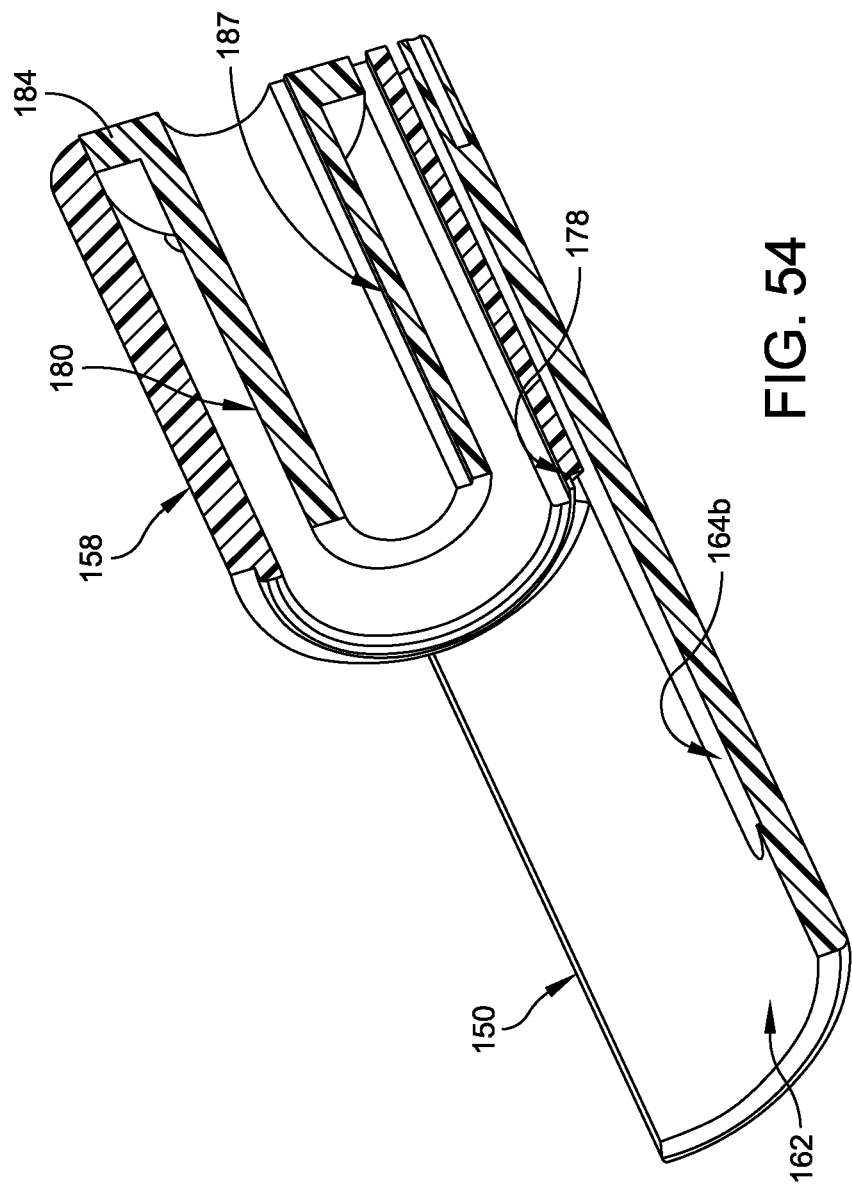
FIG. 54 is a cross-sectional view of an embodiment of a handle assembly of the present invention.
Figure 56:
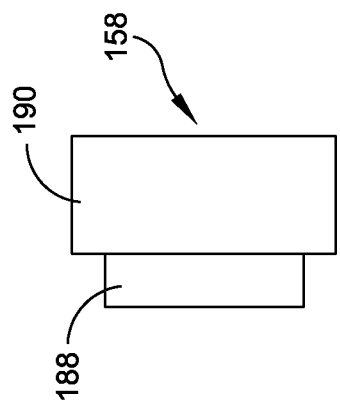
FIG. 56 is a side view of an embodiment of an end cap of the present invention.
Figure 55:
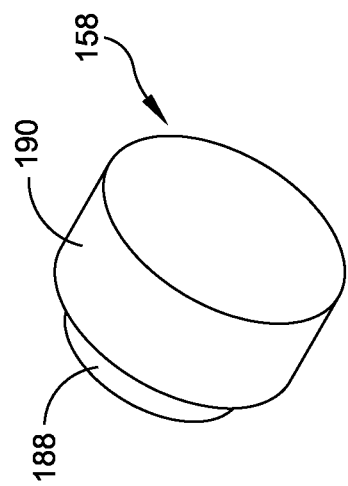
FIG. 55 is a perspective view of an embodiment of an end cap of the present invention.
Figure 58:
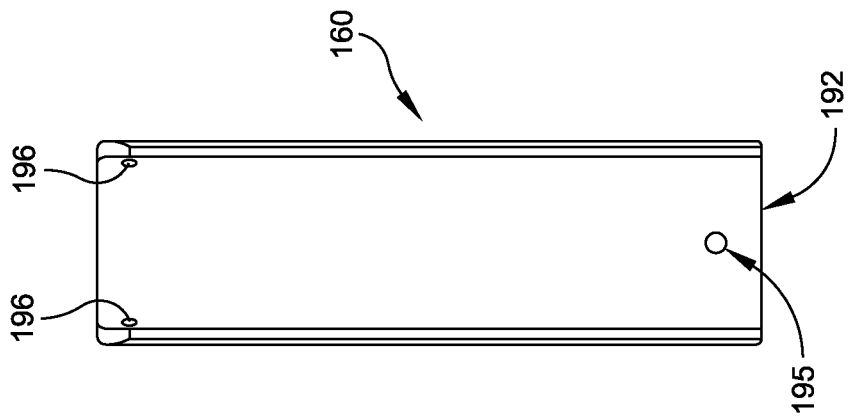
FIG. 58 is a plan view of an embodiment of a trigger plate of the present invention.
Figure 57:
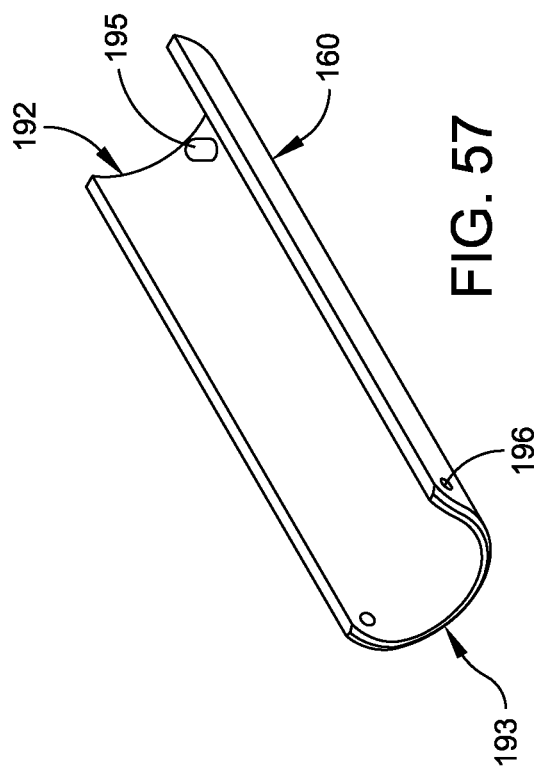
FIG. 57 is a perspective view of an embodiment of a trigger plate of the present invention.

Referring to FIGS. 6 and 47-50, sensor housing 152 defines an internal open ended void with a cylindrical wall 170, and includes a forward open end 172 and a rearward open end 173. A pair of parallel longitudinally arranged channels 176a, 176b are defined in the outer surface of wall 170. Channel 176a is sized to receive fluid output line 40, while channel 176b is sized to receive a fluid supply line 44. A longitudinal slot 178 is defined in the inner surface of wall 170 in corresponding relation to channels 176a,176b. Longitudinal slot 178 is sized so as to receive a circuit card carrying a magnetic field detector, such as Hall Effect sensor 154 (FIG. 6). A pair of diametrically opposed pivot bores 179 are defined in the outer surface of wall 170 adjacent to rearward end 173. A longitudinally oriented guide sleeve 180 is located within the void defined by wall 170, and includes a central shaft 182, and an annular flange 184 (FIGS. 51-53). Central shaft 182 defines a passageway 186 that is sized so as to slidingly receive central shaft 136 of piston 22 from one end and spring 156 from the other end (FIG. 6). A channel 187 is defined longitudinally in the interior surface of shaft 182 that defines passageway 186 (FIG. 54) that is sized to allow for sliding clearance of elongate magnetic rod 147 fixed on central shaft 136 of piston 22 during operation of hand-held fluid dispensing module 2, as will hereinafter be disclosed in further detail. Annular flange 184 projects radially outwardly from a rearward end of guide sleeve 180, with a diameter that is sufficient to close end 173 of sensor housing 152. End plug 158 includes a central cylindrical post 188 and a cylindrical plug cap 190 (FIGS. 55-56). Post 188 has a diameter that is sized so as to be received within passageway 186, but large enough to provide compressive support to one end of spring 156. Plug cap 190 has a diameter that is larger than post 188. Referring to FIGS. 6 and 57-58, trigger plate 160 comprises an elongate semi-cylindrical shell having a forward end 192 and a rearward end 193 so as to be a mirror image of base 150. A valve actuation post 195 projects downwardly from the inner surface of forward end 192 when trigger plate 160 is assembled to hand assembly 10. A pair of pivot bores 196 are defined in diametrically opposed relation to one another at forward end 192.

Figure 59:
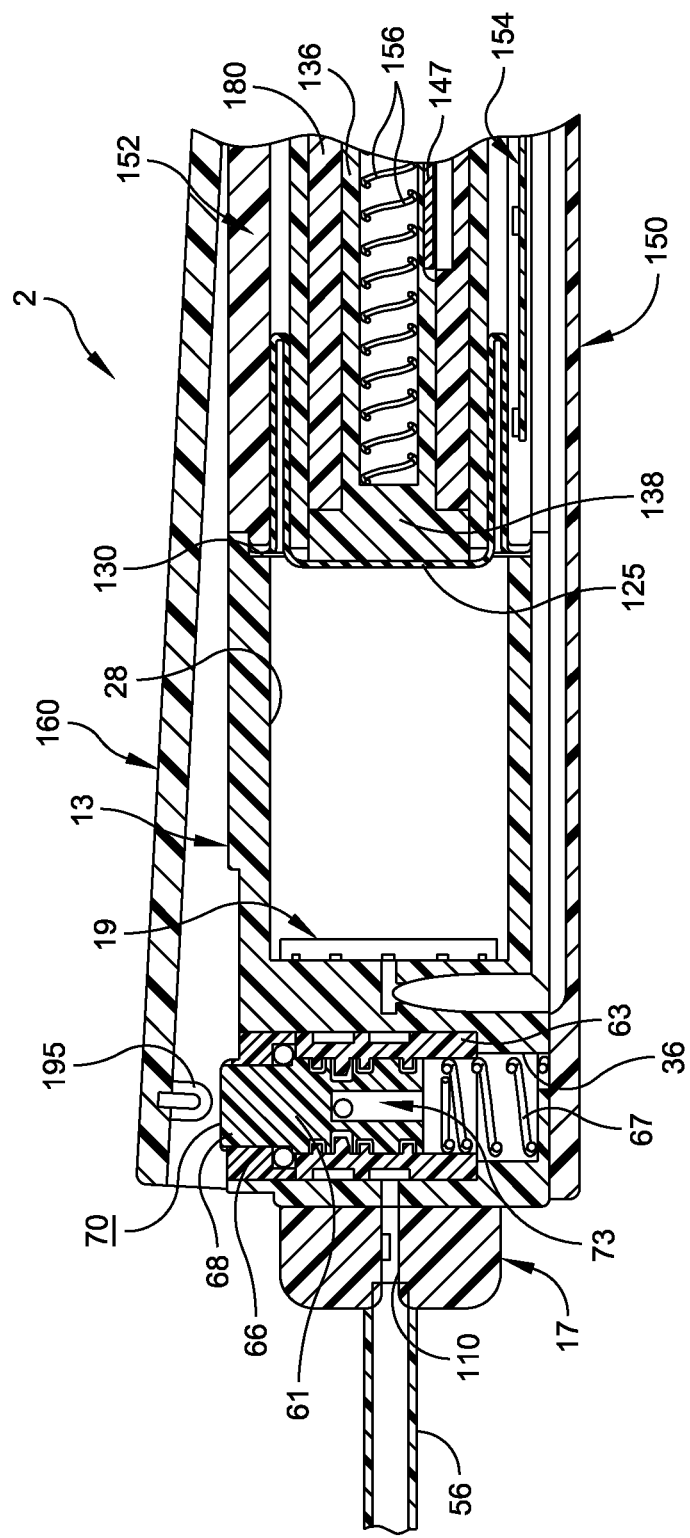
FIG. 59 is a cross-sectional view of an embodiment of a hand-held fluid dispensing module implementing the trigger plate of the present invention.

Hand-held fluid dispensing module 2 is assembled, and operated in the following manner. Referring to FIGS. 6 and 59, valve assembly 15 is first assembled within blind valve bore 36 of reservoir assembly 8. Spring 67 is first positioned at the bottom of blind valve bore 36. Valve sleeve 63 is then positioned at the bottom of blind valve bore 36 in surrounding relation to spring 67. Once in this arrangement, valve body 61 is inserted within central through bore 81 of valve sleeve 63 such that flat top surface 70 stands proud of valve sleeve 63. O-rings 79 are located within grooves 78 so as to effect a fluid seal in the valve. Cap 66 is then located above flat top surface 70 at the opening of blind valve bore 36.

Referring to FIGS. 1-6 and 59, hub 17 is then assembled to closed end 54 of valve housing 13 such that bores 110 and 52 are arranged in coaxially aligned communicating relation. A straw 56 is assembled in bore 110 at the time hand-held fluid dispensing module 2 is to be operated. It should be noted that hub 17 is oriented such that vacuum bore 112 opens upwardly in substantially parallel relation to blind valve bore 36.

Figure 60:
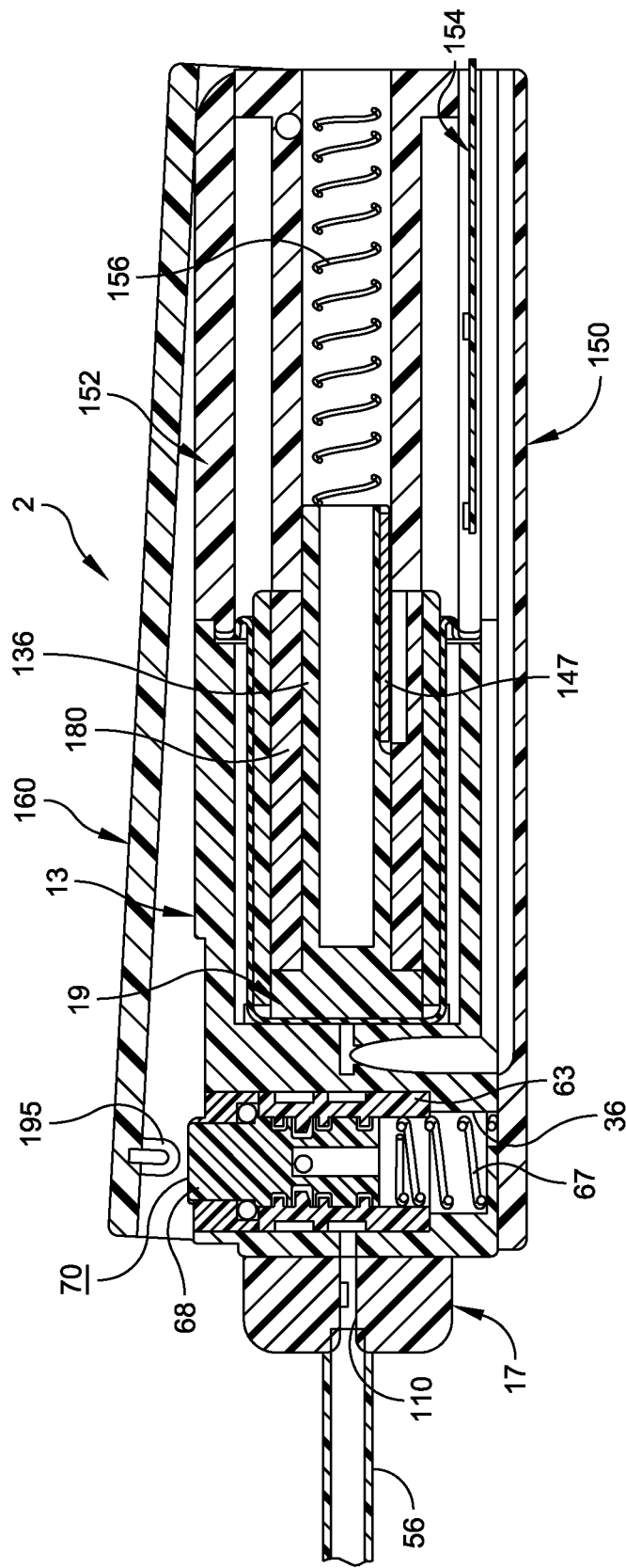
FIG. 60 is a cross-sectional view of an embodiment of a hand-held fluid dispensing module implementing the trigger plate of the present invention.

Referring to FIGS. 6 and 59-60, air bleed disk 19 is then positioned within valve housing 13 such that pilot posts 115 are located in spaced apart pilot bores 49 defined in interior base wall 30 of valve housing 13. In this arrangement, plurality of radially extending grooves 120, that are defined in back surface 116 of air bleed disk 19, are advantageously positioned adjacent to the surface of interior base wall 30 and in fluid communication with fluid supply line 44 via return port 47 defined through interior base wall 30. In addition, cut out 113 on the edge of air bleed disk 19 is arranged in coaxial surrounding relation with common path orifice 48. To complete reservoir assembly 8, diaphragm 21 is positioned within fluid reservoir 28 of valve housing 13 such that closed end 125 is located in abutting coaxial relation with air bleed disk 19. At the same time, flange 130 rests on shoulder 50 defined in the inner surface of annular wall 34 adjacent to open end 32 of valve housing 13. Once in this arrangement, and with elongate magnetic rod 147 already fixedly positioned within channel 145 of shaft 136, piston 22 is oriented so as to be positioned within interior void 128 of diaphragm 21, with top surface 139 of cylindrical tamp plate 138 engaged with bottom inner surface 129 of diaphragm 21.

Hand assembly 10 is constructed such that sensor housing 152 is positioned on inner surface 165 of base 150, and adjacent to rearward end 163. In this arrangement, central shaft of guide sleeve 180 is arranged so as to receive central internal shaft 136 of piston 22 within passageway 186 such that elongate magnetic rod 147 projects into channel 187 defined in interior surface of shaft 182 so as to allow for clearance during operation of hand-held fluid dispensing module 2. Once in this position, spring 156 is positioned within passageway 186 and retained by end plug 158 such that post 188 engages an end of spring 156. Hall Effect sensor 154 is positioned within channel 178 of sensor housing 152 so as to be disposed in spaced-apart parallel relation to elongate magnetic rod 147 and channel 187. To complete the assembly, trigger plate 160 is positioned in overlying relation to hand assembly 10 and reservoir assembly 8, and held in place via pivot pin 199 positioned through pivot bores 179 in sensor housing 152 and pivot bores 196 of trigger plate 160. Once in this position, forward end 192 of trigger plate 160 is positioned such that valve actuation post 195 is located in spaced, overlying relation to flat top surface 70 of valve body 61 within central bore 95 of cap 66.

To operate hand-held fluid dispensing module 2, the user squeezes trigger plate 160 of hand assembly 10 such that valve actuation post 195 enters central bore 95 of cap 66 as it engages flat top surface 70 of valve body 61. At the same time, spring 67 is biased as valve body 61 slides relative to valve sleeve 63. When spring 67 is in its unbiased state, through bores 74A, 74B of valve body 61 are positioned in fluid communication with bores 84A and 84B in valve sleeve 63. At the same time central bore 73 of valve body 61 provides a path for fluid communication, via the arrangement of bore 74A, 74B and 84A, 84B, with common path orifice 48 defined in interior base wall 30 so as to allow fluid to be pumped into reservoir 28.

When spring 67 is in its biased state, i.e., when the user has squeezed triggerplate 160 so that post 195 depresses valve body 61 thereby biasing spring 67, bores 74A, 74B are arranged in fluid communication with bores 86A and 86B of valve sleeve 63. In this way, fluid located within fluid reservoir 28 can be drawn through common path orifice 48, central bore 73 of valve body 61 and into narrow bore 52 and drinking straw 56. In this arrangement, as a representative example without limitation, approximately 30 milliliters of water may be resident and available for consumption by a user. Thus fluid reservoir 28 may be refreshed with cool water or another potable fluid after each dispensing of a 30 milliliter quantity to the patient.

As fluid reservoir 28 fills with fluid, closed end 125 of diaphragm 21 is forced against the outer surface cylindrical tamp plate 138 located at internal end 145 of central shaft 136 so as to be arranged in spaced relation to rod 140 and open end 144 of piston 22. As this occurs, internal shaft 136 of piston 22, which is located within passageway 186 of guide sleeve 180 moves rearwardly, biasing spring 156 and causing elongate magnetic rod 147 located within channel 187 to move rearwardly. Hall Effect sensor 154 is positioned within channel 178 of sensor housing 152 so as to be disposed in spaced apart parallel relation to elongate magnetic rod 147 and channel 187 (FIG. 59). Likewise, when internal shaft 136 of piston 22 moves forwardly, unbiasing spring 156 and causing elongate magnetic rod 147 located within channel 187 to move forwardly, the end of elongate magnetic rod 147 moves forwardly relative to Hall Effect sensor 154 (FIG. 60). In this way, the magnetic field generated by elongate magnetic rod 147 is sensed by the Hall Effect sensor 154 as the end of elongate magnetic rod 147 comes within a certain distance of Hall Effect sensor 154. Thus the movement of the end of elongate rod magnet 147 relative to Hall Effect sensor 154 may be calibrated so as to provide an accurate gauge of the quantity of fluid entering or being discharged from fluid reservoir 28.

When fluid reservoir 28 is filled with water, from time to time air may be trapped within fluid reservoir 28. Advantageously, this air is allowed to escape via return port 47 through the arrangement of radially extending grooves 120 defined in back surface 116 of air bleed disk 19. In particular, air trapped within fluid reservoir 28 will congregate adjacent to air bleed disk 19 when hand-held fluid dispensing module 2 is canted such that straw 56 is elevated above valve assembly 15. In this position, entrapped air will flow toward interior base wall 30, pass through radial groove 120 and into return port 47 for discharge via fluid output line 40 located within channel 38A.

Figure 61:
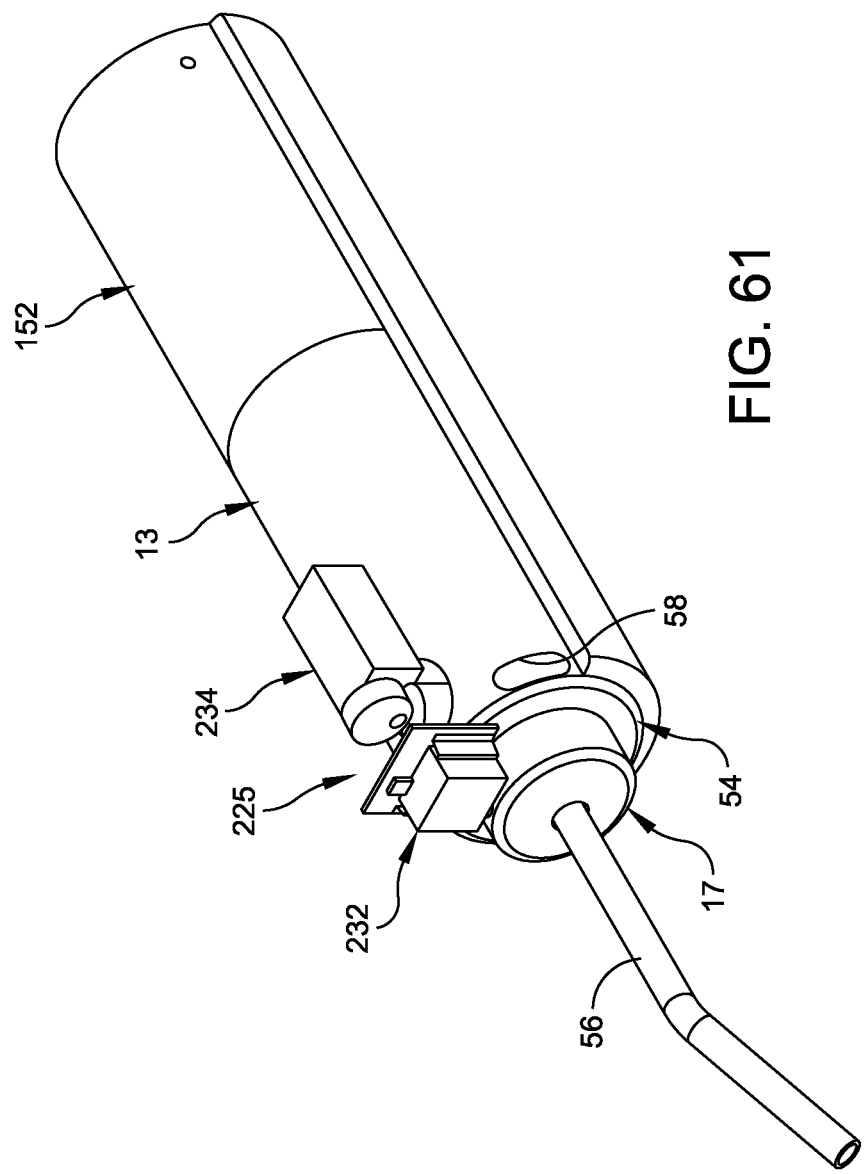
FIG. 61 is a perspective view of an embodiment of a hand-held fluid dispensing module of the present invention.
Figure 62:
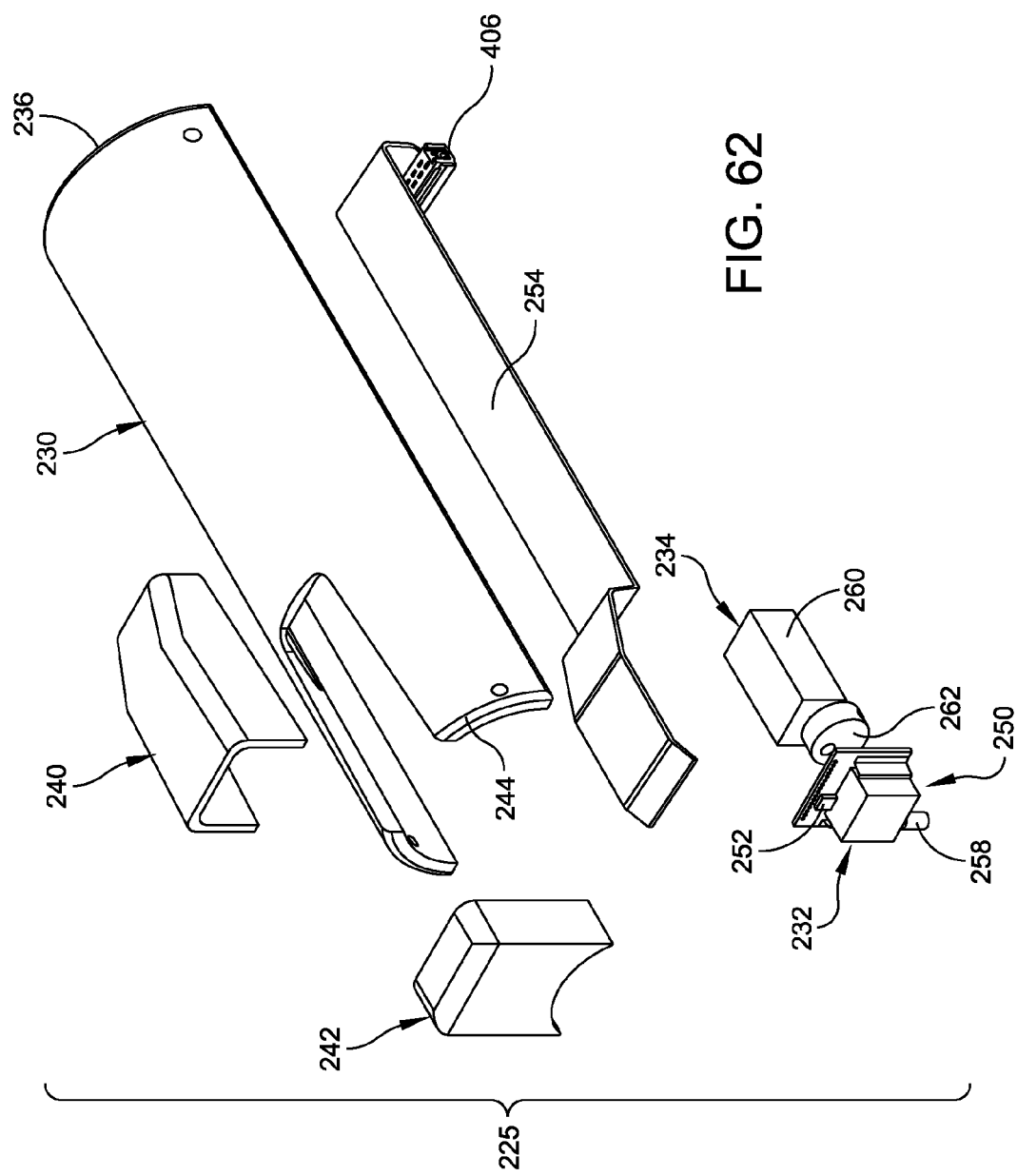
FIG. 62 is an exploded view of an embodiment of a vacuum actuation assembly of the present invention.
Figure 63:
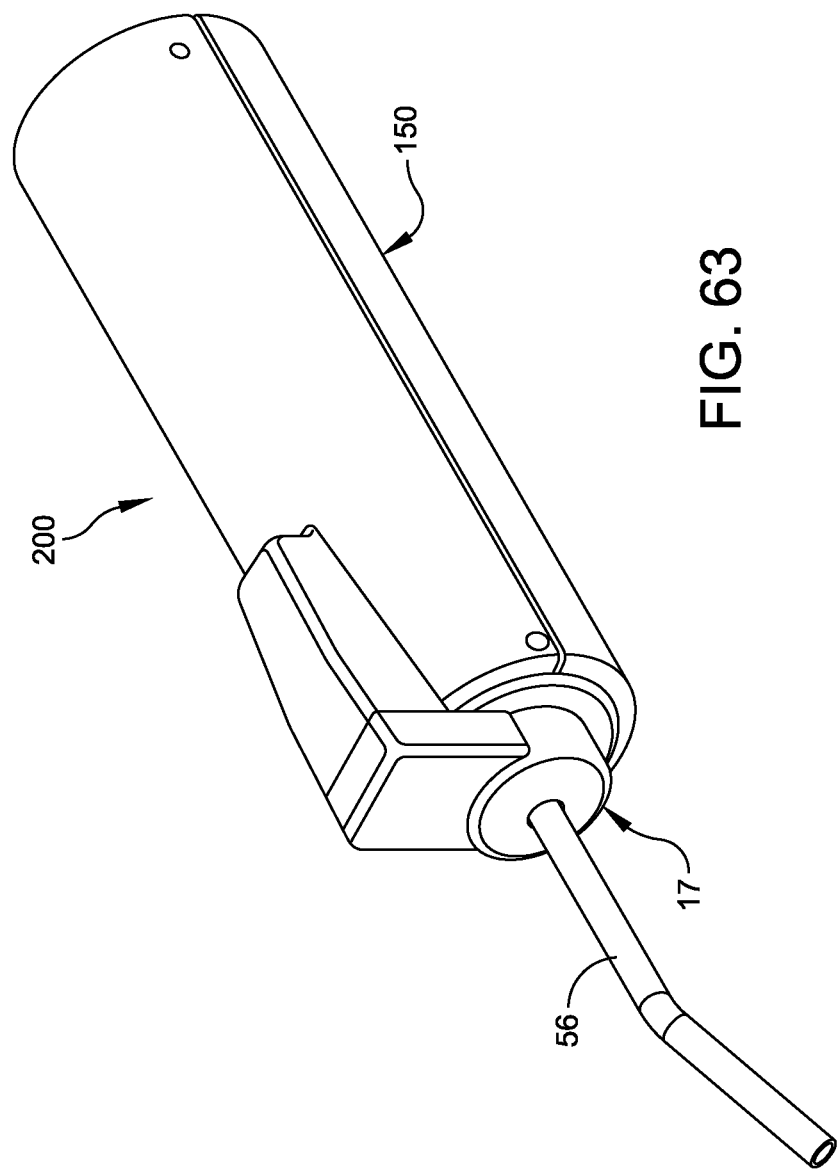
FIG. 63 is a perspective view of an embodiment of a hand-held fluid dispensing module of the present invention.

Referring to FIGS. 6 and 61-66, the main difference between the embodiments shown in FIGS. 59-60 and the embodiments shown in FIGS. 61-66 is the implementation of vacuum actuation assembly 225 instead of trigger plate 160 (FIGS. 59-60). In one alternative embodiment, a hand-held fluid dispensing module 200 that is suitable for vacuum actuated operation, trigger plate 160 is removed and a vacuum actuation assembly 225 is substituted in its place (FIGS. 61-63). In all other respects, hand-held fluid dispensing module 200 and hand-held fluid dispensing module 2 are substantially identical inasmuch as both are assembled to reservoir assembly 8 and handle assembly 10. In hand-held fluid dispensing module 200, vacuum actuation assembly 225 includes a cover plate 230, a sensor assembly 232, and a valve actuation assembly 234. Cover plate 230 comprises an elongate semi-cylindrical shell, similar to trigger plate 160, having a rearward end 236 that is substantially identical to rearward end 193 of trigger plate 160. Unlike trigger housing 160, a motor housing 240 and sensor housing 242 each project outwardly from cover plate 230 adjacent to forward end 244.

Figure 64:
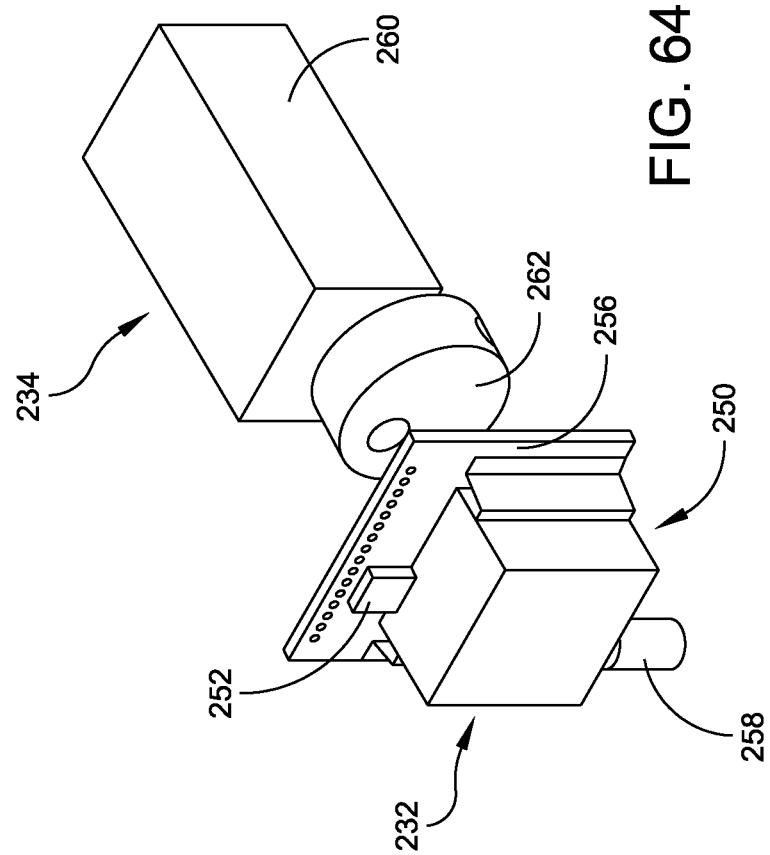
FIG. 64 is a perspective view of an embodiment of a valve actuation assembly of the present invention.

Sensor assembly 232 includes a vacuum sensor 250, an attitude sensor 252, and a cable 254 (see FIGS. 62 and 64). Vacuum sensor 250 is mounted to a printed circuit card/board 256, and includes a tube 258 that projects downwardly from an underside of the sensor. Tube 258 has an outer diameter that is sized so as to be received in corresponding vacuum bore 112 defined in circular outer surface 104 of hub 17. Attitude sensor 252 is mounted to vacuum sensor printed circuit card 256, and has the capability to sense its orientation relative to three degrees of freedom as a hand motion sensor, detecting particular hand moving patterns and orientations of hand-held fluid dispensing module 200. Attitude sensor 252 may provide attitude sensing, measuring acceleration or other physical properties of hand-held fluid dispensing module 200, e.g., position, orientation, along three orthogonal axes. Attitude sensor 252 is of the type that generates outputs that reflect the rate of change of a body's position in three-dimensional space, requiring a known initial attitude, or external information to use them to determine attitude. Data produced by attitude sensor 252 may allow for calculation or determination of hand-held fluid dispensing module 200's body attitude, position, or orientation, for example relative to vertical axis so as to prevent inadvertent dispensing of fluid when the user attempts to drink while reclining thereby preventing possible choking. Valve actuation assembly 234 includes a drive motor 260 and an eccentrically mounted cylindrical valve actuator 262 (FIGS. 62-63).

Figure 68:
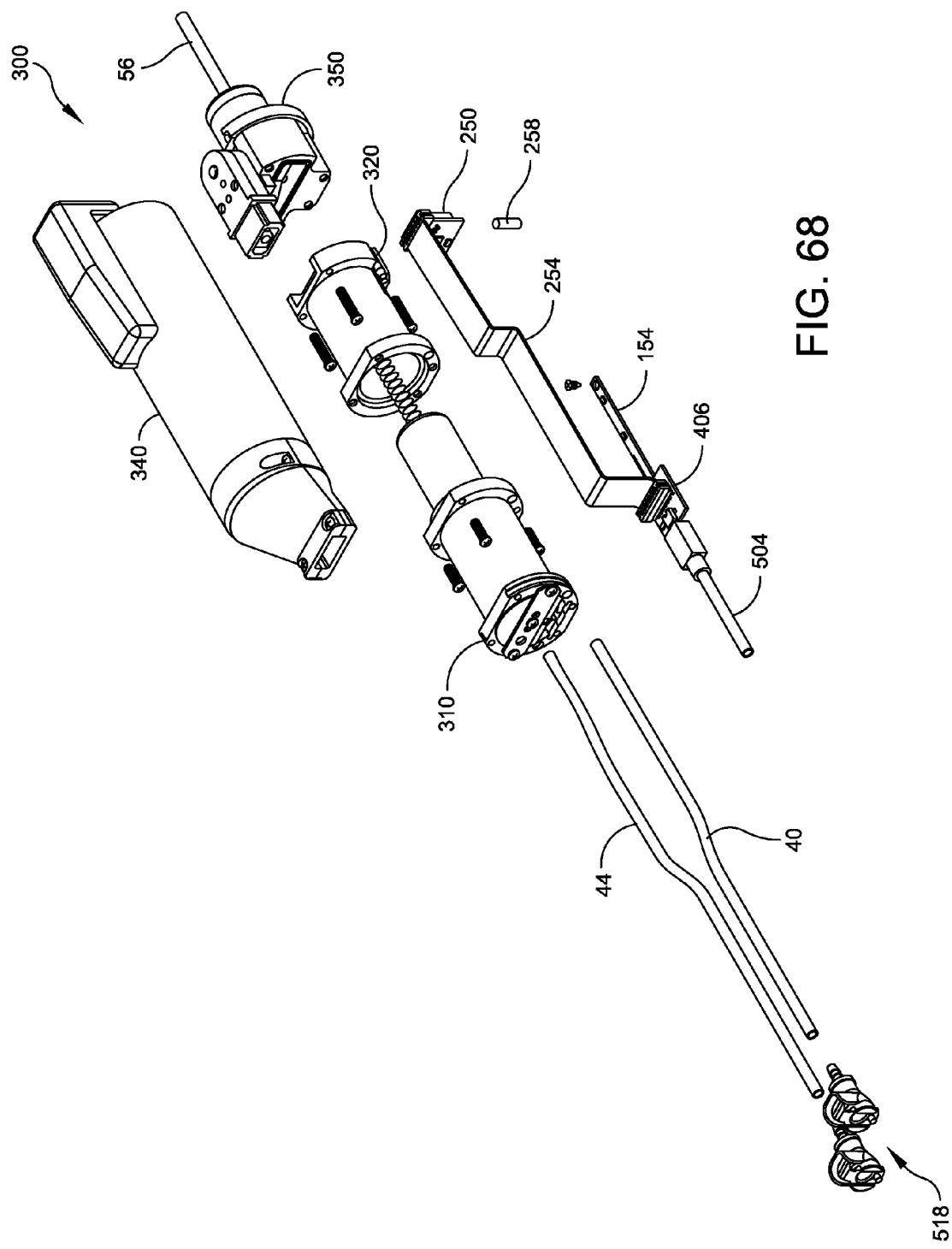
FIG. 68 is an exploded view thereof.

The operation of drive motor 260 is controlled via commands received from control module 3 through power/control cable 504, and further through cable 254 to printed circuit card 256. As shown in FIG. 68, power/control cable 504 may be electrically coupled to cable 254 in fluid dispensing module 200 via position printed circuit board 406 as shown in FIGS. 62 and 68. Position printed circuit board 406 may include sockets for electrically connecting cables 504 and 254 as shown in FIG. 68. Hall effect sensor 154 may be integrated into or otherwise connected to the printed circuit board 406, which is operative to relay data/information and control signals back and forth between card 406 and control module 520 at the base unit 500.

Hand-held fluid dispensing module 200 is assembled to a fully constructed reservoir assembly 8 and handle assembly 10 in the following manner. Vacuum sensor 250 is arranged above closed end 54 of valve housing 13 such that tube 58 is received within corresponding vacuum bore 112 defined in circular outer surface 104 of hub 17. Valve actuation assembly 234 is then positioned behind vacuum sensor 250 so as to locate valve actuator 262 in aligned relation with transverse groove 97 defined in top end 90 of cap 66. In this relation, valve actuator 262 is received within transverse groove 97 so as to engage cap 66 in the manner of a cam. Cable 254 is assembled to circuit board 256 at one end and to an appropriate connector for interconnection to control module 3. Once sensor assembly 232 and valve actuation assembly 234 are in position on valve housing 213, cover plate 230 is positioned on handle assembly 10 such that sensor assembly 232 and valve actuation assembly 234 stand proud of the top surface of cover plate 230. Once in this position, motor housing 240 and sensor housing 242 are positioned over top of sensor assembly 232 and vacuum actuation assembly 225, respectively.

Similar to FIGS. 59-60, FIGS. 65-66 show an embodiment of the present invention implementing the structure shown in FIGS. 61-64 instead of, for the most part, trigger plate 160. As shown, FIG. 65 shows an embodiment with a large storage reservoir 28 and FIG. 66 shows the same embodiment with a smaller storage reservoir 28, due to biasing and unbiasing of spring 156. Valve actuator 262 is connected to valve actuation assembly 234, Valve actuation assembly 234 receives a signal from sensor assembly 232 and, if desired, rotates valve actuator 262, which in turn applies a downward force to valve body 61. As mentioned in previous embodiments, valve body 61 has a cylindrical shape having a solid actuation end 68 with a substantially flat top surface 70, and an egress end 71 having a blind central bore 73 extending inwardly toward actuation end 68.

In operation, when the user draws a vacuum through straw 56, a corresponding vacuum is formed within tube 258. Upon sensing the reduction in pressure, vacuum sensor 250 provides a signal to valve actuation assembly 234. As this occurs, valve actuator 262 rotates within transverse groove 97 of cap 66. Due to the eccentric mounting of valve actuator 262, as it rotates, it provides a camming action to cap 66 which biases spring 67 by depressing valve body 61 within valve sleeve 63. Once valve actuator 262 has rotated, it exits contact with cap 66, thus relieving pressure on valve body 61, thereby ceasing flow of fluid from reservoir 28. The user then draws fluid through straw 56 as disclosed hereinabove. As the foregoing is occurring, attitude sensor 252 monitors the positional orientation of hand held fluid dispensing module 200 so as to block movement of valve actuator 262 whenever hand held fluid dispensing module 200 is oriented in such a way as to risk a surge of fluid (under force of gravity) into the mouth of the user, thereby preventing choking or spillage.

In some embodiments, vacuum sensor printed circuit card 256 may include an accelerometer sub-system which is a designed safeguard intended to potentially prevent lung aspiration by locking-out the fluid dispensing or access valve 15 or 350 when the patient is lying down. The accelerometer 602 (see, e.g. FIG. 69) may be a commercially available semiconductor chip commonly used in cell phones (e.g. Freescale Semiconductor Part No.: MMA7660FCR1). The accelerometer 602 uses an industrial standard two wire communication protocol (I2C) to send and receive information from the microprocessor 600. Information that can be read from the accelerometer 602 includes X, Y, and Z axis acceleration, tilt plane (top, front, side), shake detect, and tap detect. Accelerometer 602 may be located on vacuum sensor printed circuit card 256 in some embodiments near the straw 56 end of the fluid dispensing module 2, 200, or 300 preferably just above the longitudinal axis LA (centerline) of fluid dispensing module, which may be on the same pc board as the vacuum sensor 250 (see also FIG. 64).

The primary purpose of the accelerometer 602 is to prevent the hand-held fluid dispensing module from being used if the detected longitudinal axis LA of the module is below a predetermined arbitrary angle from horizontal which has been pre-programmed into the microprocessor memory. The valve 15 or 350 which allows liquid such as water to be sucked from the fluid dispensing module 2, 200 or 300 through the straw 56 is motor driven and controlled by the microprocessor 600 (see FIG. 80), as described herein. The normal preferred drinking position of fluid dispensing module 2, 200, or 300 is vertical or relatively close to vertical. When the microprocessor 600 detects a vacuum (suction) from the vacuum sensor 250 it checks the longitudinal position or orientation of the fluid dispensing module with respect to horizontal. If the fluid dispensing module is tilted above the arbitrary angle with respect to horizontal pre-programmed into the microprocessor memory, the microprocessor 600 turns on the valve motor 260/410 which positions the valve 15/350 to an open drinking position (i.e. vane assembly 400 is positioned in the second flow outlet position shown in FIG. 75) by operation of valve motor 410 to allow the user to access and draw water through the straw 56 from reservoir 28 in a manner described herein.

Conversely, if the fluid dispensing module is tilted below the arbitrary angle with respect to horizontal pre-programmed into the microprocessor memory, the microprocessor 600 may either (1) if the user is already drinking, turn on valve motor 260/410 to position valve 15/350 to a closed non-drinking position with respect to drinking straw 56 (i.e. vane assembly 400 is positioned in the first flow inlet position shown in FIG. 76) to prevent the user from continuing to draw water through the straw 56 in a manner described herein, or (2) if the user has not started drinking but is attempting to, the microprocessor prevents valve motor 260/410 from actuating to prevent the vane assembly from moving out of the first flow inlet position shown in FIG. 75 (i.e. closed non-drinking position) to the second flow inlet position shown in FIG. 76 (i.e. open drinking position). In either case, the accelerometer 602 potentially prevents lung aspiration by locking-out the fluid control valve 15/350 for drinking when the patient is lying down.

A second potential use of the accelerometer 602 is to help prevent accidental opening of the valve when the sensed vacuum is not from suction. The vacuum sensor is near the base of the straw and the straw is filled with water. A rapid movement of the hand-held fluid dispensing module 2, 200 or 300, in the longitudinal axis LA or centerline, causes the captured water to move toward the straw opening causing a vacuum at the vacuum sensor input. While the captured water does not leave the straw, it does move towards the end of the straw. Because the arbitrary level of vacuum, which indicates an applied suction, is low a sudden movement of the fluid dispensing module causes a vacuum equal to the value when suction is applied. If the microprocessor 600 opened the valve some water would be released causing a wet spot. To avoid this false opening the acceleration is monitored when a vacuum is sensed. If the fluid dispensing module is accelerating/decelerating the microprocessor does not open the valve.

A third potential use of the accelerometer 602 is for the user to communicate with the microprocessor 600 through the shake detect and or the tap detect feature. If the fluid dispensing module has a fault, it turns on a red LED which can be reset by pushing a button on the unit. The shake/tap can be used by someone not able to reach the base unit to reset the fault. In situations where the HydroCare Unit is used with a WiFi connection back to a centrally monitored, a shake/tap could signal the station that the user requests help.

Referring now to FIGS. 1-5, hand-held fluid delivery assemblies 2 and 200 are electrically interconnected to base unit 500 and pitcher assembly 6 via control/power cable 504, control module 3 and optional cooling module 4. Control module 3 includes conventional electronics and microprocessor based control systems for providing logic operations and data collection/transmittal associated with operating the fluid delivery system, monitoring and reporting the volume of liquid sensed by Hall effect sensor 154 in reservoir 28, as well as providing electromotive force to the systems interconnected with printed circuit card 256. Cooling module 4 is located within pitcher assembly 6 and also includes a pump 506 for drawing liquid from pitcher assembly 6 in response to actuation of hand held fluid delivery assemblies 2 and 200. Pump 506 may be the same as pump 514 in some embodiments, which is further described herein.

Figure 67:
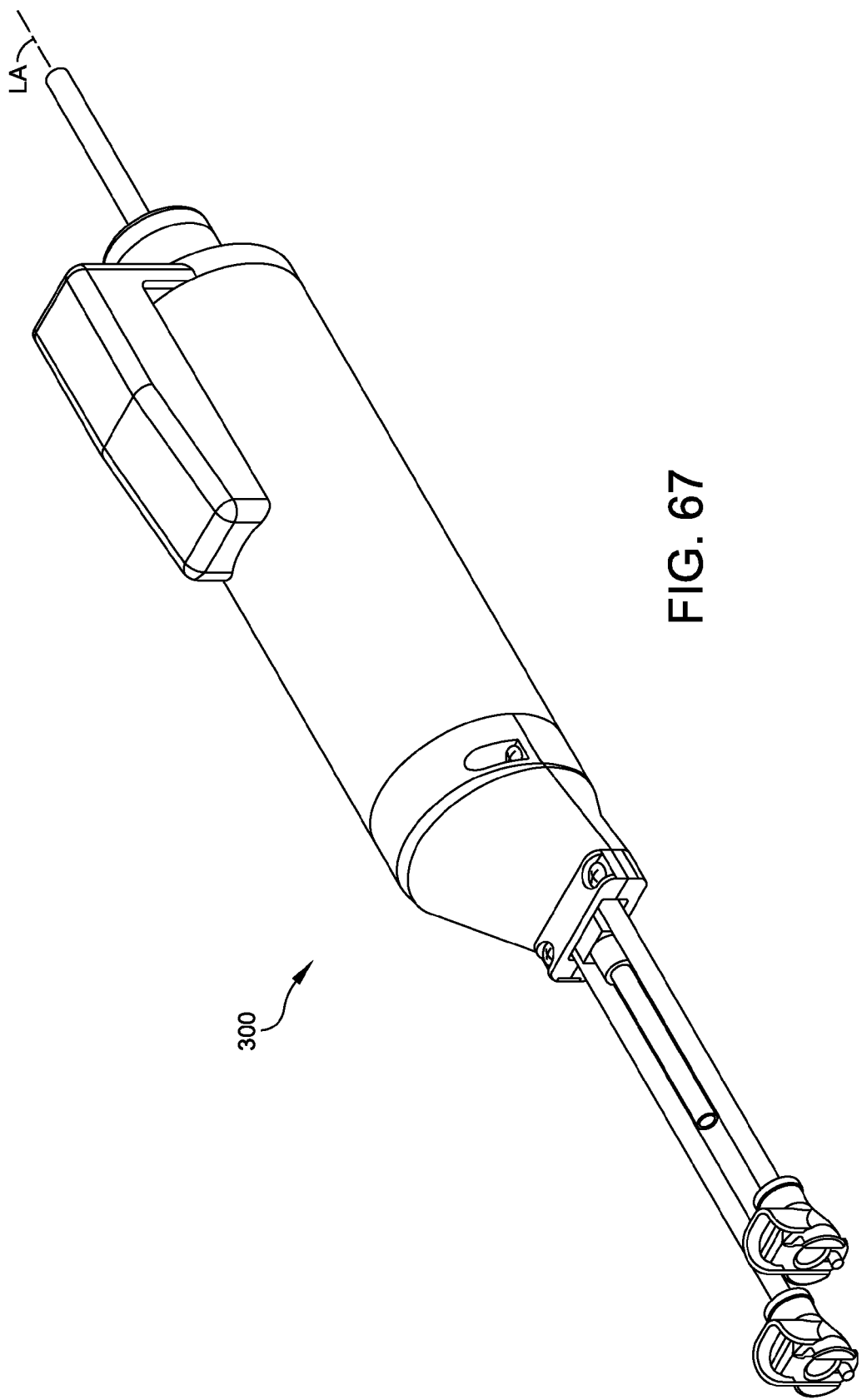
FIG. 67 is a perspective view of an alternative embodiment of a hand-held fluid dispensing module according to the present invention.

Similarly, control module 520 shown in FIG. 80 includes the same conventional electronics and microprocessor based control system for controlling operation of base unit 510 components and fluid dispensing module 300 (see FIG. 67). In one embodiment, the control system may include a control logic programmable microprocessor 600 with accessible suitable volatile (e.g. RAM) and non-volatile memory. Microprocessor 600 may be configured to transmit, receive, and/or store data and operation/information signals. Microprocessor 600 which may be connected to a wired or wireless communication infrastructure (e.g., a communications bus, crossover bar, local area network (LAN), or wide area network (WAN)). Microprocessor 600 is programmable with control logic steps or instructions (i.e. computer program code) to form a special purpose processor for performing processor-based functions which are particularly adapted to the hydration system described herein. In some embodiments, microprocessor 600 may be configured to run a multi-function operating system.

The control logic may be programmed and stored on a conventional computer-readable medium that is accessible to microprocessor 600. In some embodiments, without limitation, the computer-readable medium may be any suitable non-volatile memory include read-only memory (ROM), USB flash memory, and magnetic data storage devices (e.g. internal/external hard disks, floppy discs, magnetic tape CD-ROM, DVD-ROM, optical disk, ZIP™ drive, Blu-ray disk, and the like, which may written to and/or read by microprocessor 600.

The control system may also include conventional communication interfaces. Communications interfaces allow software and data to be transferred between microprocessor 600 and external devices. Examples of communications interfaces that may be provided include without limitation a modem, a network interface (such as an Ethernet or wireless network card), a communications port, a Personal Computer Memory Card International Association (PCMCIA) slot and card, bar code reader, USB, Blue Tooth, or the like. Software and data transferred via communications interface are in the form of signals which may be electronic, electromagnetic, optical, or any other signal capable of being received by the communications interface. These signals are provided to communications interface via a communications path or channel. The path or channel that carries the signals may be wired or wireless and implemented using wire or cable, fiber optics, a telephone line, a cellular link, a radio frequency (RF) link, or the like.

The control system may further include various drivers for controlling operation of the hydration system components described herein, displays, etc.

Alternative Fluid Dispensing Module Embodiment

Figure 69:
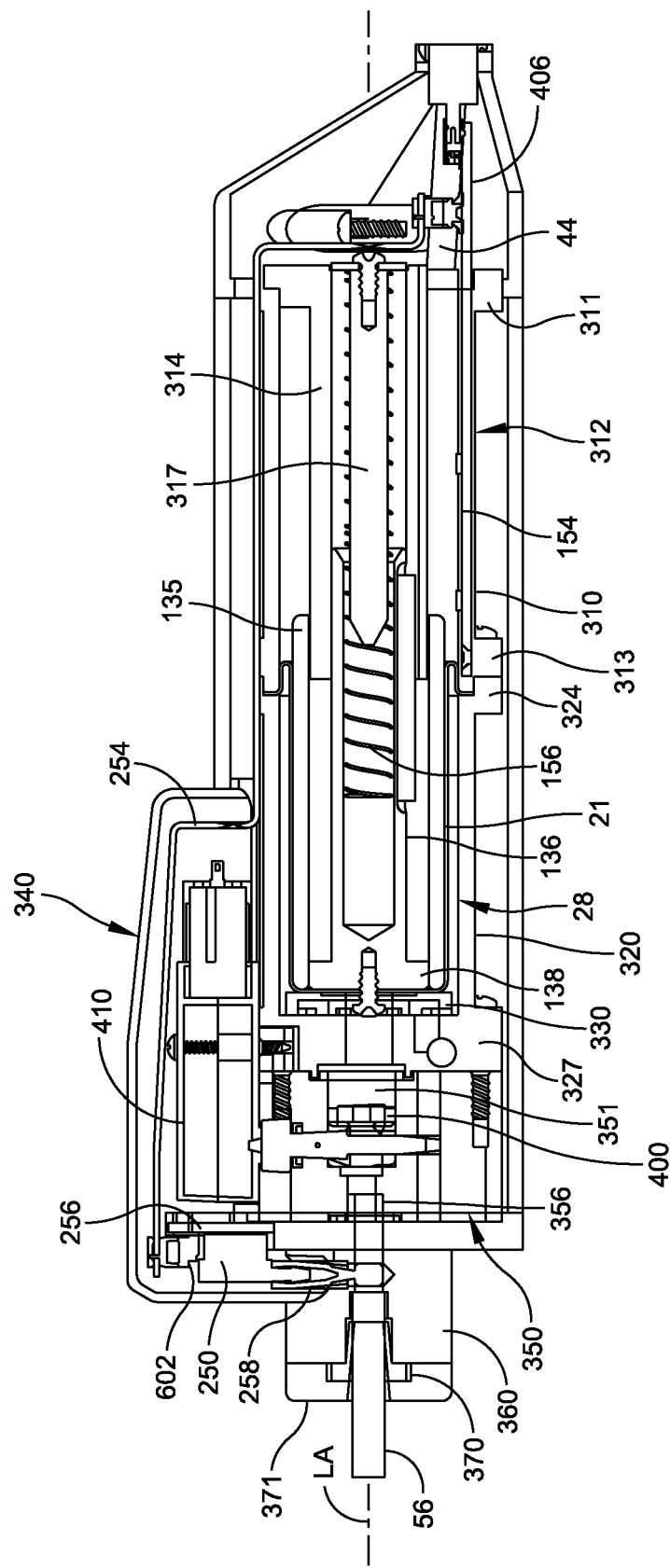
FIG. 69 is cross-sectional side view thereof.

FIGS. 67-69 show an alternative embodiment of a vacuum actuated hand-held fluid dispensing module 300. Fluid dispensing module 300 is similar to assembly 200 shown in FIGS. 61-66, and functions in a similar manner. When a user starts to draw or suck on the straw 56 to obtain fluid from reservoir 28, a corresponding vacuum is formed therein which is detected by vacuum sensor. The vacuum sensor 250 detects the vacuum and opens a valve in fluid communication with the straw and reservoir to allow fluid to be drawn by the user through the straw.

In the embodiment shown in FIGS. 67-69, a fluid access vane valve 350 is provided instead of a spring-loaded piston or spool type valve assembly 15 (see, e.g. FIGS. 6 and 65) to regulate dispensing of the fluid to the user and refilling the reservoir 28 in fluid dispensing module 300.

Fluid dispensing module 300 generally includes vane valve 350, reservoir assembly 320, piston assembly 310, and enclosure 340 as shown in FIGS. 67-69.

Figure 70:
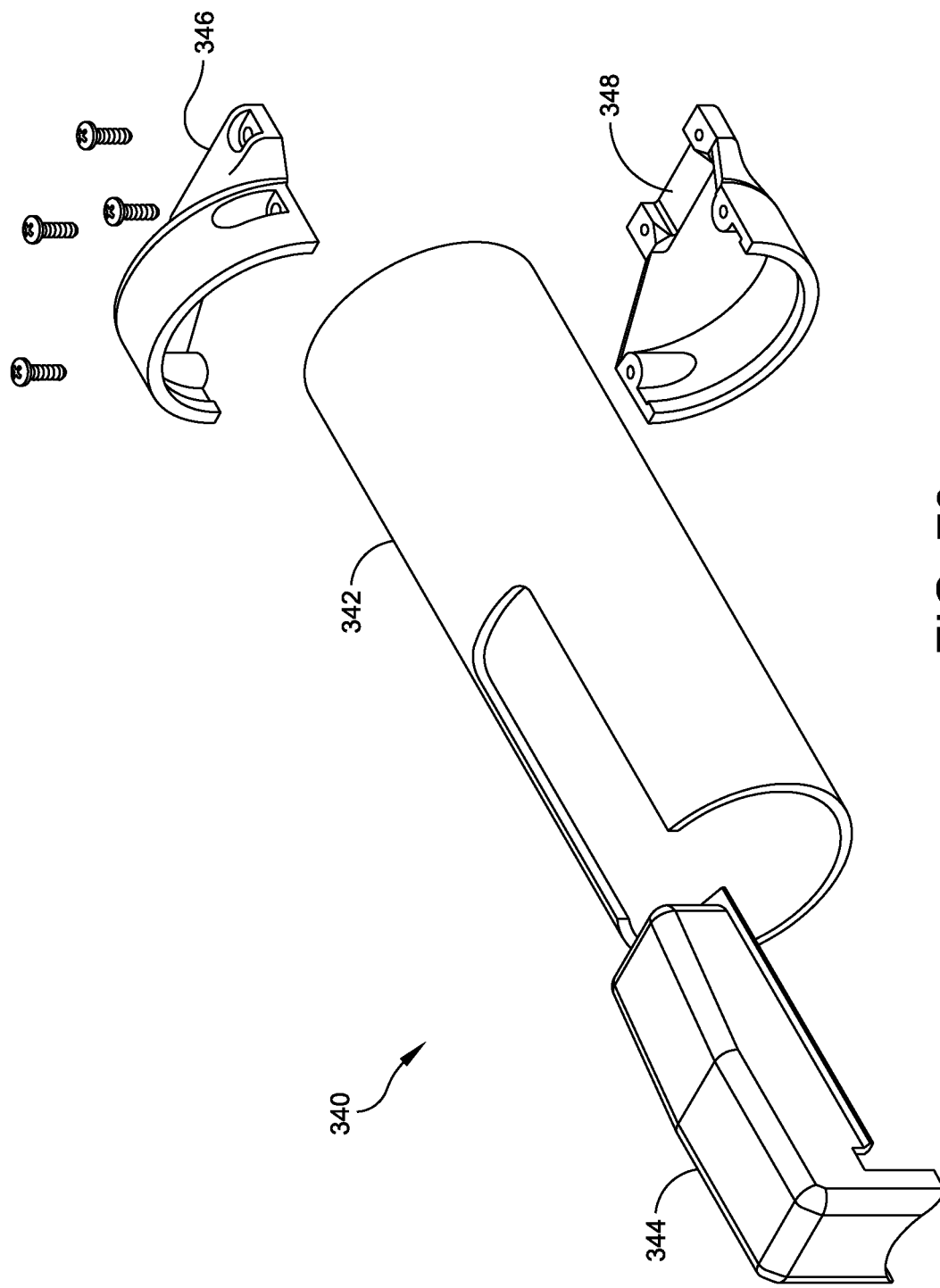
FIG. 70 is an exploded view of a housing thereof.

Enclosure 340 houses and encloses the foregoing components to provide protection from the environment and forms the main housing for fluid dispensing module 300. In one embodiment, as shown in FIG. 70, enclosure 340 may include a cylindrically shaped hollow outer sleeve 342, upper rear shell 346, lower rear shell 348, and motor cover 344. Outer sleeve 342 to is the primary portion of fluid dispensing module 300 that is intended to be held by a user, and preferably has a diameter that may be comfortably grasped by the user. Upper and lower rear shells 346, 348 may be connected together and mounted to the rear of outer sleeve 342 via suitable fasteners, including for example without limitation screws, bolts, rivets, interlocking tabs and slots, adhesives, or other suitable means. Motor cover 344 is intended to cover and protect the valve motor 410, vacuum sensor 250, and related electronics.

In one embodiment, enclosure 340 may be made of a suitable plastic including those specifically mentioned herein or other materials and combination of materials. Non-slip surface features (e.g. ribbing, grooves, etc.) or elastomeric inserts may be co-molded with outer shell 342 for a comfortable and non-slip outer gripping surface in some embodiments.

Vane valve 350 is mounted on a forward end of reservoir assembly 320 and is in fluid communication with reservoir 28, which in this embodiment, is located inside the reservoir assembly. Reservoir assembly 320 is in turn mounted to piston assembly 310 and piston 22 therefore is slidably received within the reservoir assembly.

Figure 71:
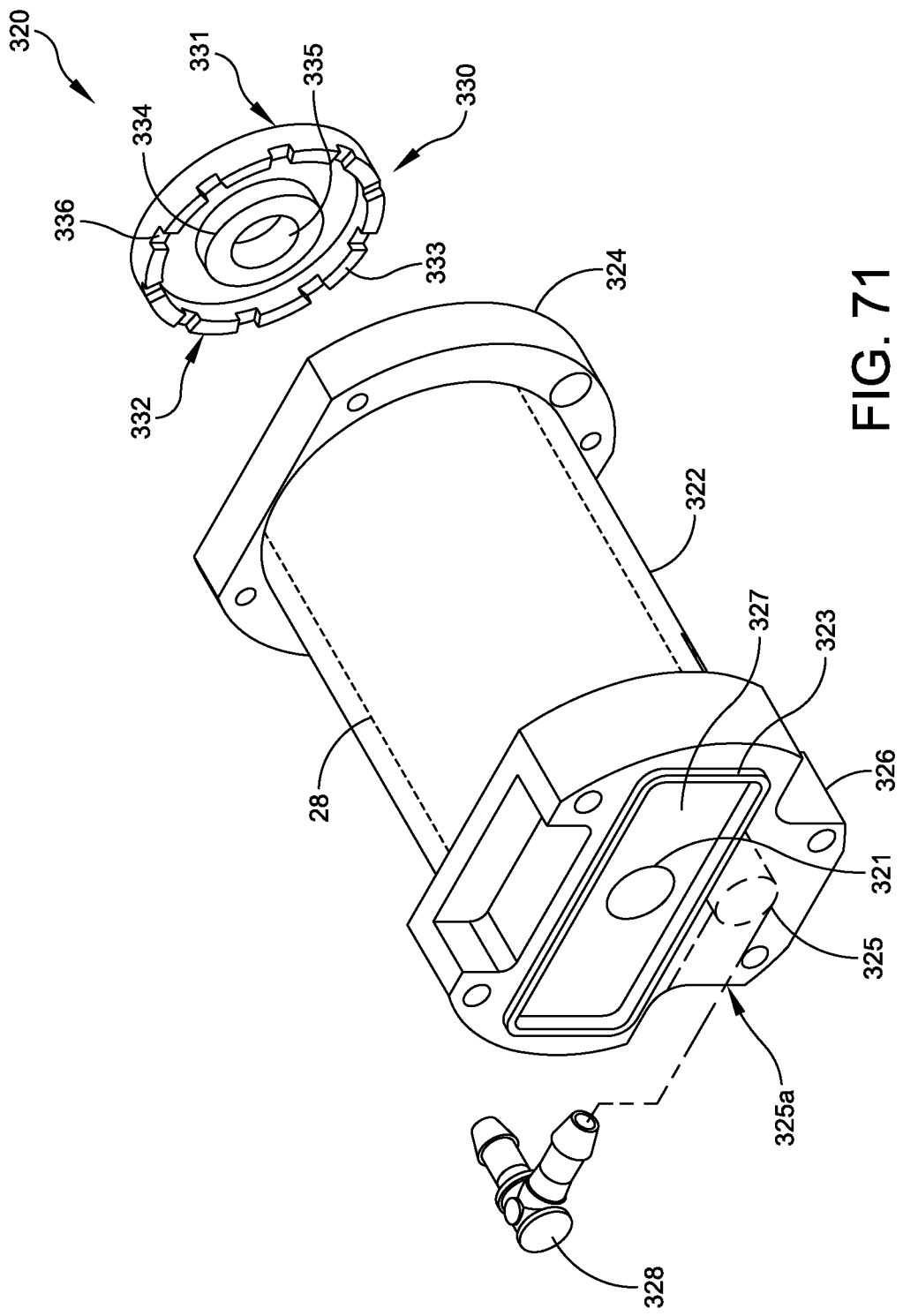
FIG. 71 is an exploded view of a reservoir assembly thereof.

Referring to FIG. 71, reservoir assembly 320 includes an open tubular shaped body 322 having a diametrically enlarged rear flange 324 and forward flange 326. Body 322 defines an axially extending bore that forms reservoir 28. Rear flange 324 mates with a forward flange 313 on piston assembly 310 (see FIG. 72) and is removably mountable thereto. Forward flange 326 mates with the rear of valve body 352 of vane valve 350 (see FIG. 73) and is removably mountable thereto.

Figure 78:
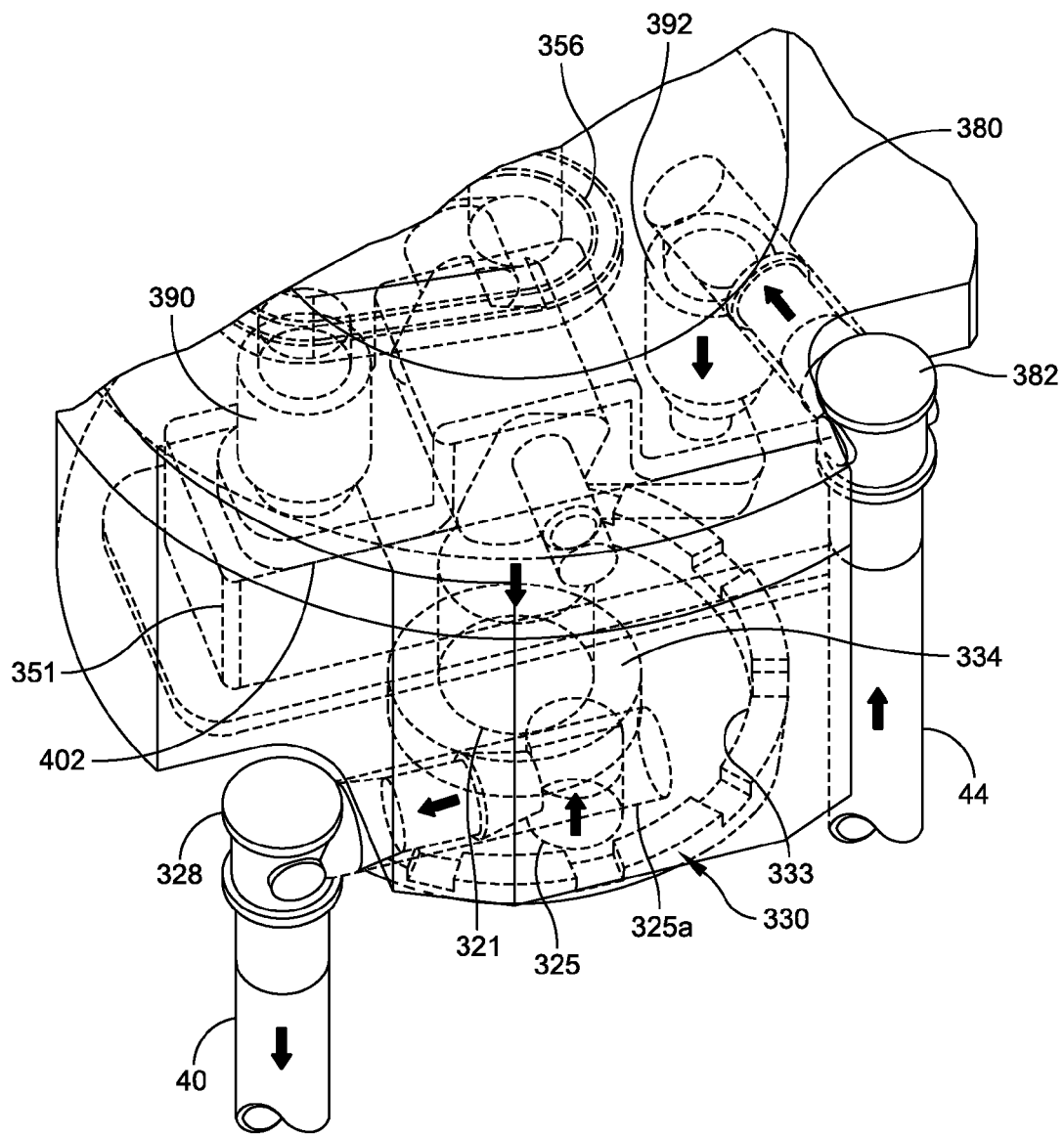
FIG. 78 is a partial perspective phantom bottom view of the dispensing end of the fluid dispensing module of FIG. 67.

The rear end of reservoir assembly 320 is preferably fully open to receive piston 22 therein. In one embodiment, as shown in FIGS. 71 and 78, the forward end of reservoir assembly 320, and more particularly forward flange 326, may be generally closed for the most part forming a generally flat blind front wall 327 that closes off the front of reservoir 28, with two exceptions for openings. Front wall 327 defines a first orifice or port in the form of a common path flow orifice 321 that is in fluid communication with reservoir 28. Fluid may flow in two opposing directions through orifice 321 depending on whether the reservoir 28 of reservoir assembly 320 is being filled from the main fluid storage container such as pitcher assembly 6, or whether a user is drawing liquid via straw 56 from the reservoir. Orifice 321 may preferably extend completely through and fully penetrates front wall 327 of reservoir assembly 320. In one preferred embodiment, as shown, orifice 321 may be centrally located on the axial centerline of reservoir body 322. Orifice 321 forms a common fluid pathway for both (1) filling reservoir 28 with liquid from the main fluid storage container such as pitcher assembly 6 (see FIGS. 1-2) via fluid supply line 44, and (2) withdrawing liquid from reservoir 28 when a user sucks on straw 56 to take a drink. Both of these fluid pathways are under the control of vane valve 350.

In a preferred embodiment, with reference to FIGS. 71 and 78, front wall 327 of reservoir assembly 320 further defines a second orifice or port in the form of a return flow port 325 which is in fluid communication with reservoir 28 and forms a fluid pathway for returning liquid and/or air purged from reservoir 28 either when initially filling the reservoir with fluid from pitcher assembly 6 via fluid output or return line 40, or for periodic recirculation and refreshment of the liquid stored in reservoir 28 with fresh liquid after the initial filling. In one embodiment, return flow port 325 extends axially forward from reservoir 28 for distance only partially through forward flange 326, but preferably does not penetrate front wall 327 of reservoir assembly 320. A laterally aligned bore 325a extends radially through forward flange 326 from an exterior lateral side and intersects return flow port 325 to fluidly couple reservoir 28 to the exterior of reservoir assembly 320. A tubing fitting 328 is insertable into lateral bore 325a and has a free end that may be connected to fluid return line 40 (see FIG. 78).

With continuing reference to FIG. 71, front wall 327 further defines an axially raised sealing protrusion 323 that extends in a forward direction from the exterior surface of the front wall. Raised sealing protrusion 323 mates with and is insertable into a complementary configured and dimensioned recessed sealing groove 355 formed in the rear end 354 of vane valve body 352 (see FIG. 74). Sealing groove 355 is associated with and formed around an inlet flow chamber 351 in vane valve body 352. When raised sealing protrusion 323 is fully inserted into recessed sealing groove 355, front wall 327 of reservoir assembly 320 abuts rear end 354 of vane vale body 352 and the sealing protrusion establishes a leak-resistant seal around inlet flow chamber 351 (see also FIG. 75). The exterior surface of front wall 327 forms a rear wall of flow inlet chamber 351 in the valve body when the reservoir assembly 320 is mounted to and abutted against vane valve 350 as best shown in FIG. 75, thereby closing inlet flow chamber 351.

Preferably, common path flow orifice 321 is positioned within sealing protrusion 323 on reservoir assembly 320 to establish fluid communication between reservoir 28 in reservoir assembly 320 with flow inlet chamber 351 of vane valve 350. In preferred embodiments, sealing protrusion forms a continuous sealing wall extending axially outward and forward from front wall 327 of reservoir assembly 320 as shown in FIG. 71. In one embodiment, sealing protrusion 323 may be rectangular in shape as shown to complement a preferred but non-limiting shape of inlet flow chamber 351; however, any suitable shape may be provided for sealing protrusion 323 so long as the protrusion has a shape that mates with and complements the shape of a corresponding recessed sealing groove 355 in vane valve 350.

In one preferred embodiment, return flow port 325 is preferably located outside of sealing protrusion 323 through front wall 327 of reservoir assembly 320 as shown in FIG. 71 since the return flow pathway is preferably not controlled by vane valve 350. Also preferably, return flow port 325 is further located within air bleed disk 330 when the air bleed disk is mounted to front wall 327 of reservoir assembly 320 as further described herein.

Figure 75:
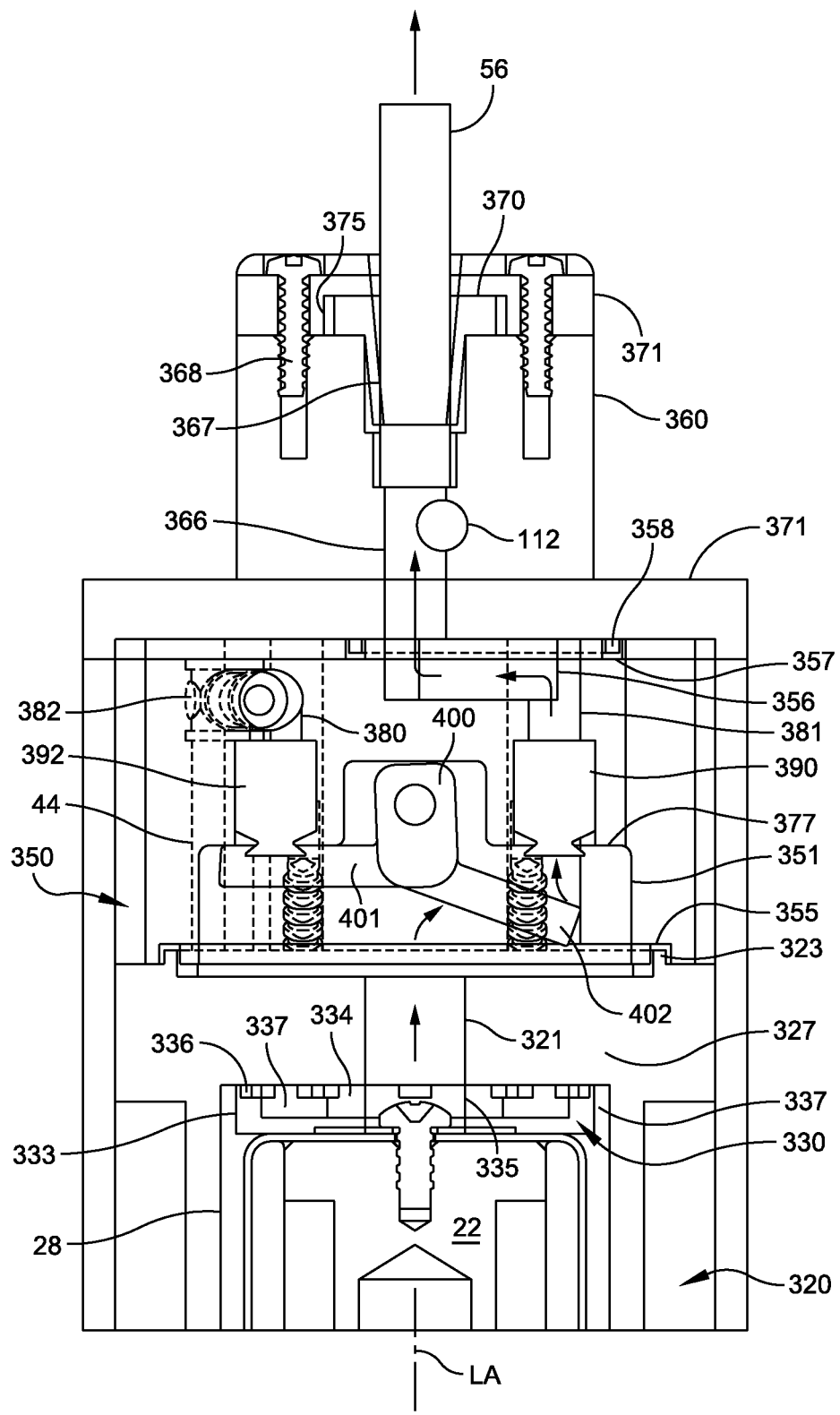
FIG. 75 is a top cross-sectional view of the fluid dispensing module of FIG. 67 showing an enlarged view of the dispensing end and the vane valve in a reservoir fluid filling position.

Referring to FIGS. 71, 75, and 78, air bleed disk 330 functions similarly to air bleed disk 19 (shown in FIGS. 6 and 34-37, and described herein) to remove accumulated air in reservoir 28 during filling and establish a return liquid flow path from reservoir 28 to the base unit 500 and main fluid storage container such as pitcher assembly 6. Air bleed disk 330 is operably associated with and mounted inside reservoir 28 of reservoir assembly 320. In one embodiment, air bleed disk 330 is mounted on the interior surface of front wall 327 defined by forward flange 326 within reservoir assembly 320. Air bleed disk 330 remains attached to front wall 327 and stationary during reciprocating movement of piston assembly 310. Air bleed disk 330 may be attached to front wall 327 via any suitable methods commonly employed in the art such as adhesives, mechanical fasteners, etc.

With continuing reference to FIGS. 71, 75, and 78, air bleed disk 330 includes a rear end 331 and a forward end 332 configured to engage and flatly abut the interior surface of front wall 327 within reservoir 28 of the reservoir assembly 320. Air bleed disk 330 further includes an annular shaped circumferentially extending lateral sidewall 333 and a radially spaced apart annular shaped raised ring wall 334 defining an annular space such as flow annulus 337 therebetween (best shown in FIG. 75). Sidewall 333 includes a plurality of circumferentially spaced apart flow openings 336 which fluidly couple annular space 337 to reservoir 28. In one non-limiting embodiment, as shown, openings 336 may be provided by a castellation formed in the forward end 332 of sidewall 333.

When air bleed disk 330 is mounted onto front wall 327 of reservoir assembly 320, return flow port 325 formed in the front wall is preferably arranged to be positioned within flow annulus 337. Return flow line 40 is in fluid communication with reservoir 28 of reservoir assembly 320 via flow annulus 337 and flow openings 336.

With continuing reference to FIGS. 71, 75, and 78, lateral sidewall 333 and raised ring wall 334 preferably have the same axial length in one embodiment so that the forward ends of the sidewall and ring wall lie flat against and abut front wall 327 of reservoir assembly 320. Raised ring wall 334 defines a central aperture 335 that is concentrically aligned with common path flow orifice 321 and axially extends completely through air bleed disk 330 to establish a flow path between reservoir 28 of reservoir assembly 320 and inlet flow chamber 351 of vane valve 350 through the central aperture, as shown in FIGS. 75 and 78. In one preferred embodiment, aperture 335 preferably has diameter that is substantially the same as the diameter of common path flow orifice 321 to provide smooth flow transition and minimum turbulence through the air bleed disk 330. In other less preferred but suitable embodiments, aperture 335 of air bleed disk 330 may have a diameter that is larger or smaller than the diameter of common path flow orifice 321.

In one preferred embodiment, as best shown in FIGS. 69 and 75, air bleed disk preferably has an outside diameter that is slightly smaller than the inside diameter of reservoir 28 to form an annular space 337 therebetween. With added reference to FIG. 78, the fluid return and recirculation flow path will convey air and/or liquid from reservoir 28 in reservoir assembly 320 into annular space 337, then through flow openings 336 in air bleed disk 330 into flow annulus 337, then through return flow port 325 in front wall 327 of reservoir assembly 320, and finally through laterally aligned bore 325a into flow return line 40. Raised ring wall 334 isolates the flow path through common path flow orifice 321 in front wall 327 of reservoir assembly 320 from the return or recirculation flow path just described.

Figure 72:
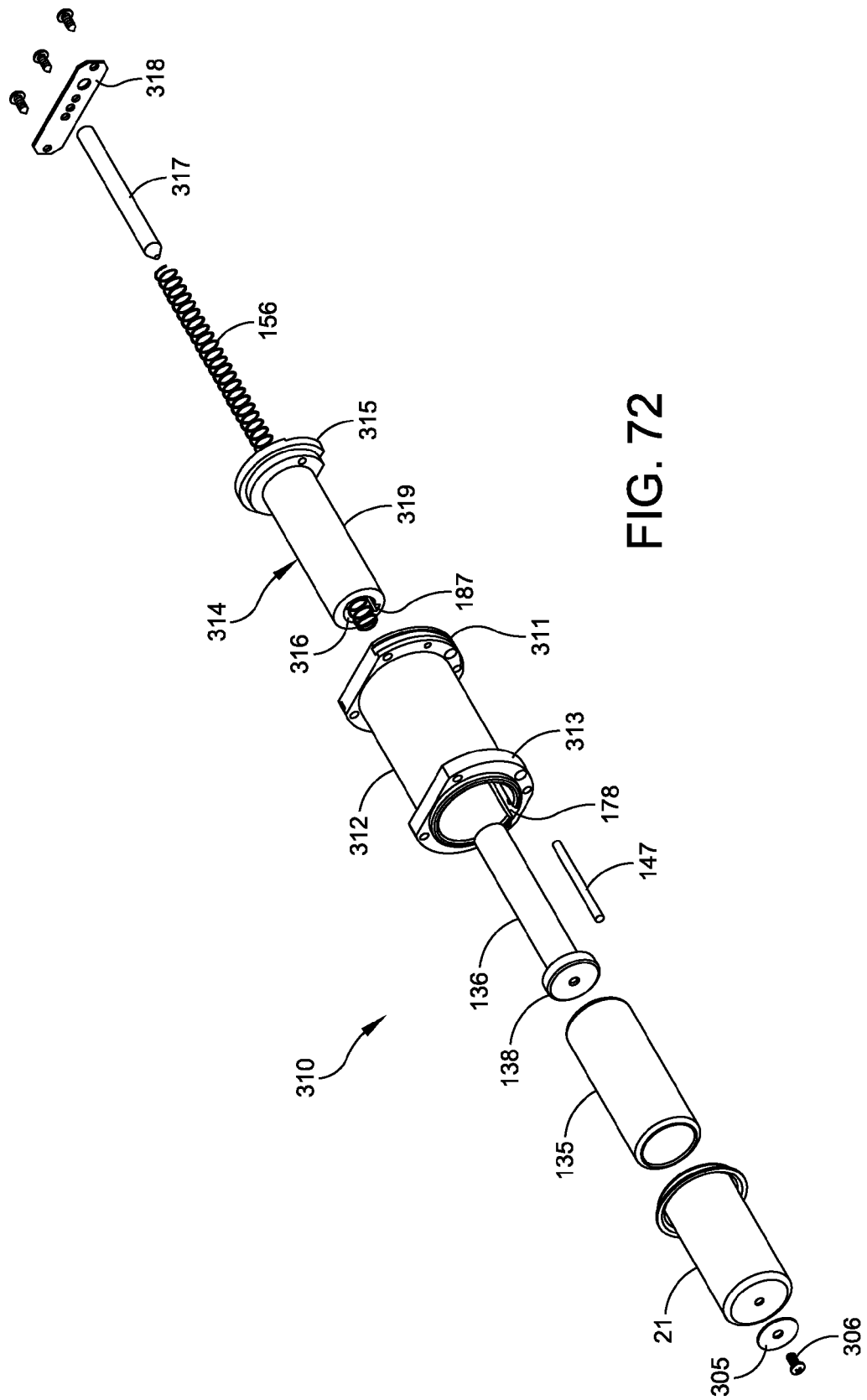
FIG. 72 is an exploded view of a piston assembly thereof.

Referring to FIG. 72, piston assembly 310 is functionally the same as and includes piston 22 shown in FIGS. 41-42 and previously described herein. In summary, piston 22 includes a cylindrical shell 135, a central internal shaft 136, and cylindrical tamp plate 138. Cylindrical shell 135 has an annular wall 140 that surrounds and defines a central void 142 that communicates with an open end 144. A channel 145 is defined longitudinally in shaft 136, and is sized to receive and mount an elongate magnetic rod 147 (FIG. 6). Magnetic rod 147 therefore is movable with piston 22 for providing an indication of the position of the piston within reservoir 28 of reservoir assembly 320. Since piston 22 is slidable within reservoir 28, the displacement and position of piston 22 is indicative of the volume of liquid that has been consumed by a user at any given point in time. Cylindrical tamp plate 138 closes one end of cylindrical shell 135, and is located at an internal end of central shaft 136 so as to be arranged in spaced relation to rod 147 and open end 144. Top surface 139 of tamp plate 138 may be flat and smooth in some embodiments.

Piston assembly 310 further includes a generally hollow cylindrical outer body 312 with two open ends, and a forward flange 313 and rear flange 311, as shown in FIG. 72. Forward flange 313 mounts on rear flange of reservoir assembly 320 by any suitable means such as via threaded fasteners. In this embodiment, previously described longitudinal slot 178 is defined in the inner bottom interior surface of cylindrical body 312 in lieu of in sensor housing 152 (see, e.g. FIGS. 47-50) but serves the same purpose. Longitudinal slot 178 is therefore preferably sized so as to receive a magnetic field detector, such as Hall Effect sensor 154 (see FIGS. 68-69) already described herein for sensing and reporting the position of magnetic rod 147 mounted on piston 22.

Referring to FIG. 72, piston assembly 310 further includes a hollow cylindrical inner body 314 having a circumferentially extending tubular wall portion 319 defining two open ends and a radially protruding rear flange 315 having a diameter larger than tubular wall portion 319. Tubular wall portion 319 is configured and dimensioned to be slidably received in outer body 312. In some embodiments, rear flange 315 may be sized with a diameter sufficient to close the rear end of outer body 312 as shown in FIG. 69. Inner body 314 defines an interior axial passageway 316 that is configured and dimensioned to slidably receive shaft 136 of piston 22 therein from the forward end. From the rear end, passageway 316 receives piston spring 187 as shown for biasing piston 22 forward towards front wall 327 of reservoir assembly 20 (see FIG. 71). In this embodiment, previously described channel 187 is defined longitudinally in the interior bottom surface of inner body 314 in lieu of in sensor guide sleeve 180 (see FIGS. 51-53). Channel 187 is therefore preferably sized to at least partially receive and allow for sliding clearance of elongate magnetic rod 147 mounted on piston shaft 136 during operation of the piston 22 and hand-held fluid dispensing module, as further described herein. Piston assembly may further include a spring guide rod 317 that is mounted to a retainer plate 318, which may be mounted to rear flange 311 of piston assembly outer body 312 via fasteners in one embodiment (see also FIGS. 67-69).

Piston assembly 310 further includes elastomeric diaphragm 21 as previously described and shown herein (see, e.g. FIGS. 6 and 38-40). The forward closed end 125 of diaphragm 21 may be retained on tamp plate 138 on piston shaft 136 via a washer 305 and fastener 306, as shown in FIG. 72.

Piston 22 and diaphragm 21 function in the same manner as already described herein for the embodiment of the fluid dispensing module 2 shown in FIG. 6 for dispensing liquid to a user from reservoir 28 and refilling the reservoir from pitcher assembly 6.

Figure 73:
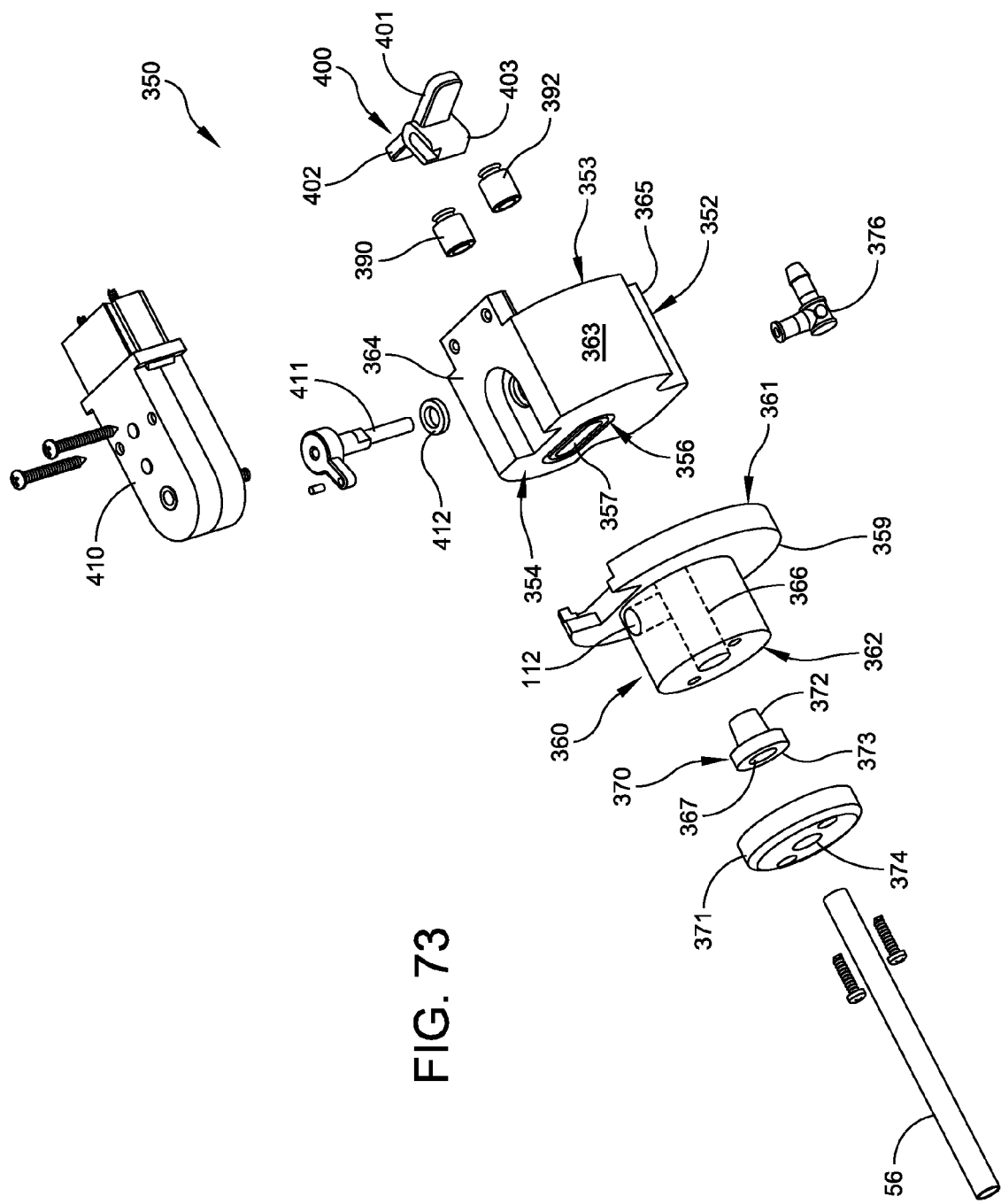
FIG. 73 is an exploded view of a vane valve thereof.
Figure 74:
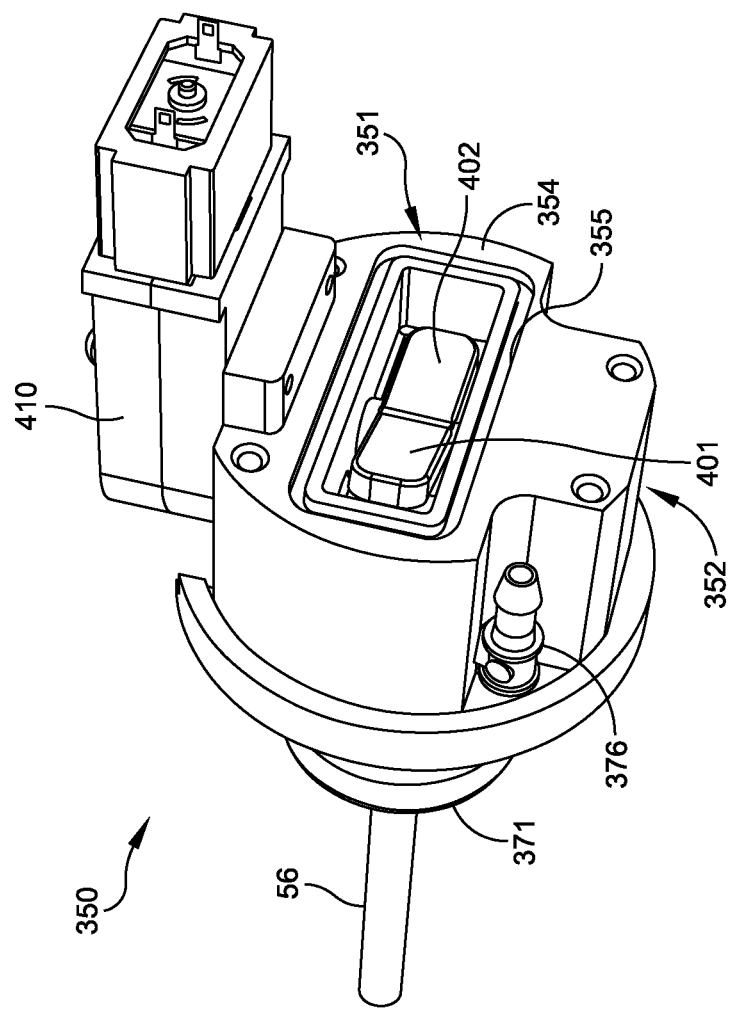
FIG. 74 is a perspective view of the vane valve.

Referring now to FIGS. 73 and 74, vane valve 350 will be further described. Vane vale includes a valve body 352 having a rear end 354 and forward end 353. Inlet flow chamber 351 is disposed within valve body 352 and opens rearward (see also FIGS. 76-79). In some embodiments, as shown, inlet flow chamber 351 may be generally rectangular in shape having a greater width than height, and extends laterally through valve body 352. A recessed sealing groove 355 is associated with and formed around inlet flow chamber 351 in valve body 352. As previously described, complementary configured and dimensioned raised sealing protrusion 323 on front wall 327 of reservoir assembly 320 mates with and is insertable into a recessed sealing groove 355 formed in the rear end 354 of vane valve body 352 (see also FIGS. 73 and 74). Preferably sealing groove 355 may continuous as shown to provide a leak-resistant seal around inlet flow chamber 351 when the reservoir assembly 320 and vane valve are coupled together.

Inlet flow chamber 351 extends laterally across valve body 352 between two opposing lateral sides 363 of vane valve 350 (see FIG. 73). In one embodiment, as shown, outlet flow chamber 356 may preferably be arranged symmetrically with respect to longitudinal axis LA or centerline and the central axis of valve body 352 (best shown in FIGS. 75-76) for reasons which will become apparent.

With continuing reference to FIGS. 73 and 74, vane vale 350 further includes outlet flow chamber 356 which faces and opens forward through forward end 354 of valve body 352. Forward end 354 defines a sealing groove 357 which is associated with and formed around outlet flow chamber 356. Sealing groove 357 is configured and dimensioned to receive a complementary configured mating raised sealing protrusion 358 disposed on a rear end 361 of cylindrically-shaped end adapter 360 (see also FIG. 79). Sealing protrusion 358 is insertable into recessed sealing groove 355 to form a leak-resistant seal around outlet flow chamber 356 when end adapter 360 is abuttingly mounted onto vane valve 350. This operates in a similar manner to sealing groove 355 and raised sealing protrusion 323 on the rear end 354 of vane valve body 352 that seals inlet flow chamber 351 as already described. In some embodiments, as shown, outlet flow chamber 356 may be generally rectangular in shape having a greater width than height, similarly to inlet flow chamber 351. Outlet flow chamber 356 extends laterally across valve body 352 from at least the centerline or longitudinal axis LA of fluid dispensing module 300 towards one of two opposing lateral sides 363 of vane valve 350 (see FIG. 73). In one embodiment, as shown, outlet flow chamber 356 may be arranged asymmetrically with respect to longitudinal axis LA and the central axis of valve body 352 (best shown in FIGS. 75-76).

End adapter 360 includes a diametrically enlarged rear flange 361 which is preferably dimensioned to mate with and have the same approximate diameter as forward end 354 of vane valve 350 as shown in FIGS. 69 and 75. End adapter 360 includes a central fluid outlet passageway 366 which preferably extends completely through the adapter and penetrates forward and rear ends 362, 361, as further shown in FIG. 73. End adapter 360 may be mounted onto vane valve 350 by any suitable means commonly used in the art, including without limitation adhesives, mechanical fasteners, etc.

Figure 79:
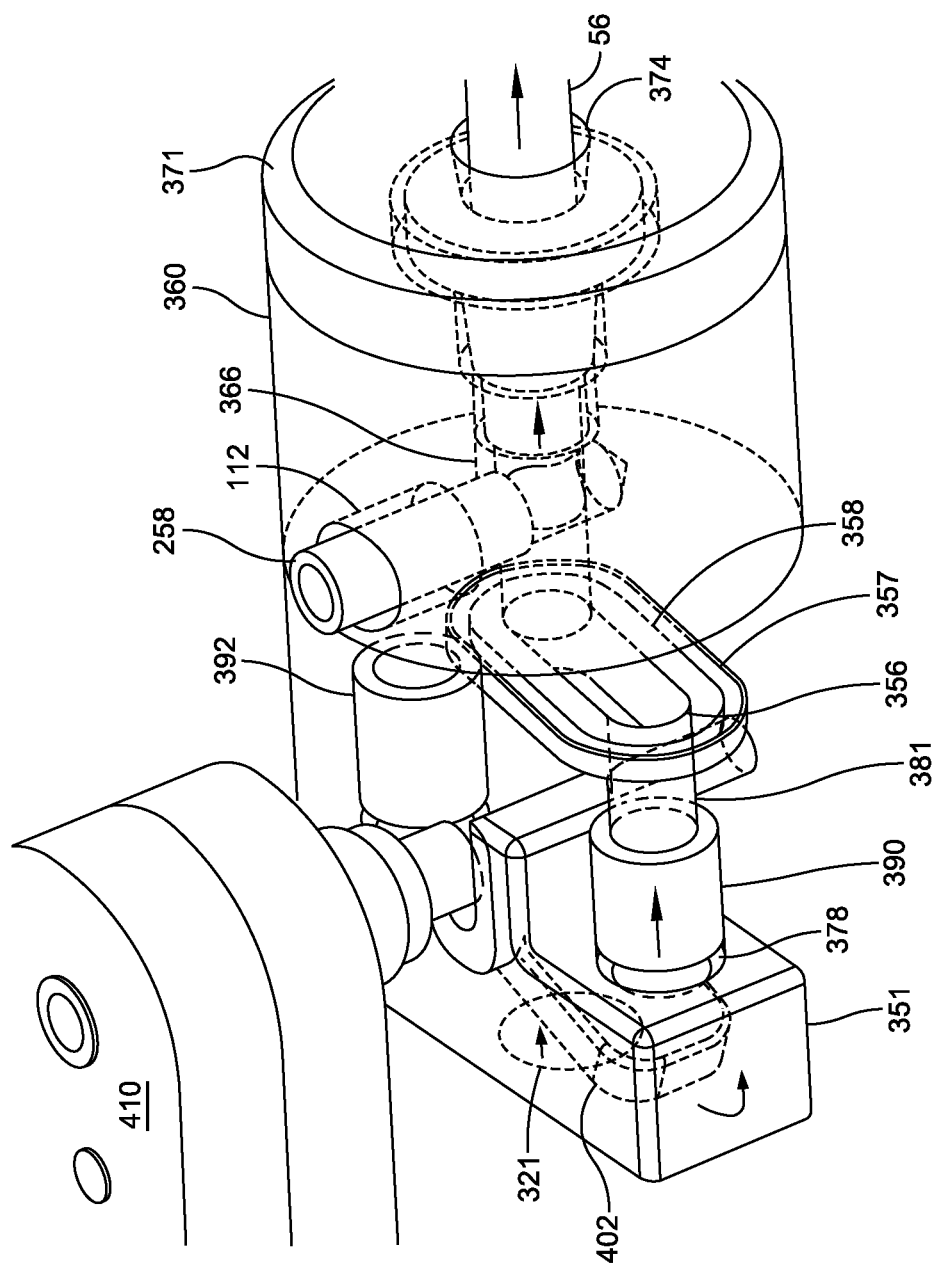
FIG. 79 is a partial perspective phantom top view of the dispensing end of the fluid dispensing module of FIG. 67.

To retain drinking straw 56 to end adapter 360, a straw sealing assembly is providing that includes a straw seal 370 and end cap 371. Referring to FIGS. 73, 75, and 79, straw seal 370 includes a rear conically tapered portion 372 insertable into central passageway 366 of end adapter 360 and diametrically enlarged front washer portion 373 that is received in and engages a complementary configured and dimensioned recess 375 formed in the rear of end cap 371. End cap 371 includes a central through bore 374 which is concentrically aligned with a central passageway 367 in straw seal 370 and central passageway 366 of end adapter 360 to form a fluid path between vane valve 350 and drinking straw 56. Straw 56 is configure and dimensioned to be insertable through end cap 371 and into end adapter 360 as best shown in FIG. 75.

In one preferred embodiment, straw seal 370 is preferably made of a suitable elastomeric material so as to be flexibly structured and deformable. End adapter 360 and end cap 371 are preferably more rigid, and in some embodiments without limitation may be made of a relatively rigid suitable plastic material including those already identified herein. To mount straw 56 to fluid dispensing module 300, a distal end of straw seal 370 is inserted through straw seal 370 which is received within a forward portion of central passageway 366 in end adapter 360. Passageway 366 is configured and dimensioned to receive tapered portion 372 of straw seal 370, and in some embodiments without limitation may include a diametrically stepped arrangement as best shown in FIG. 75. Straw 56 will radially expand straw seal 370 when inserted therein to engage and grip the interior surface circumscribing central passageway 366 and form a seal therebetween. End cap 371 may then be mounted onto end adapter 360, such as with threaded fasteners 368 or other suitable means commonly used in the art, which will further compress washer portion 370 of straw seal 370 against forward end 362 of end adapter 360 to complete a leak-resistant seal.

Referring to FIGS. 73, 75, and 79, end adapter 360 further includes a vertical vacuum bore 112 which fluidly communicates with horizontally oriented central passageway 366. Vacuum sensor 250, mounted to printed circuit card 256, includes tube 258 that projects downwardly from an underside of the sensor (see also FIGS. 62 and 68-69). Tube 258 has an outer diameter that is sized so as to be received in corresponding vacuum bore 112 for sensing the presences of a vacuum in central passageway 366 in a manner already described herein.

Referring to FIGS. 73 and 75-79, inlet flow chamber 351 of vane valve 350 includes a pair of laterally spaced apart and preferably round flow ports 378 defined in a front vertical wall 377 of the flow chamber. One port 378 is in fluid communication with fluid supply line 44 and the other port 378 is in fluid communication with drink straw 56. In one embodiment, each of the flow ports 378 is fitted with a commercially-available flow-sealing suction cup 390, 392 positioned in the port. Suction cup 390 is an outlet flow suction cup and suction cup 392 is a flow inlet suction cup with respect to inlet flow chamber 351. In one embodiment, outlet and inlet flow suction cups 390, 392 respectively may be a Universal Flat Series Model suction cup (e.g. Part Number: F5-NBR) available from Anver Corporation of Hudson, Mass. Flow suction cups 390, 392 are preferably made of a flexible elastomeric or rubber material, such as without limitation for example Nitrile or silicone.

Figure 76:
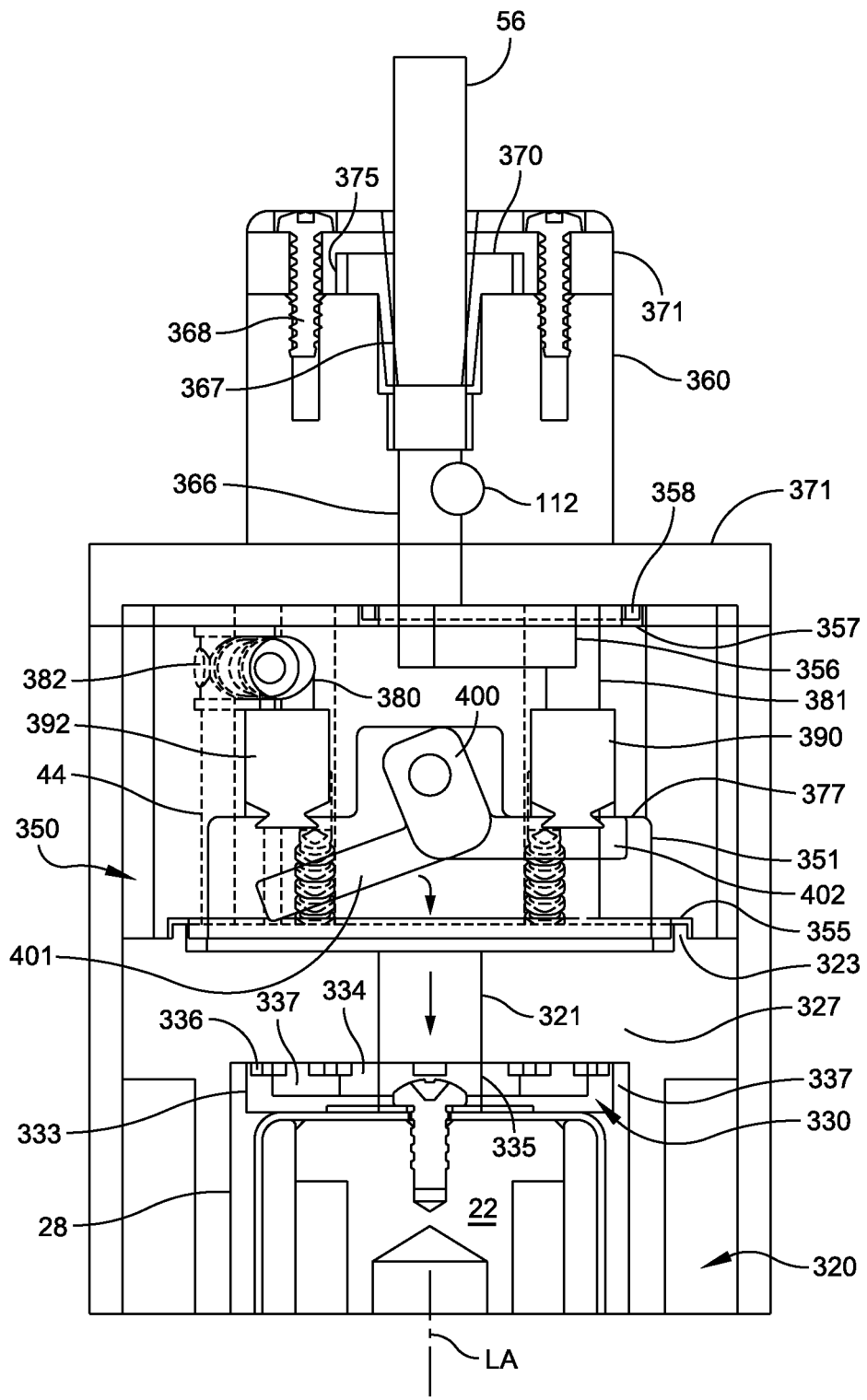
FIG. 76 is a top cross-sectional view of the fluid dispensing module of FIG. 67 showing an enlarged view of the dispensing end and the vane valve in a reservoir fluid extraction position.
Figure 77:
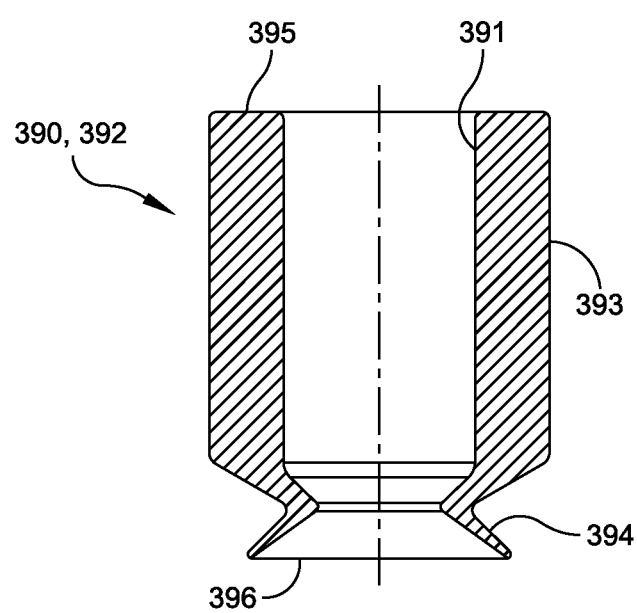
FIG. 77 is a cross-sectional view of a flow suction cup used in the vane valve of FIG. 73.

Referring to FIG. 77, outlet and inlet flow suction cups 390, 392 have a generally tubular body 393 that is open at both ends 395, 396 and defines a central flow passageway 391 therebetween for moving fluid into and out of inlet flow chamber 351 in vane valve 350. One first end is a tubular mounting end 395 that is connectable to a tubular-shaped flow conduit (e.g. tubing nipple or fitting) which may be partially mounted and retained in valve body 352 by adhesives or other suitable means. A second end is a sealing suction cup end 966 that is configured to include a conventionally configured suction cup 394 that is releasably engageable and sealable to vanes 401, 402 of vane assembly 400 (see FIG. 73), as further described herein. Suction cup 394 is therefore axially compressible and deformable in conventional manner by engagement with vanes 401, 402. When vanes 401, 402 disengage suction cup 394, the suction cup returns to its original undeformed condition and position. Sealing suction cup end 966 with suction cup 394 therefore defines a valve seat for vanes 401, 402 of vane assembly 400 (see, e.g. FIGS. 75 and 76).

Referring to FIGS. 76 and 78, vane valve 350 further defines an inlet flow path comprised of inlet flow conduit 380 which is fluidly coupled to inlet flow chamber 351 via inlet flow suction cup 392 for filling reservoir 28 in reservoir assembly 320. Flow conduit 380 has a first end coupled to a tubing fitting 782, which is mountable to the bottom of 352 of valve body 352 (see also FIGS. 73 and 74). Fluid supply line 44, which in one embodiment may be clear Tygon PVC plastic beverage tubing, is coupled to fitting 782.

Referring to FIGS. 75 and 79, vane valve 350 further defines an outlet flow path comprised of outlet flow conduit 381 which is fluidly coupled to inlet flow chamber 351 via outlet flow suction cup 390 for withdrawing liquid from reservoir 28 via a user sucking or drawing on straw 56. Outlet flow conduit 381 is fluidly coupled to outlet flow chamber 356.

Referring to FIGS. 73 and 74, vane valve 350 includes vane assembly 400 which includes an inlet flow vane 401 and outlet flow vane 402. Vane assembly includes a mounting portion 403 configured to engage drive shaft 411 of valve motor 410 for releasably attaching the vane assembly to the drive shaft. Vane assembly 400 defines a flow regulating element that is pivotably movable in opposing horizontal/lateral directions via rotating vertically oriented drive shaft 411 by valve motor 410 between a first flow inlet position (shown, e.g. in FIG. 76) and a second flow outlet position (shown, e.g. in FIG. 75).

With reference to FIGS. 73-75, inlet flow vane 401 and outlet flow vane 402 are formed as part of or attached to mounting portion 403, which is centrally located with respect to each vane. Each vane 401, 402 extends laterally outwards away from mounting portion 403 in opposing directions. In a preferred embodiment, as shown, one vane 401, 402 is disposed at an angle to the other vane 401, 402 on mounting portion 403 as best shown in FIG. 75 so that only one of the vanes preferably engages a flow suction cup 390 or 392 at any given time. Vane assembly 400 therefore operates with a toggle-type movement between the first flow inlet position and second flow outlet position. In a preferred embodiment, the front faces of vanes 401, 402 that abutting engage flow suction cups 390, 392 are preferably flat to form a relatively tight seal with the cups. The rear faces of vanes 401, 402 may have any suitable profile including flat or another suitable profile as these rear faces do not provide a sealing surface unlike the front faces.

Referring to FIG. 73, motor drive shaft 411 is coupled to valve motor 410 which may be any suitable commercially available motor capable of moving vane assembly 400 between the foregoing two alternating flow inlet and outlet positions. In one preferred embodiment, without limitation, motor 410 may be an electrically-powered right angle mini-plastic gear motor with a 90 degree motor output spindle (Model 1123) that couples to drive shaft 411 and is commercially available from Pololu Corporation of Las Vegas, Nev. Valve motor 410 mounts on top 364 of valve body 352 such as via threaded fasteners as shown or other suitable means. A U-cup seal 412 may be provided to seal the motor drive shaft 411 to the top 364 of the valve body.

Operation of fluid dispensing module 300 will now be briefly described. This automatic vacuum-sensing operated fluid dispensing module functions similarly to and contains many of the same components (labeled the same in the drawings) as vacuum-sensing unit 200 shown in FIGS. 61-66 and already described herein. Reference is made to the prior description of fluid dispensing module 200, which will now be supplemented to describe additional or different features of fluid dispensing module 300 with vane valve 350.

To fill reservoir 28 of reservoir assembly 320, vane assembly 400 is positioned in the first flow inlet position shown in FIGS. 76 and 78 by operation of valve motor 410. In one embodiment, this may triggered by a control signal provided to the motor from microprocessor 600 in control module 520 (see also FIG. 80). In the flow inlet position, inlet flow vane 401 is spaced apart/away from inlet flow suction cup 392, while outlet flow vane 402 is seated and sealed against outlet flow suction cup 390 to prevent liquid from reaching the user via straw 56. Main pump 514 in base unit 510 is activated which transports the liquid such as water from main reservoir 512 through fluid supply line 44 to vane valve 350. Flow moves through fitting 782 into inlet flow conduit 380, inlet flow suction cup 392, inlet flow chamber 351, and finally through common path orifice 321 inwards into reservoir 28 in hand-held fluid dispensing module 300. Air initially purged from reservoir 28 during the filling operation and then excess liquid flows through fluid output/return line 40 back to main reservoir 512 generally after reservoir 28 has been filled to the desired capacity or volume. The return flow path is from reservoir 28 through air bleed disk 330, return flow port 325, laterally aligned bore 325*a*, and tubing fitting 328 connected to flow output/return line 40 (see FIG. 78). This creates a flow recirculation loop which will continue to operate until the reservoir filling operation is stopped.

After the filling operation is complete, the main pump 514 may be shut off and the fluid dispensing module 300 is fully charged with the desired volume of liquid intended for the user. The vane assembly 400 remains in the position shown in FIG. 76 until the user is ready for a drink.

Referring to FIGS. 75 and 79, when the user desires a drink, the user draws or sucks on drinking straw 56. In the same manner already described for vacuum-actuated fluid dispensing module 200, the vacuum sensor 250 detects a vacuum in central passageway 366 of end adapter 360. The vacuum sensor 250 sends a signal to valve motor 410 automatically causing the valve motor 410 to pivot or move vane assembly 400 to the second flow outlet position (best shown FIG. 75). In the flow outlet position, outlet flow vane 402 is spaced apart/away from outlet flow suction cup 390, while inlet flow vane 401 is seated and sealed against outlet flow suction cup 392 to prevent the user from drawing liquid from fluid supply line 44 thereby ensuring that only the contents of reservoir 28 may be extracted. Flow moves through common path orifice 321 outwards from reservoir 28 into outlet flow suction cup 390, outlet flow conduit 381, outlet flow chamber 356, central passageway 366, and finally through straw 56 to the user.

In some embodiments, after the user stops drinking, there will no longer be a vacuum in central passageway 366 of end adapter 360. When vacuum sensor 250 detects this loss of vacuum, the sensor 250 may send a signal to valve motor 410 automatically causing the valve motor to pivot or move vane assembly 400 to the first flow inlet position shown in FIG. 76 by operation of valve motor 410. This position may therefore be normally maintained when a user is not taking a drink of liquid from reservoir 28 in fluid dispensing module 300.

As liquid in reservoir 28 is gradually depleted, the quantity of liquid remaining therein is monitored by microprocessor 600 (see FIG. 80) via Hall Effect sensor 154). When reservoir 28 is empty, the microprocessor 600 may either initiate a new filling cycle as previously described or send a signal or notification to staff personnel alerting them that the reservoir is empty. The staff may then determine if another filling cycle is permissible and manually initiate the same via a suitable interface with microprocessor 600.

After the fluid dispensing module 2, 200, or 300 is assembled, it should be noted that the control system that detects the linear position of the piston may need to be calibrated in some embodiments. The calibration data is used by the control system's microprocessor 600 to calculate the position of the piston 22 in reservoir 28 to determine volume of usage. Since calibration constants are specific to each individual fluid dispensing module, the constants may be stored on a memory chip located on the position printed circuit board 406 coupled to Hall Effect sensor 154 in the hand-held fluid dispensing module (see FIGS. 67 and 69). When the hydration system is powered up, the main microprocessor 600 reads the calibration data from the memory chip. The memory chip may also be programmed with a unique identification number for each fluid dispensing module.

It will be appreciated that types of valves other than spool or piston valve 15 or vane valve 350 may be used for a fluid access valve. Accordingly, in other embodiments contemplated, valves may be used such as a ball valve, butterfly valve, choke valve, diaphragm valve, gate valve, globe valve, pinch valve, piston valve, plug valve, poppet valve, and others.

While preferred embodiments of the present invention have been described, it is to be understood that the embodiments described are illustrative only and that the scope of the invention is to be defined solely by the appended claims when accorded a full range of equivalence, many variations and modifications naturally occurring to those of skill in the art from a perusal hereof.

Advantages of the Invention

Numerous advantages are obtained by employing the present invention.

More specifically, an advantage of the present invention relates to the fluid measurement of dispensed fluid from a fluid reservoir, which avoids all of the aforementioned problems associated with prior art devices.

In addition, an advantage of the present invention is the release of air molecules that are entrapped within a fluid reservoir, allowing for precise measurement of an amount of dispensed fluid from the fluid reservoir.

Furthermore an advantage of the present invention is the implementation of a vacuum actuation assembly that allows a user to provide a vacuum in a fluid dispensing module, which in turn causes the fluid dispensing module to dispense liquid.

Also, an advantage of the present invention allows for a control of fluid exiting a fluid reservoir, the control based on an angle of the fluid dispensing module.

Furthermore, an advantage of the present invention allows for a predetermined amount of fluid to be dispensed from the fluid dispensing module.

Fluid Draw-Back Control

According to another aspect, the hydration devices disclosed herein which includes vacuum actuated fluid dispensing (i.e. fluid dispensing module or assemblies 200 or 300 shown for example in FIGS. 63, and 67 respectively) in some embodiments may include a novel combination of mechanical, electrical, and software components to provide for the draw-back of fluid from the end of the straw after a drink is completed. This will reduce the chance that fluid will drip back out of the end of the straw when the user finishes drinking, or when laid on a bedside table, or be "wicked" out when laid on a bed and in contact with bedding material.

Referring generally to FIGS. 6, 41-42, and 72, the hand held fluid dispensing module reservoir piston 22 (comprised of cylindrical shell 135, a central internal shaft 136, and cylindrical tamp plate 138) of the hydration devices 200 or 300 is initially supported by a spring 156 which functions to counterbalance the weight of the piston at the beginning of the stroke. This provides for a reduction of the suction force required to initiate the movement of fluid from the hand held hydration devices 200 or 300, which is a desirable attribute for the target population of elderly patients. This spring 156 is designed such that the force quickly dissipates as the piston 22 moves (emptying the reservoir 28 in FIG. 65 or 69) so that after a short distance, the counterbalance effect is eliminated. Once this is achieved, when the user stops sucking from the straw 56, and since the hydration device orientation is in a somewhat vertical orientation, the weight of the piston 22 causes the piston to want to move backward, drawing fluid back into the reservoir. Additionally, integral to this operation is control of the vacuum activated valve (e.g. spool valve 15 in FIG. 6 or vane valve 350 in FIG. 68) that opens and closes to allow user access to the fluid in the hand held module reservoir. When the user first sucks on the straw 56, this is sensed and the valve 15/350 is shifted to allow fluid withdrawal. When the user stops sucking on the straw, this is sensed and the valve 15 or 350 is closed, but not until after a predetermined software programmed time delay. This time delay is desirable to allow for the pistons downward movement to draw the fluid back into straw 56 and the hydration device. Without this, the valve would close too soon and not allow the drawback function to occur.

In one embodiment, a method for dispensing liquid from a hand-held hydration device includes: providing a hand-held housing including a liquid reservoir, a straw, and a fluid access valve fluidly coupled between the straw and reservoir; a user sucking on the straw thereby producing a vacuum therein; sensing the vacuum with a controller including a microprocessor; automatically opening the valve to an open dispensing position; dispensing liquid in the reservoir through the valve and straw to the user; the user stopping to suck on the straw thereby ending the vacuum; sensing a loss in vacuum in the straw with the controller; starting a delay timer for a predetermined time interval; and automatically closing the valve to a non-dispensing position after expiration of the time interval.

Figure 81:
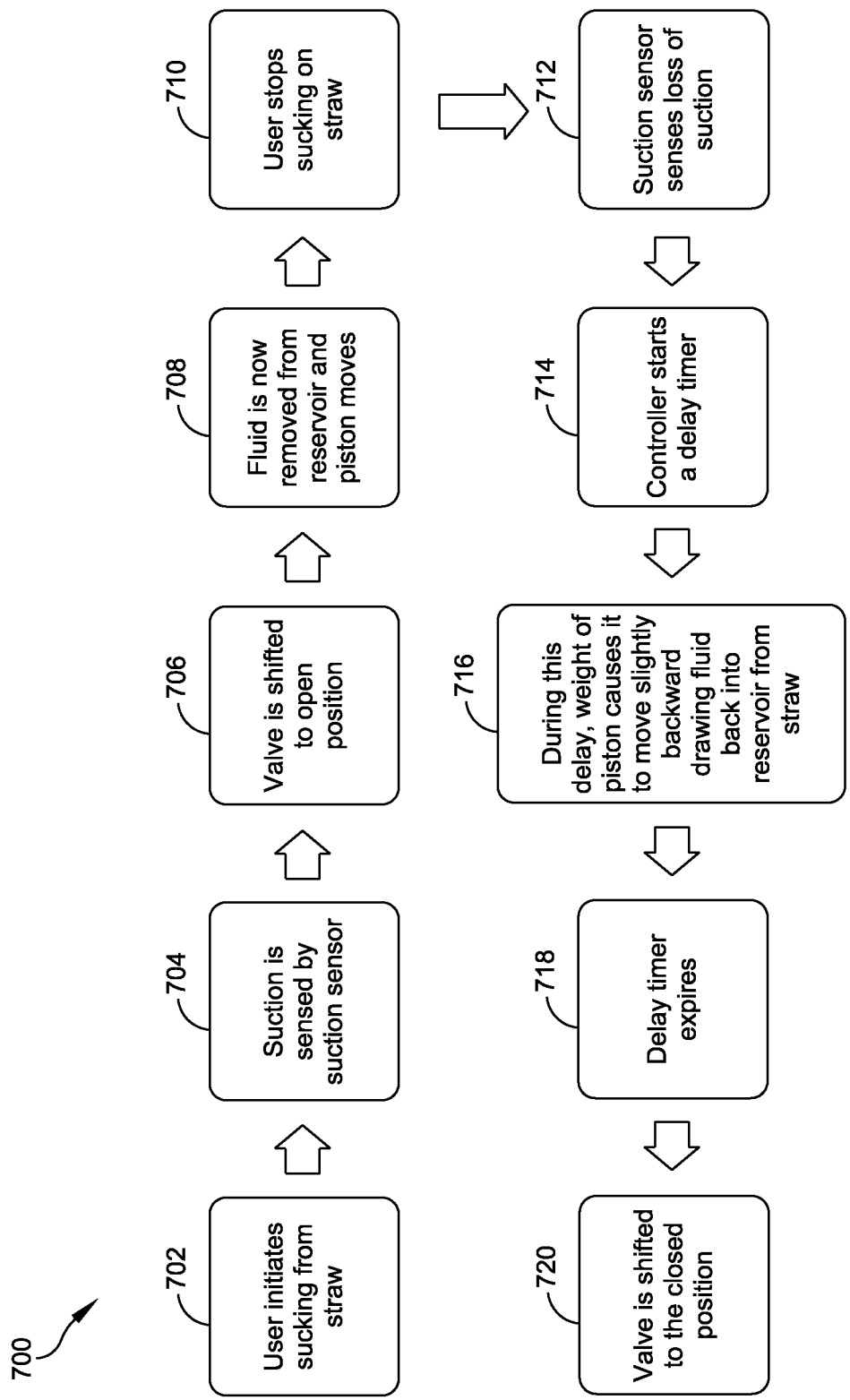
FIG. 81 is a flow chart showing steps of an exemplary process for preventing leakage from hand-held hydration device.

FIG. 81 discloses one exemplary method or process 700 for performing the foregoing fluid drawback function. In one embodiment, the process is controlled by a programmable controller including a microprocessor such as microprocessor 600 (see FIG. 80) which is operably and electrically connected to hand held hydration devices 200 or 300, and more particularly by control/power cable 504 (see FIGS. 61-69 and 80) from control module 520 as already described herein.

Process 700 will be described for convenience and brevity with respect to the fluid dispensing module hydration device 300 and fluid dispensing vane valve 350 with reference to FIGS. 61, 62, 64, and 67-81, but is not limited thereto and equally applicable to hydration device 200 and fluid dispensing piston valve 15.

Referring to the process flow chart of FIG. 81, process 800 begins with the user initiating drinking by sucking on straw 56 for extracting liquid from and stored in reservoir 28 (step 702). Any flowable liquid may be used including without limitation water. This suction action or force on straw 56 produces a corresponding vacuum or suction pressure in the central fluid outlet passageway 366 of end adapter 360 (see FIG. 73) in device 300, which is in turn then detected and sensed by vacuum sensor 250 (step 704) shown in FIGS. 64 and 69. Next, fluid dispensing valve 350 is automatically moved to an open drinking or dispensing position equated with a second flow outlet position of the valve (step 706). In the manner already described herein, this occurs by vacuum sensor 250 sending a signal to valve motor 410 and/or via microprocessor 600 automatically causing the valve motor 410 to pivot or move vane assembly 400 to the second flow outlet position or drinking position (best shown FIG. 75). In the flow outlet position, outlet flow vane 402 is spaced apart/away from outlet flow suction cup 390, while inlet flow vane 401 is seated and sealed against outlet flow suction cup 392 to prevent the user from drawing liquid from fluid supply line 44 thereby ensuring that only the contents of reservoir 28 may be extracted. Liquid is removed from reservoir 28 and piston 22 moves in a first axial direction towards valve 350 (step 708) in which flow moves through common path orifice 321 outwards from reservoir 28 into outlet flow suction cup 390, outlet flow conduit 381, outlet flow chamber 356, central passageway 366, and finally through straw 56 to the user.

With continuing reference to FIG. 81, when the user has finished consuming liquid and stops sucking on straw 56 and extracting fluid from reservoir 28 (step 710), or if extraction of liquid from reservoir 28 stops for some other reason (e.g. dropping hydration device 300), a corresponding loss of vacuum occurs in fluid outlet passageway 366 upon cessation of extracting liquid from the reservoir. This loss of suction or vacuum is sensed or detected by vacuum sensor 250 (step 712) shown in FIGS. 64 and 69. This condition causes circuitry associated with vacuum sensor 250 to send or relay a signal to microprocessor 600 (see FIG. 80) which is alerted to this loss of vacuum/suction condition. Microprocessor 600 is configured and programmed with instructions or control logic to initiate a time delay timer (step 714) implemented in software, firmware, hardware, or a combination thereof, thereby preventing normal closure of valve 350 as would occur upon loss of vacuum/suction when a user stops drinking. The delay timer is programmed for a predetermined time interval of sufficient duration to prevent leakage of flow back outwards through straw 56 after the user stops drinking.

During the time delay in step 714, piston 22 moves backwards in hydration device 300 in a second axial direction away from valve 350 (step 716) due to the effect of gravity on the piston because the hydration device is in a generally vertical position during the drinking mode. This motion of the piston forms a slight vacuum or suction pressure in reservoir 28, which causes fluid to be drawn back inwards into reservoir 28 in a reverse direction through common path orifice 321 from the outlet flow suction cup 390, outlet flow conduit 381, outlet flow chamber 356, central passageway 366, and straw 56 away from the user.

With continuing reference to FIG. 81, the delay timer expires after a predetermined and pre-programmed time interval in step 718. Control is then released by microprocessor 600, and valve 350 closes in a normal manner in which vacuum sensor 250 detects this loss of vacuum, sensor 250 sends a signal to valve motor 410 and/or via microprocessor 600 automatically causing the valve motor to pivot or move vane assembly 400 to the first flow inlet position shown in FIG. 76 thereby preventing extraction of fluid from reservoir 28.

In other possible embodiments, the delay timer may be integrated and programmed into vacuum sensor 250 and/or circuitry associated with printed circuit board 256 in hydration device 300 in lieu of microprocessor 600 in control module 520 on the base unit. According, in some embodiments the controller may be vacuum sensor 250 and/or a microprocessor integrated into printed circuit board 256.

Sip Mode Liquid Dispensing Control

According to another aspect, the hand held hydration devices disclosed herein are configured and operable in a restricted volumetric flow mode referred to herein as sip mode. This unique mode of operation is utilized to satisfy the needs of users such as patients who have swallowing and/or neurological disorders that do not allow them to drink from a straw safely. When they do this, such patient users tend to intake excessive fluid and cannot swallow properly, which has led some skilled nursing facilities to ban the use of drinking straws.

By incorporating a novel combination of mechanical, electrical and software components, the volume of fluid dispensed to such patient users with swallowing and/or neurological disorders is controlled so that they will be able to consume liquid via a straw drinking event, thus eliminating this concern. In one embodiment, a provider/caregiver (i.e. operator) of the hydration system would program the hydration device system controller such as microprocessor 600 in control module 520 of the base unit 510 (shown in FIG. 80) to operate in "sip mode." In summary, a maximum consumption in volume per sip (ml. or oz.) is manually input or entered by the operator, and in one embodiment a drinking time interval between successive sips (e.g. seconds) is also entered. In this mode of operation, when the patient user begins sucking fluid, the unit continually monitors the position of piston 22 (comprised of components 135, 136, 138 in FIGS. 6, 41-42, and 72) in liquid reservoir 28 (see, e.g. FIG. 65 or 69) as already described herein. The system has calculated how far the piston must travel to dispense the programmed maximum volumetric value and when the piston has traveled this distance, immediately closes the vacuum activated dispensing valve 15 or 350 to shut off liquid supply through the straw. The patient user must then wait for the pre-programmed drinking time interval before an additional drinking event can be taken in which the liquid is again dispensed by the hydration device to the patient.

According to one embodiment, a method for controlling fluid dispensing from a hand held hydration device includes: providing a hand-held housing including a liquid-containing reservoir, an axially movable piston disposed in the reservoir, a drinking straw, and a fluid access valve fluidly coupled between the straw and reservoir; a user initiating a drinking event by sucking on the straw; automatically determining a first axial start position of the piston with respect to the reservoir via a programmable controller including a microprocessor; automatically opening the valve to a dispensing position via the controller; dispensing liquid in the reservoir through the valve and straw to the user while simultaneously moving the piston axially in the reservoir; automatically monitoring the axial position of the piston; and automatically closing the valve to a non-dispensing position when the piston reaches a predetermined second axial stop position. In one embodiment, the method further includes the controller automatically starting a drinking delay timer for a predetermined time interval after automatically closing the valve. In another embodiment, the method further includes the controller automatically locking the valve in the closed position for duration of the time interval.

Figure 82:
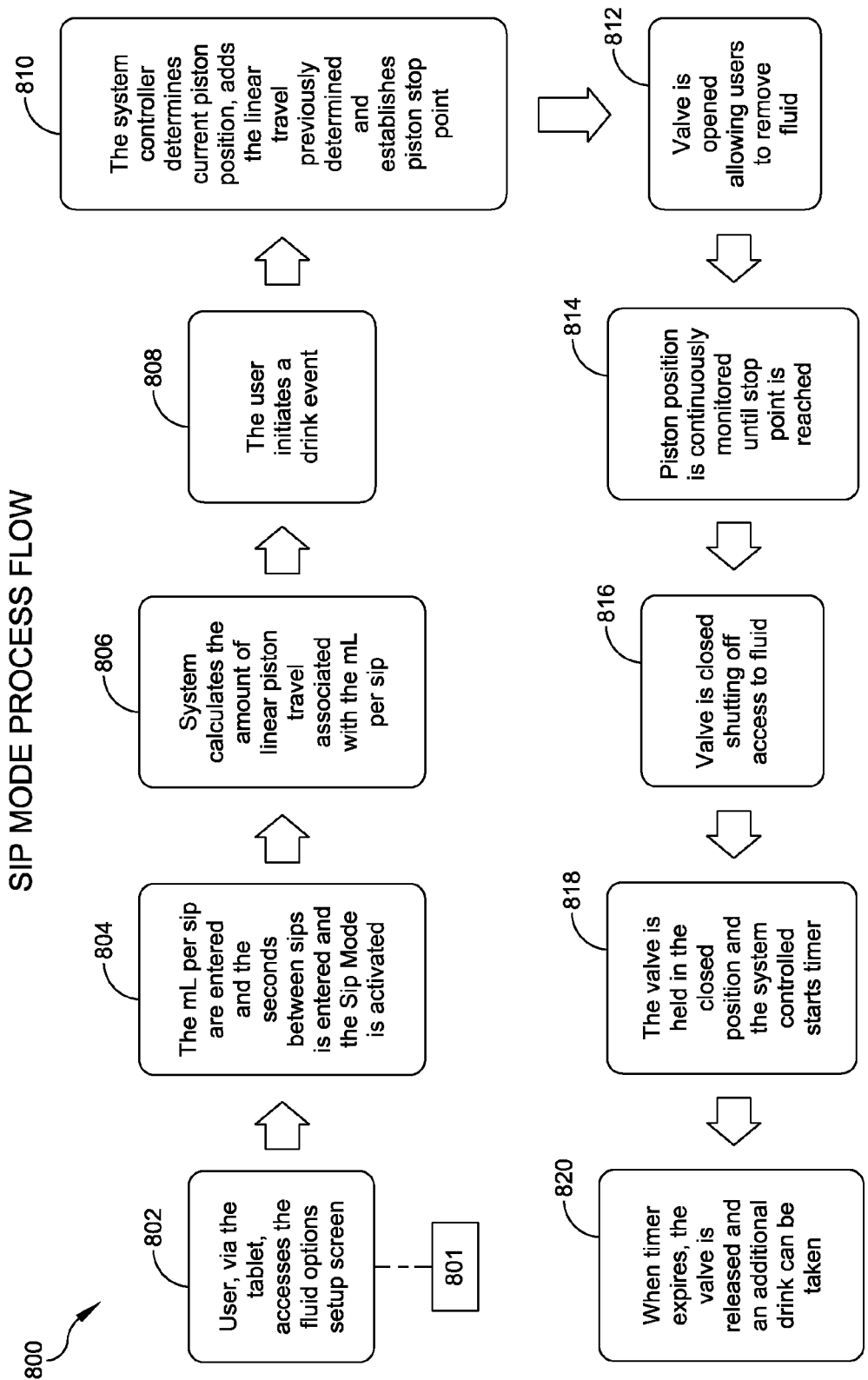
FIG. 82 is a flow chart showing steps of an exemplary process for restricting and controlling dispensing of liquid from a hand-held hydration device via sip mode operation.

FIG. 82 discloses one exemplary method or process 800 for controlling and limiting the volume of fluid dispensed from a hand held hydration device. In one embodiment, the process is controlled by a programmable controller including a processor such as microprocessor 600 in control module 520 (see FIG. 80) which is operably and electrically connected to hand held hydration devices 200 or 300, and more particularly by control/power cable 504 (see FIGS. 61-69 and 80) from control module 520 as already described herein.

Process 800 will be described for convenience and brevity with respect to the fluid dispensing module hydration device 300 and fluid dispensing vane valve 350 with reference to FIGS. 61, 62, 64, and 67-81, but is not limited thereto and equally applicable to hydration device 200 and fluid dispensing piston valve 15.

Referring to the process flow chart of FIG. 82, process 800 begins with the medical provider or caregiver (i.e. operator) accessing the hydration system controller (microprocessor 600) and a fluid options setup screen 803 (step 802) which is displayed in one embodiment by the microprocessor on the graphic user interface (GUI) of a wired or preferably wireless control device 801. In some embodiments, the control device may be a programmable electronic hand held tablet device or tablet PC (personal computer) such as an iPad from Apple Inc. or similar having a processor, memory, wired and/or wireless communication interface devices, power supply, input/output devices, and other usual ancillary components necessary for controlling and programming microprocessor 600. In other possible embodiments, a desktop PC may be provided. Control device 801 is configured and operable to run application programs or software ("apps"). Control device 801 is further configured and operable to allow inputting numerical values into control module 520 for programming the microprocessor 600. In one embodiment, the GUI is a touch screen LCD or LED display.

Figure 83:
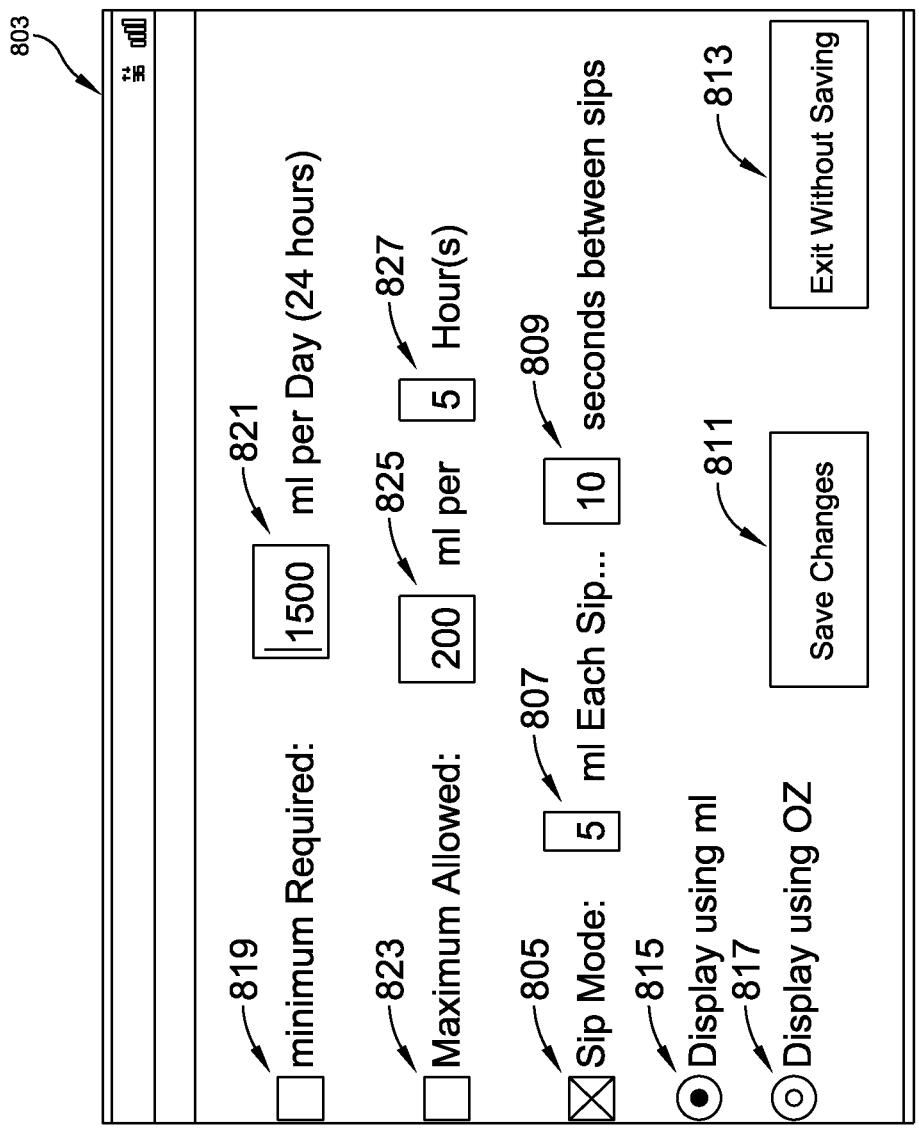
FIG. 83 is a graphic fluid options setup screen for inputting and programming data into the hydration system for controlling the hand-held hydration device according to the process of FIG. 82.

FIG. 83 shows one exemplary embodiment of the fluid options setup screen 803. Screen 803 includes various input fields including in pertinent part a sip mode checkbox 805, liquid volume dispensed by hydration device 300 per each sip field 807, and time interval between sips field 809. After the operator accesses and displays screen 803 on control device 801, the user uses the control device to activate the sip mode by checking the checkbox 805, inputting the desired liquid volume in field 807, and inputting the desired time interval between sips in field 809. The operator clicks or touches the Save Changes button and the sip mode is thereby activated (step 804 in FIG. 82).

It should be noted that the user may alternatively select the Exit without Saving button 813 on screen 803 (FIG. 83) as well as selecting either of the radio button 815 or 817 to display the volume in milliliters (ml) or ounces (oz), respectively. The fluid options setup screen 803 also allows selection and inputting of the minimum required volume of liquid to be consumed by the patient per day (checkbox 819 and input field 821) and/or maximum allowed volume of liquid within a specified time period (checkbox 823 and input fields 825 and 827 respectively).

With continuing reference to FIG. 82, the hydration system microprocessor 600 in step 806 implements a software routine and automatically calculates the linear/axial distance or amount of travel (e.g. mm or inches) that would be required for piston 22 to move in order to dispense the volumetric amount or quantity of liquid per each sip (e.g. ml per sip) to the patient user corresponding to the value input into field 807 by the operator in step 804. As previously described herein, the hydration system is pre-calibrated so that the system microprocessor 600 knows the volume of liquid that will dispensed from the hydration device 300 based on the linear distance or amount that the piston travels and thereby with a sip taken by patient user.

Referring to FIG. 82, the patient user initiates a drinking event by sucking on straw 56 of hydration device 300 shown in FIGS. 68-69 (step 808). The system controller microprocessor 600 is triggered by this event (e.g. by sensing a vacuum in straw 56 with vacuum sensor 250 in the manner already described herein) to check and determine the current initial or first axial position of piston 22 in reservoir 28 (step 810) at the onset of the drinking event. In one embodiment, the axial position of piston 22 (comprised cylindrical shell 135, a central internal shaft 136, and cylindrical tamp plate 138) may be determined by microprocessor 600 using the Hall Effect sensor 154 (see, e.g. FIGS. 6, 60, and 69) in the manner already described herein. Thus the movement of the end of elongate rod magnet 147 (mounted to piston shaft 136) relative to Hall Effect sensor 154 may be calibrated so as to provide an accurate gauge of the volumetric quantity of fluid entering or being discharged from fluid reservoir 28, and also is indicative of the position of the piston 22 relative to the reservoir.

During step 810 in FIG. 82, microprocessor 600 may further perform a calculation to add the amount of linear/axial travel or distance calculated in step 806 to the current initial or first axial position of piston 22 and thereby establish a second final axial stop point or position of the piston. When piston 22 has reached the final axial position, the predetermined amount of liquid per sip will have been dispensed to the user as further described herein.

Referring to FIG. 82, once the position of piston 22 is determined, microprocessor 600 next automatically opens the fluid dispensing or access valve 350 (FIGS. 73-76) moving the valve to an open dispensing position (step 812). Liquid in the reservoir 28 is dispensed through the valve 350 and straw 56 to the patient user during the drinking event.

As liquid is consumed and depleted from the reservoir 28, the piston 22 will move axially forward towards valve 350 in position relative to the reservoir. In step 814, microprocessor 600 automatically and continuously monitors the contemporaneous axial position of piston 22. Eventually, the piston 22 reaches the second final axial stop point or position that corresponds to the maximum volumetric quantity of liquid intended to be dispensed and consumed per each sip from the hand held hydration device 300 by the patient user. The maximum quantity or amount of liquid to be dispensed per sip was previously programmed by the operator into the microprocessor in step 804 (e.g. 5 ml in field 807 in the non-limiting example shown in FIG. 83).

In step 816, when the axial stop position of piston 22 is reached, this triggers the microprocessor 600 to next automatically close fluid dispensing valve 350 which is returned to a closed non-dispensing position to shut off the flow of liquid to the patient user. This ensures that the programmed volumetric quantity of liquid per sip will not be exceeded (e.g. 5 ml in this example). Valve 350 is locked and held in the closed non-drinking position via a system interlock by microprocessor 600 and cannot be opened until the interlock is removed.

With continuing reference to FIG. 82, the process 800 continues in step 818 with valve 350 still being held in the closed non-dispensing position via the system interlock. With the hydration system being in the "sip mode" of operation, microprocessor 600 is triggered to automatically start a drinking delay timer. Microprocessor 600 is configured and programmed with instructions or control logic to initiate the drinking delay timer implemented in software, firmware, hardware, or a combination thereof, thereby preventing opening of valve 350 while the timer is running. The drinking delay timer is programmed to run for a predetermined time interval corresponding to the value previously programmed into the microprocessor 600 by the operator in step 804 (e.g. 10 seconds in field 809 in the non-limiting example shown in FIG. 83). Even if the patient user attempts to draw liquid from reservoir 28 by sucking on straw 56, the microprocessor 600 blocks movement of fluid dispensing valve 350 to prevent liquid from being extracted by the user.

In step 820 shown in FIG. 82, the drinking delay timer expires after the programmed time interval (e.g. 10 seconds in this example) and microprocessor 600 releases the hold and interlock on fluid dispensing valve 350. Valve 350 is now openable and ready to begin another drinking event when initiated by the patient user sucking on straw 56 in step 802 according to the manner previously described above in the sip mode operating scheme.

Patient Hydration Record

According to another aspect, the hydration system includes the ability to create a complete historical patient hydration record over the lifetime of the user by collecting and storing each individual drink event (i.e. volume and time/date of event). Doing this allows for long term recording and evaluation of the patients' drinking habits and has potential for development of clinical evaluation tools that could look for markers that would be pre-cursers to de-hydration and/or other medical events.

In one embodiment, contemporaneous historical patient hydration data and a cumulative record of individual drinking events occurring over time may be accomplished with a programmable controller such as microprocessor 600 of control module 520 shown in FIG. 80, which may be part of base unit 510. The drinking event data is recorded and captured by hand-held hydration devices 2, 200, or 300 via the Hall effect sensor as already described herein, and in turn is relayed back to microprocessor 600 and stored in a suitable computer-readable medium accessible to the microprocessor. In some embodiments, the computer-readable medium may be any suitable non-volatile memory include read-only memory (ROM), USB flash memory, and magnetic data storage devices (e.g. internal/external hard disks, floppy discs, magnetic tape CD-ROM, DVD-ROM, optical disk, ZIP™ drive, Blu-ray disk, and the like, which may written to and/or read by microprocessor 600.

It is to be understood that the present invention is by no means limited only to the particular constructions herein disclosed and shown in the drawings, but also comprises any modifications or equivalents within the scope of the claims.

What is claimed is:

1. A method for dispensing liquid from a hand-held hydration device, the method comprising:
providing a hand-held housing including a liquid-containing reservoir, a straw, and a fluid dispensing valve fluidly coupled between the straw and reservoir;
a user sucking on the straw thereby producing a vacuum therein;
sensing the vacuum with a programmable controller including a microprocessor;
automatically opening the valve to a dispensing position;
dispensing liquid in the reservoir through the valve and straw to the user;
the user stopping to suck on the straw thereby ending the vacuum;
sensing a loss in vacuum in the straw with the controller;
starting a delay timer for a predetermined time interval; and
automatically closing the valve to a non-dispensing position after expiration of the time interval.

2. The method of claim 1, further comprising a piston disposed in the reservoir moving in a first axial direction during the step of dispensing the liquid to the user.

3. The method of claim 2, further comprising the piston moving in an opposite second axial direction to the first direction after loss of vacuum in the straw.

4. The method of claim 3, wherein the piston produces a vacuum in the reservoir and causes liquid remaining in the straw to be drawn back inwards into the reservoir.

5. The method of claim 4, wherein the hand held housing is held in a generally vertical position during use, the piston being moved by gravity in the second axial direction.

6. The method of claim 1, further comprising a vacuum sensor in fluid communication with the straw and operable for sensing the vacuum or loss of vacuum in the straw.

7. The method of claim 1, wherein the delay timer is implemented in the microprocessor of the controller.

8. A method for controlling fluid dispensing from a hand held hydration device, the method comprising:
providing a hand-held housing including a liquid-containing reservoir, an axially movable piston disposed in the reservoir, a drinking straw, and a fluid access valve fluidly coupled between the straw and reservoir;
a user initiating a drinking event by sucking on the straw;
automatically determining a first axial start position of the piston with respect to the reservoir via a programmable controller including a microprocessor;
automatically opening the valve to a dispensing position via the controller;

dispensing liquid in the reservoir through the valve and straw to the user while simultaneously moving the piston axially in the reservoir;

automatically monitoring the axial position of the piston; and automatically closing the valve to a non-dispensing position when the piston reaches a predetermined second axial stop position.

9. The method of claim 8, further comprising the controller automatically starting a drinking delay timer for a predetermined time interval after automatically closing the valve.

10. The method of claim 9, further comprising the controller automatically locking the valve in the closed position for duration of the time interval.

11. The method of claim 10, further comprising the controller automatically releasing the valve from the closed position.

12. The method of claim 9, further comprising manually inputting the predetermined time interval into the controller prior to the user initiating the drinking event.

13. The method of claim 8, further comprising: manually inputting into the controller a predetermined maximum quantity of liquid per sip to be dispensed by the hydration device to the user;

and the controller automatically calculating an second axial stop position of the piston based on the maximum quantity of liquid per sip input.

14. The method of claim 13, wherein the controller automatically converts the maximum quantity of liquid per sip into an axial travel distance for the piston and calculates the second axial stop position by adding the axial travel distance to the first axial start position of the piston.

15. The method of claim 8, wherein an second axial stop position of the piston is closer to the valve than the first axial start position.

* * * * *